United States Patent
Suzuki et al.

(10) Patent No.: US 7,133,667 B2
(45) Date of Patent: Nov. 7, 2006

(54) COMMUNICATIONS SYSTEM, COMMUNICATIONS DEVICE, AND COMMUNICATIONS METHOD

(75) Inventors: Keisuke Suzuki, Yokosuka (JP); Kazuyuki Kozu, Yokosuka (JP); Yukichi Saito, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 462 days.

(21) Appl. No.: 10/359,675

(22) Filed: Feb. 7, 2003

(65) Prior Publication Data

US 2004/0203558 A1 Oct. 14, 2004

(30) Foreign Application Priority Data

Feb. 8, 2002 (JP) .............................. 2002-033151
Aug. 12, 2002 (JP) .............................. 2002-235117

(51) Int. Cl.
*H04Q 7/20* (2006.01)
(52) U.S. Cl. ..................... 455/423; 340/825.2
(58) Field of Classification Search ................ 455/423, 455/424, 422.1; 709/239, 204; 340/825.02; 370/252, 426, 228, 258
See application file for complete search history.

(56) References Cited

U.S. PATENT DOCUMENTS

| | | | |
|---|---|---|---|
| 4,825,206 A * | 4/1989 | Brice et al. ............ 340/825.02 |
| 4,993,015 A | 2/1991 | Fite, Jr. | |
| 5,029,334 A * | 7/1991 | Braun et al. ................ 370/252 |
| 5,084,870 A * | 1/1992 | Hutchison et al. .......... 370/258 |
| 5,182,744 A * | 1/1993 | Askew et al. ................ 370/228 |
| 6,154,782 A * | 11/2000 | Kawaguchi et al. ........ 709/239 |
| 6,178,327 B1 | 1/2001 | Gomez | |
| 6,249,800 B1 | 6/2001 | Aman et al. | |
| 6,289,212 B1 | 9/2001 | Stein et al. | |
| 6,327,669 B1 | 12/2001 | Croslin | |
| 2002/0073232 A1* | 6/2002 | Hong et al. .................. 709/238 |

FOREIGN PATENT DOCUMENTS

| | | |
|---|---|---|
| EP | 0 221 360 | 5/1987 |
| EP | 0 993 165 | 4/2000 |
| EP | 1 148 748 | 10/2001 |
| EP | 1 158 748 | 11/2001 |
| JP | 2001-236294 | 8/2001 |
| WO | WO 02/01844 | 1/2002 |

* cited by examiner

*Primary Examiner*—Temica Beamer
*Assistant Examiner*—Joy K. Contee
(74) *Attorney, Agent, or Firm*—Oblon, Spivak, McClelland, Maier & Neustadt, P.C.

(57) ABSTRACT

A communications system includes a memory storing a table in which information identifying each server is associated with information identifying a plurality of switching devices, a communication incapability detector for detecting that a given switching device cannot relay data destined for a given server transmitted from a mobile terminal to the given server, a selector for selecting, based on the detection, a switching device other than the given switching device from among a plurality of switching devices associated with the given server, by referring to the table and information identifying the given server, and a transmitter for transmitting data to the selected switching device.

40 Claims, 35 Drawing Sheets

| DESTINATION SERVER ADDRESS INFO | CORRESPONDENCE ROUTER ADDRESS INFO | GATEWAY SWITCH DEVICE ADDRESS INFO |
|---|---|---|
| x1 | y1 | z1 |
| | y2 | z2 |
| | . | . |
| x2 | . | . |

FIG. 18

| DESTINATION SERVER ADDRESS INFO | CORRESPONDENCE ROUTER ADDRESS INFO | GATEWAY SWITCH DEVICE ADDRESS INFO | FAULT INFO |
|---|---|---|---|
| x1 | y1 | z1 | FAULT PRESENT |
| | y2 | z2 | FAULT ABSENT |
| | y3 | z3 | FAULT PRESENT |
| | y4 | z4 | FAULT PRESENT |
| | y5 | z5 | FAULT ABSENT |
| x2 | . | . | . |

| SERVER ADDRESS INFO | CORRESPONDENCE ROUTER ADDRESS INFO | PATH COMMUNICATION ABILITY |
|---|---|---|
| x1 | y1 | $\alpha 1$ |
| | y2 | $\alpha 2$ |
| | ⋮ | ⋮ |
| x2 | ⋮ | ⋮ |

FIG. 29

| PATH COMMUNICATION ABILITY | MEANINGS |
|---|---|
| $\alpha 1 \sim \alpha 9$ | PATH COMMUNICATION ABILITIES CALCULATED BY CALCULATOR |
| $\alpha 0$ | CORRESPONDENCE ROUTER ASSOCIATED WITH THIS VALUE IS ALWAYS SELECTED |
| $\alpha 99$ | CORRESPONDENCE ROUTER ASSOCIATED WITH THIS VALUE IS NEVER SELECTED |
| $\alpha 50$ | CORRESPONDENCE ROUTER ASSOCIATED WITH THIS VALUE IS SELECTED ONLY WHEN ANY OTHER CORRESPONDENCE ROUTER CANNOT BE SELECTED |

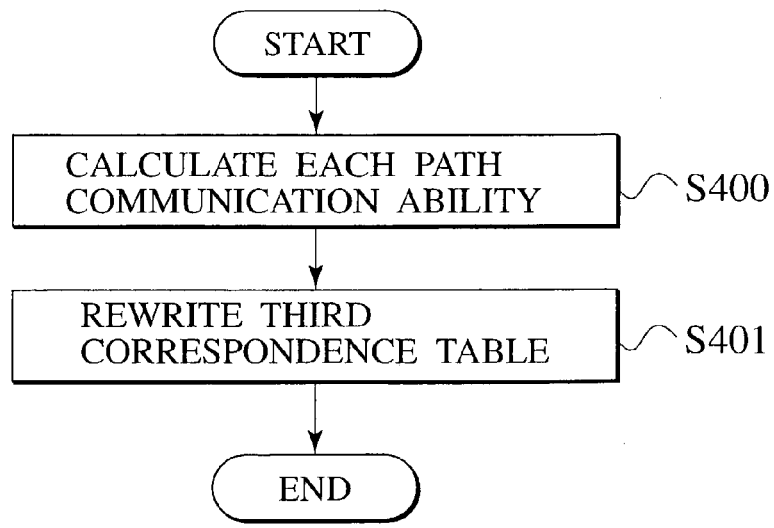

FIG. 30

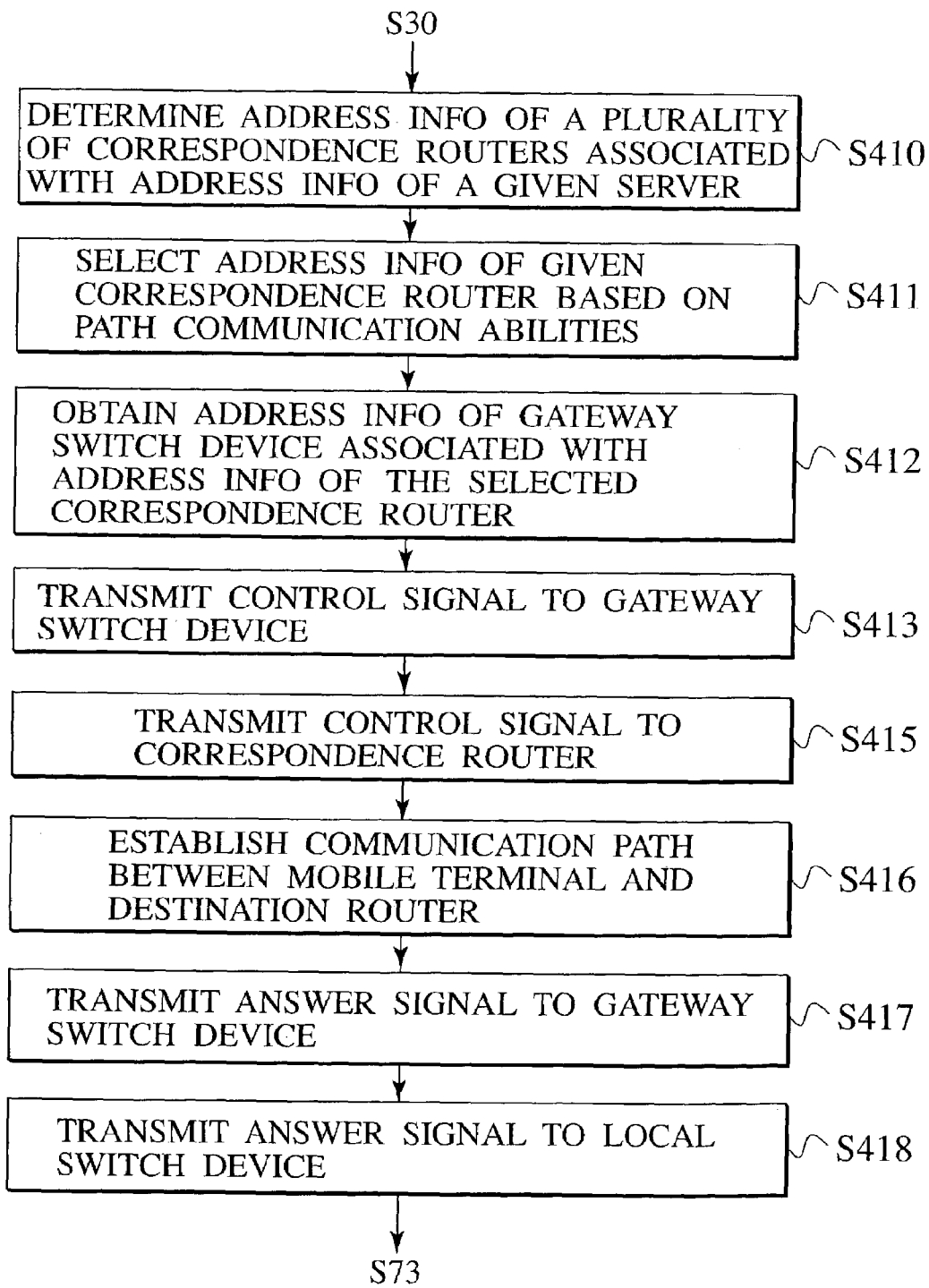

| SERVER GROUP ADDRESS INFO | ATTRIBUTE INFO | SERVER ADDRESS INFO | CORRESPONDENCE ROUTER ADDRESS INFO |
|---|---|---|---|
| A | β1 | a1 | y1 |
|  | β2 | a2 | y2 |
|  | β3 | a3 | y3 |
|  | ⋮ | ⋮ | ⋮ |
| B | ⋮ | ⋮ | ⋮ |

FIG. 39

| SERVER GROUP ADDRESS INFO | ATTRIBUTE INFO | SERVER ADDRESS INFO | CORRESPONDENCE ROUTER ADDRESS INFO | PATH COMMUNICATION ABILITY |
|---|---|---|---|---|
| A | $\beta 1$ | a1 | y1 | $\alpha 1$ |
| | $\beta 2$ | a2 | y2 | $\alpha 2$ |
| | $\beta 2$ | a3 | y3 | $\alpha 3$ |
| | $\beta 2$ | a3 | y4 | $\alpha 4$ |
| | ... | ... | ... | ... |
| B | ... | ... | ... | ... |

FIG. 40

| SERVER GROUP ADDRESS INFO | ATTRIBUTE INFO | SERVER ADDRESS INFO | CORRESPONDENCE ROUTER ADDRESS INFO | PATH COMMUNICATION ABILITY |
|---|---|---|---|---|
| A | β1<br>β2<br>β2 | a1<br>a2<br>a3 | y1<br>y2<br>y3 | α1<br>α2<br>α3 |
| B | . . | . . | . . | . . |
| — | — | x1 | y1<br>y2 | α1<br>α2 |
| — | — | x2 | . . | . . | form
COMMUNICATIONS SYSTEM, COMMUNICATIONS DEVICE, AND COMMUNICATIONS METHOD

CROSS REFERENCE TO RELATED APPLICATIONS

This application is based upon and claims the benefit of priority from the prior Japanese Patent Application No. P2002-33151, filed on Feb. 8, 2002, and the prior Japanese Patent Application No. P2002-235117, filed on Aug. 12, 2002; the entire contents of which are incorporated herein by reference.

BACKGROUND OF THE INVENTION

1. Field of the Invention

The present invention relates to a communications system, a communications device and a communications method in mobile communications systems.

2. Description of the Related Art

In recent years, there have been requests for the implementation of high-speed data communications for use in mobile multimedia services and for the implementation of communications systems which allow a user to use the same mobile terminal in different countries. At these requests, the standardization of next-generation mobile communications systems and the standardization of mobile communications systems using IMT-2000 (third-generation mobile communications systems) have been conducted. The development of these mobile communications systems has been begun. In the standardization of IMT-2000, for example, 3GPP has been used.

FIG. 1 is a diagram illustrating the configuration of a mobile communications system using 3GPP. The mobile communications system has mobile terminals (not shown), base stations (not shown) for conducting radio communications with the mobile terminals, radio access network controllers(not shown, hereinafter "radio access network controller" is referred to as control station), a local switch device("local switch device" may be referred to as "local switching device" or "local switch") 105, a gateway switch device("gateway switch device" may be referred to as "gateway switching device" or "gateway switch") 107 connected to the local switch device 105 via a network 106 (hereinafter referred to as a core network), a router 108 connected to a public network 109, and a server 110 connected to the public network 109. Also, the term of "switch device" may be referred to as "switching device" or "switch".

The router 108 is connected to the gateway switch device 107. The router 108 directly connected to the gateway switch device 107 is hereinafter referred to as a correspondence router 108.

Data (e.g., packet data) transmitted from a mobile terminal to a given server 110 is transmitted via a base station or the like to the given server 110. In a mobile communications system using 3GPP, data transmitted from a mobile terminal to a given server 110 is transmitted via one of a plurality of gateway switch devices 107 and a correspondence router 108 connected to the device 107 to the given server 110.

However, the above mobile communication system does not include a means for allowing the selection of a given one of the plurality of gateway switch devices 107 included in communication paths between a mobile terminal and a given server 110 when the mobile terminal transmits data to the given server 110. Similarly, the mobile communications system does not include a means for allowing the selection of a given correspondence router 108 from among a plurality of correspondence routers 108 included in the communication paths between a mobile terminal and a given server 110 when the mobile terminal transmits data to the given server 110.

There has thus been a problem as described below when a mobile terminal transmits data to a given server 110. Data transmitted to a gateway switch device 107 cannot be transmitted by the gateway switch device 107 to a correspondence router 108 in cases as described below. For example, when the CPU of the gateway switch device 107 performs a large amount of processing, or when the capacity of a memory in the gateway switch device 107 is not sufficient, or when the gateway switch device 107 has some trouble in data reception and transmission processes (e.g., a failure occurs in the gateway switch device 107), the gateway switch device 107 (hereinafter referred to as a relay-incapable gateway switch device) cannot transmit the data to the correspondence router 108. As a result, the data cannot be transmitted to the given server 110.

As an existing system for solving the above problem, there is mobile communications system compliant with the standard of PDC-P. FIG. 2 is a diagram illustrating the configuration of a mobile communication system compliant with the standard of PDC-P. In FIG. 2, components identical to those in FIG. 1 are affixed identical reference numerals and will not be described. As shown in FIG. 2, a plurality of gateway switch devices 107 are connected to a local switch device 105 via a core network 106.

This mobile communications system includes means for selecting one of a plurality of correspondence routers 108 when data is transmitted from a mobile terminal to a given server 110. When a gateway switch device 107 connected to the selected correspondence router 108 is capable of relay, the data is transmitted via the gateway switch device 107 and the correspondence router 108 connected to the gateway switch device 107 to the given server 110.

A mobile communications system using the 3GPP standard includes a plurality of correspondence routers 108 capable of transmitting data to a given server 110 when data is transmitted from a mobile terminal to the given server 110. However, the mobile communications system using the 3GPP standard is not provided with a memory for storing a correspondence table (see FIG. 5) in which the address information of servers 110 are associated with the address information of gateway switch devices 107, for example.

If the above mobile communications system is provided with a memory for storing the correspondence table, there is a problem as follows. When data is transmitted from a mobile terminal to a given server 110, the data is first transmitted to a local switch device 105. The local switch device 105 then accesses the correspondence table and obtains the address information of a given gateway switch device 107. The local switch device 105 then transmits the data via the given gateway switch device 107 to the server 110.

For the transmission, the mobile communications system does not establish the process of selecting one of a plurality of gateway switch devices 107 (to which data is transmitted from the local switch device 105) connected to the local switch device 105.

The local switch device 105 also cannot find a plurality of correspondence routers 108 connected to a gateway switch device 107. When transmitting data to a gateway switch device 107, the local switch device 105 cannot transmit instruction information below. The instruction information means an instruction to transmit data via a given correspondence router 108.

When a plurality of correspondence routers 108 are connected to a gateway switch device 107, the following is true. The correspondence routers 108 provide different communication paths between a mobile terminal and a given server 110. Data communications using the different communication paths show different communication abilities (data transmission speeds and data loss rates). In order to transmit data from a mobile terminal to a given server 110 via a communication path exhibiting good communication ability, the following process is required. That is, it is necessary for a given device to select a given correspondence router 108 from among the plurality of correspondence routers 108 as a correspondence router included in a communication path between the mobile terminal and the given server 110.

It is thus desirable that the mobile communications system include a means for selecting one of the plurality of correspondence routers 108 when data is transmitted from a mobile terminal to a given server 110.

A mobile communications system compliant with PDC-P includes a plurality of correspondence routers 108 being capable of transmitting data to a given server 110 when data is transmitted from a mobile terminal to the given server 110. In the mobile communications system, a local switch device 105 can select a given correspondence router 108 from among the plurality of correspondence routers 108 when transmitting data to the given server 110. When a gateway switch device 107 connected to the selected correspondence router 108 is capable of relay, the local switch device 105 can transmit data via the given correspondence router 108 to the given server 110 (FIG. 6).

The above-described conventional art, however, has the following problem. FIGS. 3 and 4 are supplementary diagrams for the description of the problem in the conventional art. When the local switch device 105 transmits data to a gateway switch device (gateway switch device incapable of transmitting data to a correspondence router 108) 107, the conventional PDC-P communications system can only change the communication path on the core network 106. Thus the gateway switch device 107 cannot forward the data to another gateway switch device 107 (FIGS. 3 and 4). A gateway switch device 107 capable of transmitting data to a correspondence router 108 is hereinafter referred to as a relay-capable gateway switch device 107.

When the mobile terminal again transmits data to the given server 110, the data is transmitted to the give server 110 if the local switch device 105 can transmit the data to a relay-capable gateway switch device 107.

However, the conventional local switch device 105 does not manage information about relay-incapable gateway switch devices 107. Thus the local switch device 105 can again transmit data to a relay-incapable gateway switch device 107. In this situation, the data cannot be forwarded from the relay-incapable gateway switch device 107 to another gateway switch device 107. As a result, the data transmitted from the mobile terminal cannot be transmitted to the given server 110.

There has thus been demand for the development of a communications system and a communications device (e.g., a local switch device) which allow data to be transmitted from a switching device (e.g., a gateway switch device) other than a relay-incapable switching device to a server 110 even when the data has been transmitted to the relay-incapable switching device (e.g., the gateway switch device).

In the mobile communications system using PDC-P shown in FIG. 6, as described above, the local switch device 105 can perform the following processing. To transmit data to a given server 110, the local switch device 105 selects a given correspondence router 108 from among the correspondence routers 108 connected to the given server 110. The local switch device 105 can transmit data via the given correspondence router 168 to the given server 110.

The selection of the given correspondence router 108 by the local switch device 105 is performed in a manner as described below.

In a correspondence table stored in a memory 125, information identifying the server 110 (e.g., address information) is associated with information identifying the plurality of correspondence routers 108, and order information is associated with the information identifying each correspondence router 108.

Suppose that the local switch device 105 has selected a given correspondence router 108 (e.g., a correspondence router corresponding to address information a) in the most recent past. When the local switch device 105 selects a correspondence router 108 next time, a correspondence router 108 next in order to the above given correspondence router 108 (e.g., a correspondence router corresponding to address information b; see FIG. 6) is selected (round robin manner).

In a round-robin manner, data transmitted from a mobile terminal is not always transmitted to a given server 110 via a communication path having good communication ability. During the transmission of data transmitted from a mobile terminal to a given server, the following problem can occur. For example, the arrival of the data at the give server can be delayed, data loss can occur, congestion can occur on the network, and congestion in a device on the network can occur.

There has thus been a demand for the development of a communications system which allows data transmitted from a mobile terminal to be transmitted via a communication path having good communication ability to a server 110.

It is common that a user of a mobile terminal makes an agreement (such as a contract) with a service provider, for example. In the agreement, it is stipulated that the service provider provides the user with a kind of information. In some cases, the service provider manages a plurality of servers. In these cases, the user must find out the location information (e.g., the URL) of a server which delivers the above kind of information. Specifically, the user must find out the location information of the server delivering the above kind of information based on the location information of the plurality of servers managed by the service provider. Thus the user cannot easily obtain the above kind of information.

A system in which an information delivery request is transmitted to the server when the user simply inputs information identifying the service provider and the information delivery request using the mobile terminal, would be convenient for the user in the following aspect. The user does not need to find out the location information of the server delivering the above kind of information.

Thus the development of a communications system with increased convenience to users has been desired.

BRIEF SUMMARY OF THE INVENTION

An object of the present invention is to provide a communications system, a communications device and a communications method for allowing data transmitted from mobile terminals to be smoothly transmitted to servers, or a communications system, a communications device and a communications method for increasing users' convenience.

Specifically, in communications systems of the present invention, a communications system having mobile terminals and switching devices for relaying data transmitted via a radio access network(hereinafter referred to as radio network)from the mobile terminals to servers comprises: a memory storing a table in which information identifying each server is associated with information identifying a plurality of switching devices; a communication incapability detector for detecting that a given switching device cannot relay data destined for a given server transmitted from a mobile terminal to the given server; a selector for selecting, based on the detection by the communication incapability detector, a switching device other than the given switching device from among a plurality of switching devices associated with the given server, referring to the table and information identifying the given server; and a transmitter for transmitting the data to the switching device selected by the selector.

BRIEF DESCRIPTION OF THE SEVERAL VIEWS OF THE DRAWINGS

FIG. 18 is a diagram illustrating the configuration of a second correspondence table stored in a memory in embodiment 2;

FIG. 29 is a supplementary diagram for illustrating path communication abilities in embodiment 3;

FIG. 30 is a flowchart illustrating a part of a communications method in embodiment 3;

FIG. 31 is a flowchart illustrating a part of the communications method in embodiment 3;

FIG. 39 is a diagram exemplifying the fourth correspondence table stored in the memory in embodiment 4;

FIG. 40 is a diagram exemplifying a table of combination of the third and fourth correspondence tables.

DETAILED DESCRIPTION OF THE INVENTION

Figure 1:
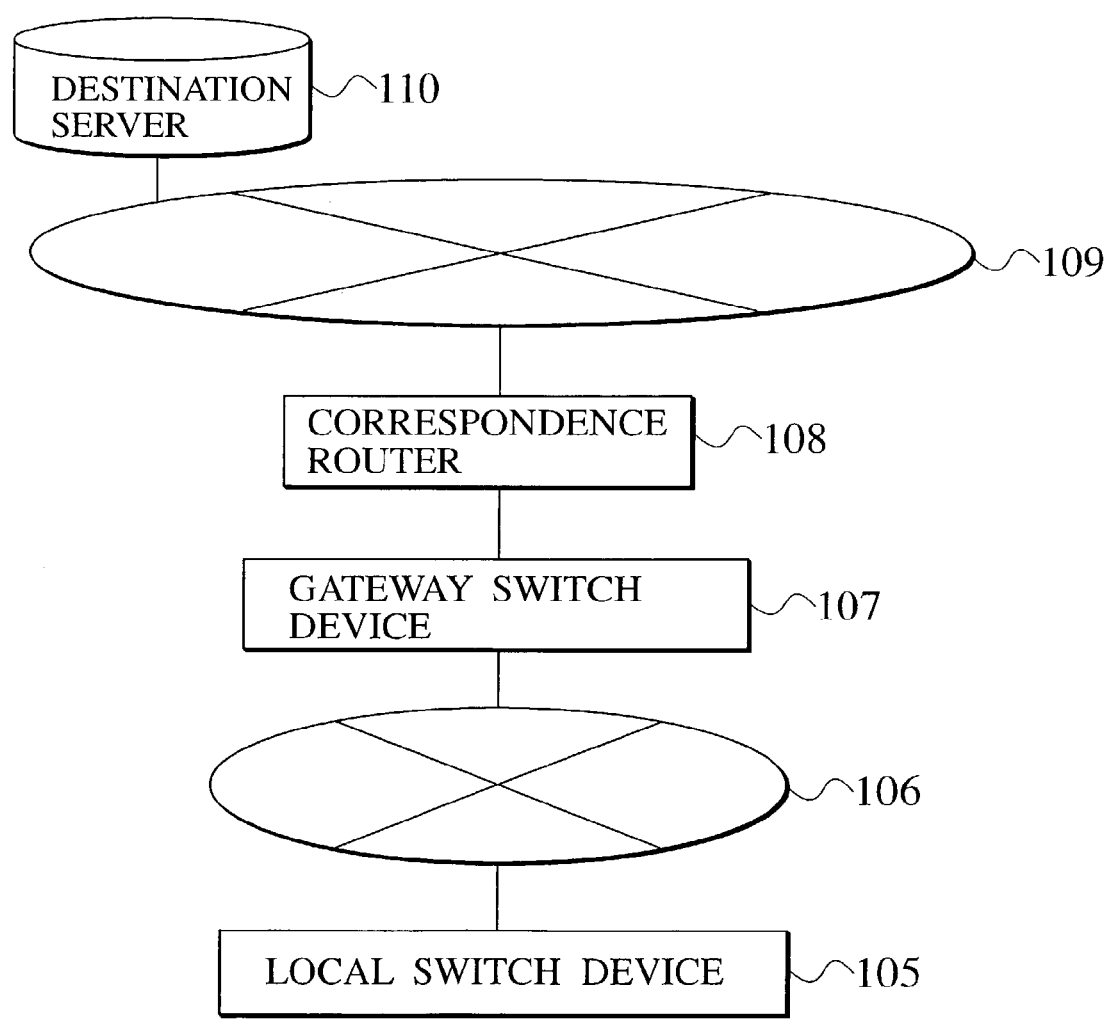
FIG. 1 is a diagram illustrating the configuration of a communications system of a first conventional art.
Figure 2:
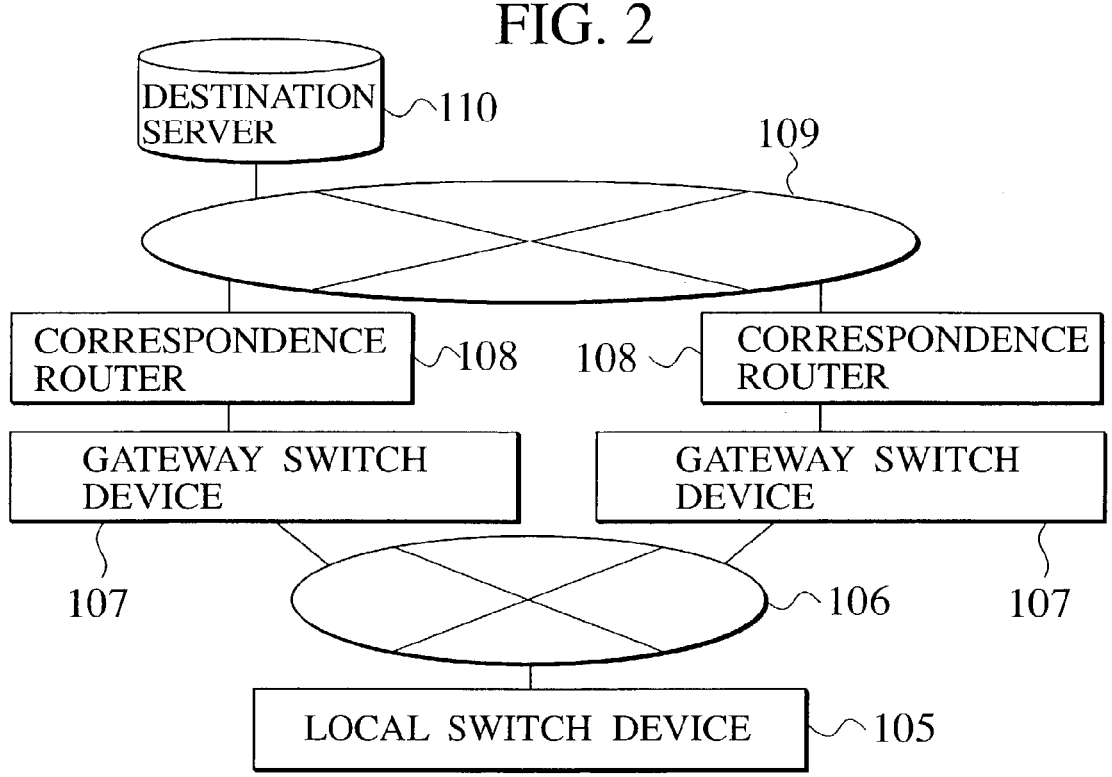
FIG. 2 is a diagram illustrating the configuration of a communications system of a second conventional art.
Figure 3:
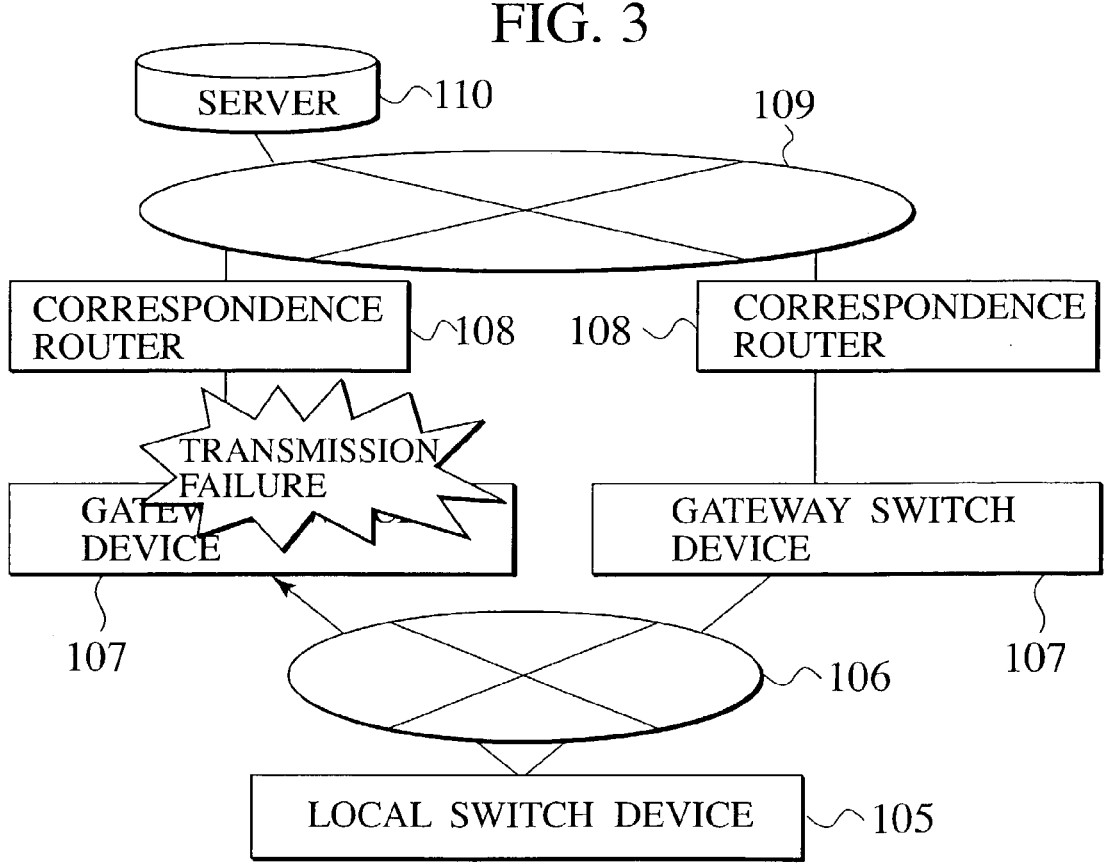
FIG. 3 is a schematic diagram for illustrating the problem of the communications system of the second conventional art.
Figure 4:
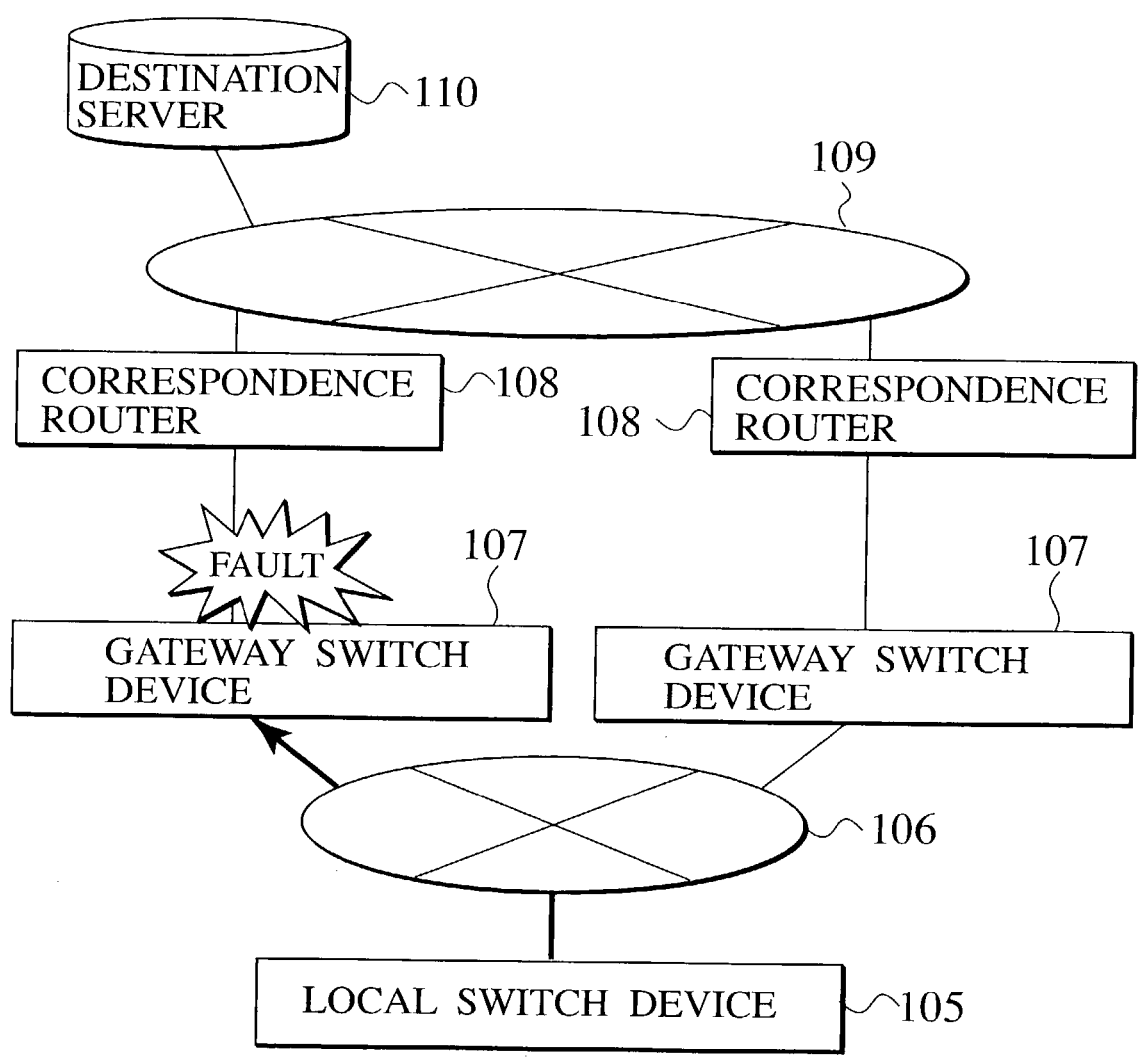
FIG. 4 is a schematic diagram for illustrating the problem of the communications system of the second conventional art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally, and as is conventional in the representation of devices, it will be appreciated that the various drawings are not drawn to scale from one figure to another nor inside a given figure.

In the following descriptions, numerous specific details are set forth to provide a through understanding of the present invention. However, it will be obvious to those skilled in the art that the present invention may be practiced without such specific details.

Embodiment 1

Configuration

Figure 7:
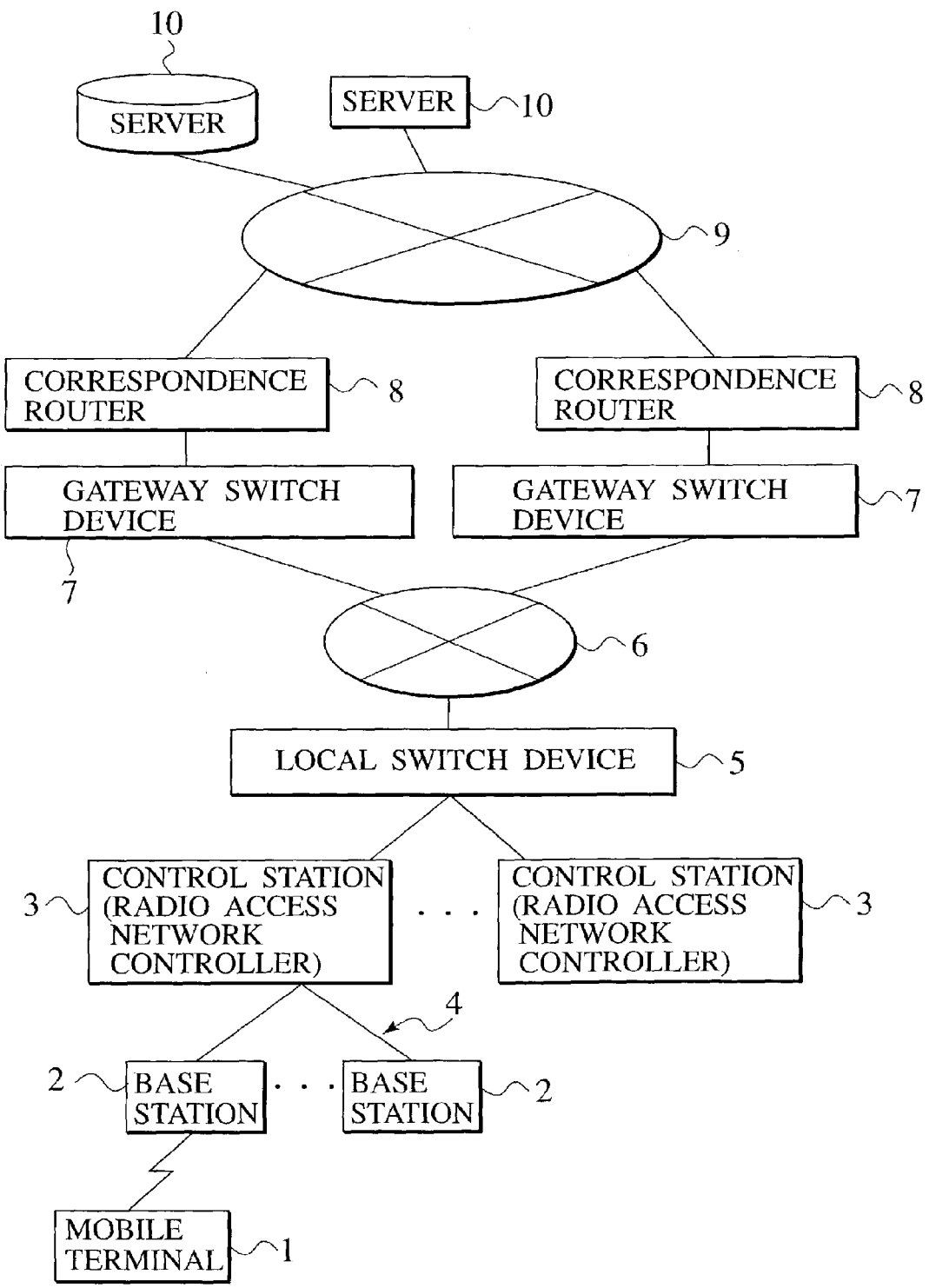
FIG. 7 is a diagram illustrating the configuration of a communications system in embodiment 1.

FIG. 7 is a diagram illustrating the configuration of a communications system in embodiment 1. The communications system of this embodiment has mobile terminals 1, base stations 2 for conducting radio communications with the mobile terminals 1, control stations (radio access network controllers) 3 connected to the base stations 2 via a radio network 4, a local switch device 5, a plurality of gateway switch devices 7 connected to the local switch device 5 via a core network 6, correspondence routers 8 connected to the gateway switch devices 7, and a plurality of servers 10 connected to the correspondence routers 8 via a public network 9.

The system of the radio communications is, for example, a W-CDMA scheme. The public network 9 is, for example, the Internet or a telephone network. The communications system between the gateway switch devices 7 and the local switch device 5 may be a packet switching system or a circuit switching system.

The plurality of servers 10 are connected to the public network 9. The local switch device 5 transmits data via a given gateway switch device 7 and a correspondence router 8 connected to the gateway switch device 7 to a server 10.

When the local switch device 5 transmits data to the server 10, the following process is performed. Specifically, the local switch device 5 transmits the data to a gateway switch device 7 connected to the local switch device 5. The gateway switch device 7 receives the data and then transmits the data to a correspondence router 8 connected to the gateway switch device 7. The correspondence router 8 receives the data and then transmits it to the server 10. The transmission of data from the gateway switch device 7 to the correspondence router 8 is hereinafter referred to as the relay of data from the gateway switch device 7 to the correspondence router 8. Similarly, the transmission of data from the correspondence router 8 to the server 10 is referred to as the relay of data from the correspondence router 8 to the server 10.

In FIG. 7, gateway switch devices 7 are connected to the respective correspondence routers 8. It is also possible to connect a plurality of correspondence routers 8 to a single gateway switch device 7. In this embodiment, description will be made with regard to a single correspondence router 8 connected to a single gateway switch device 7.

The mobile terminal 1 transmits to the base station 2 a control signal as a signal for establishing a communication path between the mobile terminal 1 and a gateway switch device 7. The mobile terminal 1 transmits the control signal to the base station 2 before transmitting data (e.g., contents data) to the base station 2. The mobile terminal 1 previously stores the address information of each device. The mobile terminal 1 adds to the control signal the address information of a destination device (server 10) and the address information of the source device (the mobile terminal 1). The mobile terminal 1 then transmits the control signal to the base station 2. When the communication path between the mobile terminal 1 and the gateway switch device 7 is established, the mobile terminal 1 can transmit the data to the base station 2 by radio.

The base station 2 receives the data (or control signal) transmitted from the mobile terminal 1. The base station 2 then transmits the data (or control signal) via the radio network 4 to the control station 3. The control station 3 transmits the data (or control signal) transmitted from the base stations 2 to the local switch device 5.

Figure 8:
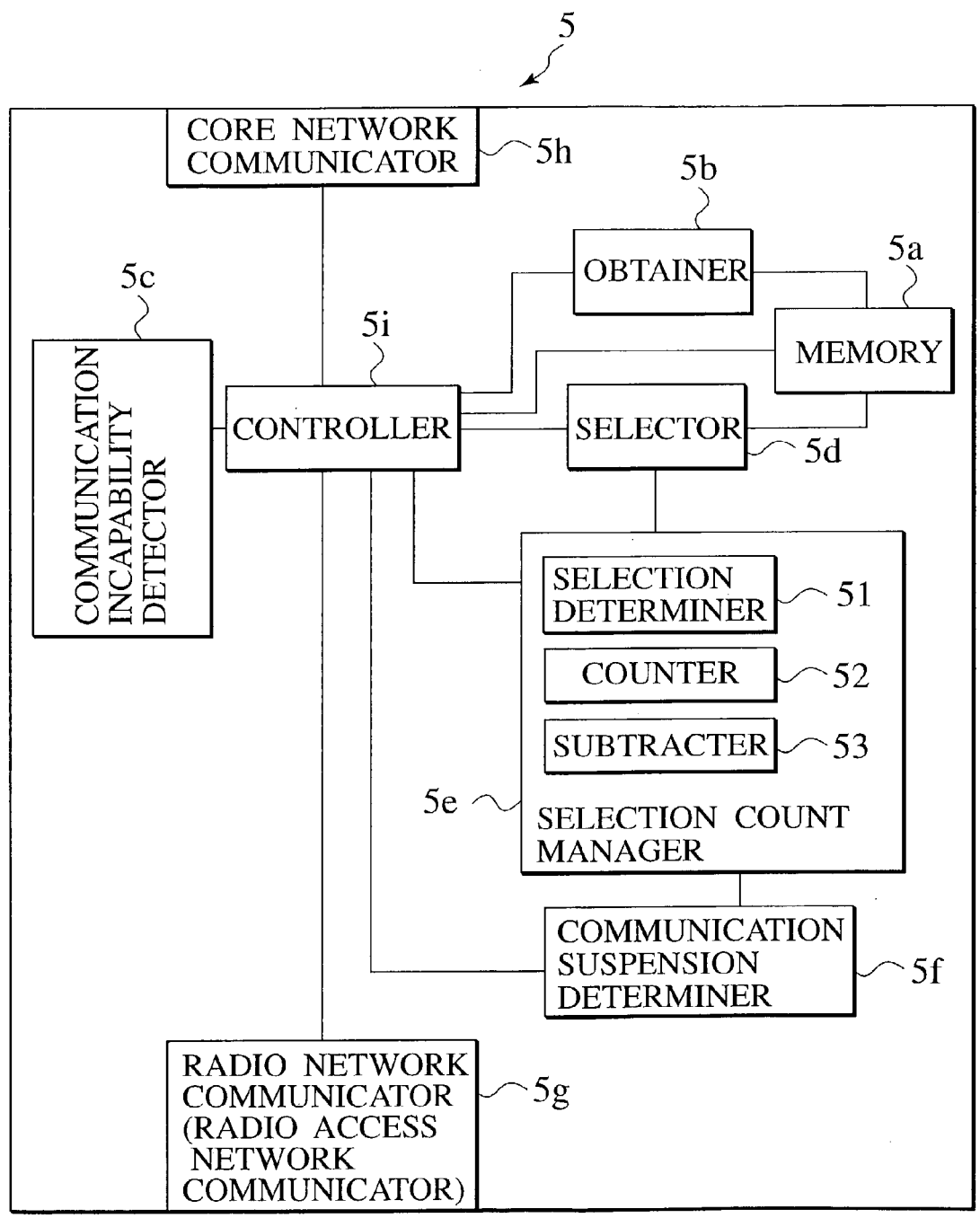
FIG. 8 is a diagram illustrating the configuration of a local switch device in embodiment 1.
Figures 9, 10:
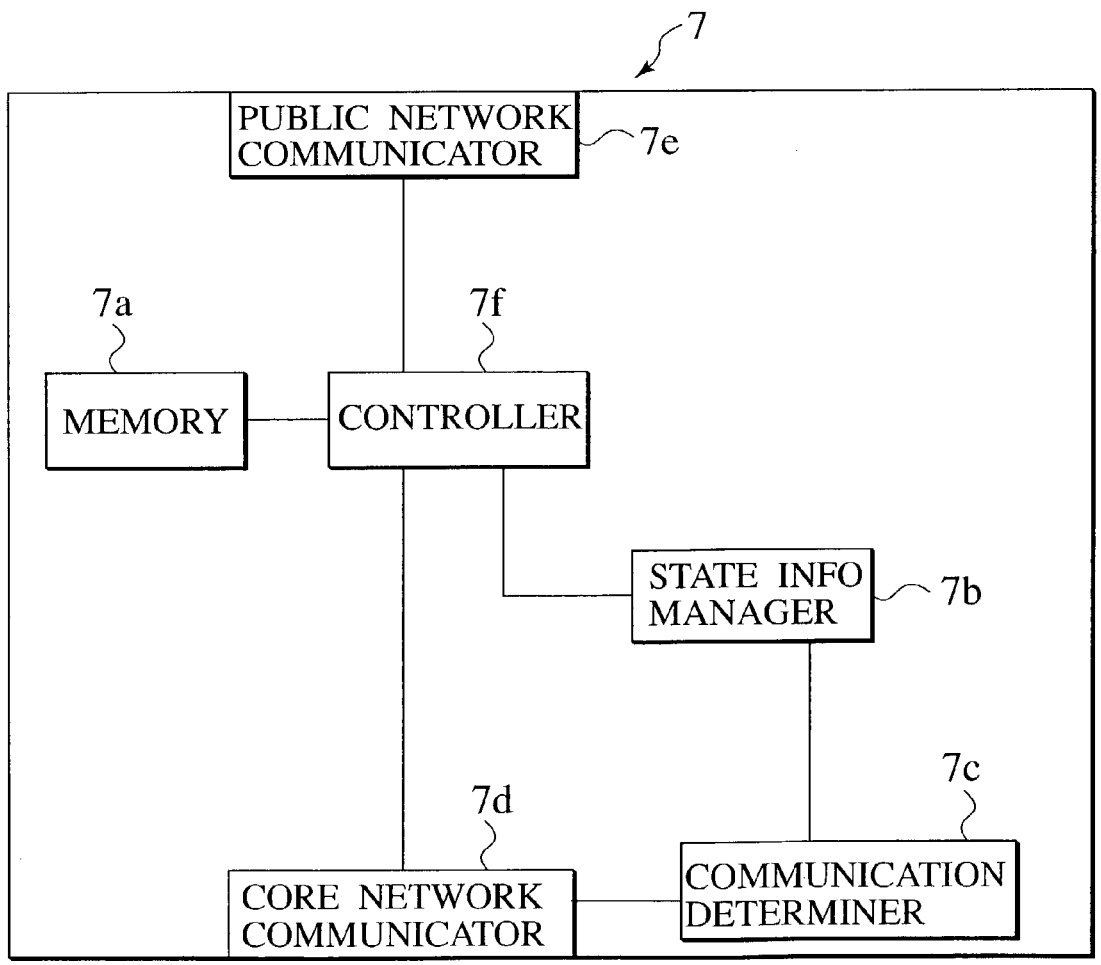
FIG. 9 is a diagram illustrating the configuration of a first correspondence table stored in a memory in embodiment 1.
FIG. 10 is a diagram illustrating the configuration of a gateway switch device in embodiment 1.

FIG. 8 is a diagram illustrating the configuration of the local switch device 5. The local switch device 5 has a memory 5a storing various types of data. The memory 5a stores a first correspondence table in which the address information of the servers 10 connected to the public network 9, the address information of the correspondence routers 8 and the address information of the gateway switch devices 7 are associated with one another. Specifically, the first correspondence table associates the address information of each server 10 with the address information of the plurality of correspondence routers 8, and also associates the address information of the correspondence routers 8 with the address information of the respective gateway switch devices 7. FIG. 9 is a diagram exemplifying the first correspondence table.

The local switch device 5 also has an obtainer 5b. The obtainer 5b obtains a control signal transmitted from the control station 3 and reads the first correspondence table from the memory 5a. Referring to the address information of the server 10 (destination device of the data) added to the control signal and the first correspondence table, the obtainer 5b obtains the address information of a gateway switch device 7 associated with the address information of the server 10.

The obtainer 5b then transmits the control signal and the obtained address information of the gateway switch device 7 to a controller 5i. The controller 5i adds to the control signal the address information of the gateway switch device 7 obtained by the obtainer 5b.

The local switch device 5 has a communication incapability detector 5c. The communication incapability detector 5c detects the incapability of relay of the gateway switch device 7 based on information determined by a communication determiner 7c of the gateway switch device 7.

The local switch device 5 has a selector 5d. When the communication incapability detector 5c detects the relay-incapability of the gateway switch device 7 (information showing the relay-incapability), the selector 5d reads the first correspondence table from the memory 5a. The selector 5d then refers to the address information of the relay-incapable gateway switch device 7 and the first correspondence table and performs the following processing. The selector 5d selects the address information of a gateway switch device 7 other than the address information of the relay-incapable gateway switch device 7 from among the address information of the plurality of gateway switch devices 7 associated with the address information of the server 10 (destination device of the data).

The selector 5d then transmits to the controller 5i the control signal and the address information of the gateway switch device 7 associated with the address information of the server 10 added to the control signal. The controller (rewriter) 5i rewrites the address information of the gateway switch device 7 added to the control signal based on the information transmitted from the selector 5d.

The local switch device 5 has a selection count manager 5e. The selection count manager 5e controls the number of times the address information pieces of the gateway switch devices 7 are selected by the selector 5d for the address information of each server 10 (hereinafter referred to as destination address information) and the address information of each mobile terminal 1 (hereinafter referred to as source address information).

The selection count manager 5e has a selection determiner 51 for determining whether or not the selector 5d performs selection for the destination address information and the source information, respectively, a counter 52 for counting the number of times the selection determiner 51 determines that selection has performed for the destination address information and the source address information, and a subtracter 53 for calculating the allowable number of times indicating a number resulting from the subtraction of the counted number of selections from a predetermined number.

The predetermined number is determined based on the time below, for example. The time is a time allowed for establishing a communication path between the mobile terminal 1 and the gateway switch device 7 in the communications system.

The local switch device 5 has a communication suspension determiner 5f for determining the suspension of data transmission to a given server when the number of selections reaches the predetermined number. The communication suspension determiner 5f determines the suspension of data transmission to a gateway switch device 7 when the allowed number of times calculated by the subtracter 53 becomes 0, for example.

The local switch device 5 also has a radio network communicator (radio access network communicator) 5g for conducting data communications with the control stations 3 via the radio network 4, a core network communicator 5h for conducting data communications with the gateway switch devices 7 via the core network 6, and the controller 5i for controlling those units.

FIG. 10 is a diagram illustrating the configuration of the gateway switch device 7. The gateway switch device 7 has a memory 7a, a communication determiner 7c and a state information manager 7b.

The memory 7a stores various types of data (e.g., data transmitted from the local switch device 5). The state information manager 7b manages information about various states. A state information is, for example, information regarding the amount of free space in the memory 7a, information as to whether the amount of processing currently being performed by each unit reaches the maximum processing amount (the maximum amount of processing each unit can perform), and information as to whether the correspondence router 8 associated with the gateway switch device 7 is faulty or not.

The communication determiner 7c determines whether or not the gateway switch device 7 can relay data to the correspondence router 8. More specifically, the communication determiner 7c determines whether or not the gateway switch device 7 can relay data to the correspondence router 8 based on the state information managed by the state information manager 7b (e.g., information regarding the amount of free space in the memory 7a, information as to whether or not the amount of processing performed by each unit reaches the maximum amount of processing the unit can perform, and information as to whether or not the correspondence router 8 is faulty). The communication determiner 7c may determine whether or not the gateway switch device 7 can receive (in a relay) data from the local switch device 5.

The gateway switch device 7 also has a core network communicator 7d for conducting data communications with the local switch device 5 via the core network 6, a public network communicator 7e for conducting data communications with the correspondence router 8, and a controller 7f for controlling those units.

The correspondence router 8 conducts data communications with a given server 10 via the public network 9. The correspondence router 8 has a memory (not shown) for temporarily storing data. The correspondence router 8 holds a routing table in which the address information of servers is associated with the address information of routers (included on the public network 9).

Upon receiving data from the gateway switch device 7, the correspondence router 8 temporarily stores the data in the memory. The correspondence router 8 then determines a destination router (included on the public network 9) to which the data is transmitted based on the routing table it holds and the destination address information added to the data. The correspondence router 8 then transmits the data to the destination router.

A responsibility demarcation point exists in a line connecting the gateway switch device 7 to the correspondence router 8. The responsibility demarcation point is defined as described below. Lines and devices placed closer to the correspondence router 8 with respect to the responsibility demarcation point are under the jurisdiction of a manager of the public network 9. Lines and devices placed closer to the gateway switch device 7 with respect to the responsibility demarcation point are under the jurisdiction of a manager of the core network 6 (and the radio network 4).

Communications Method

Figure 11:
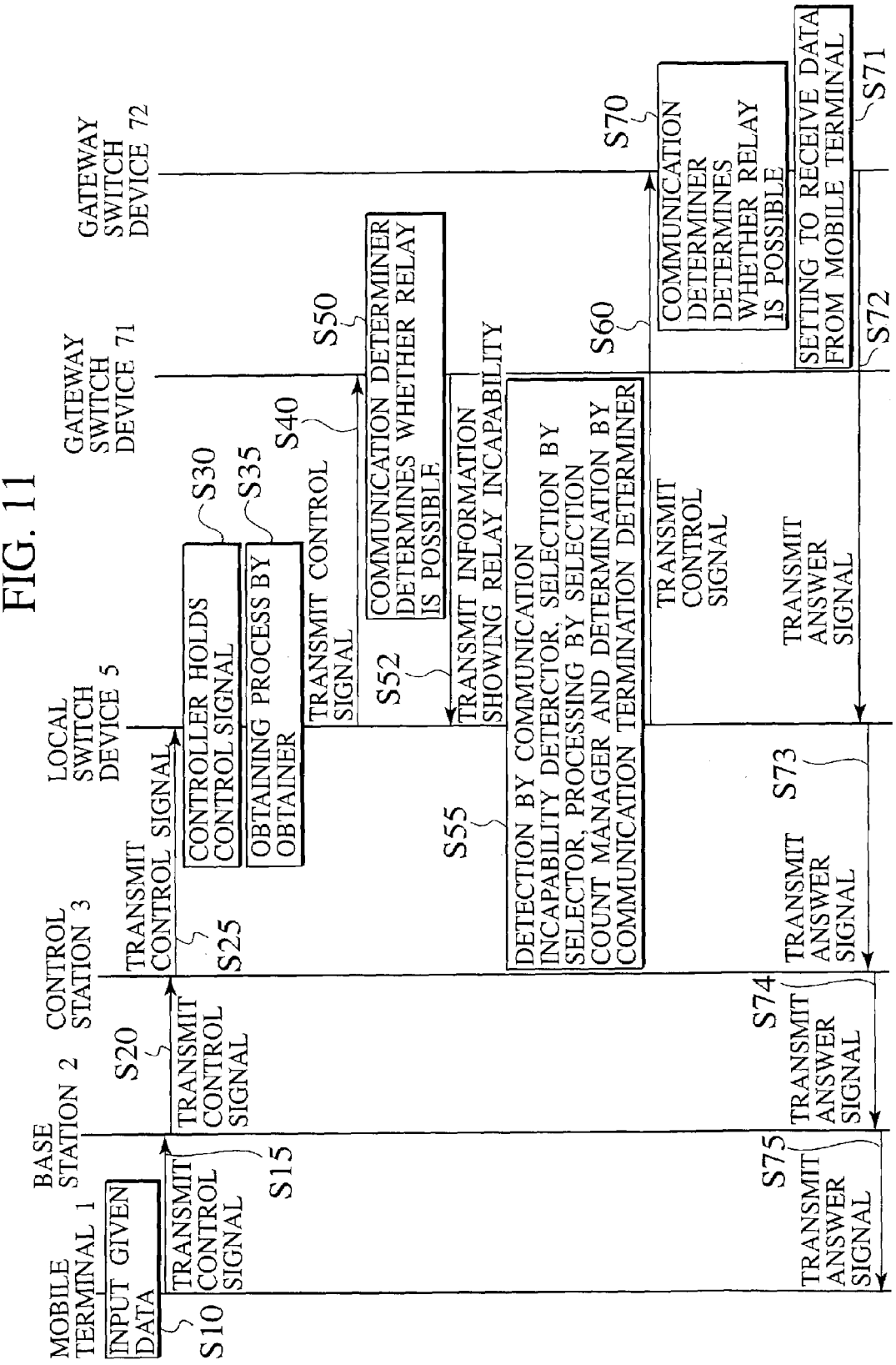
FIG. 11 is a sequence diagram illustrating a communications method using the communications system in embodiment 1.

When a first gateway switch device 7 cannot transmit data to its correspondence router 8 using the above communications system, a second gateway switch device 7 can transmit the data to its correspondence router 8. Data transmitted from a mobile terminal 1 can thus be transmitted to a given server 10. FIG. 11 is a sequence diagram illustrating a method in which when the first gateway switch device 7 cannot transmit data to its destination device 8, the second gateway switch device 7 transmits the data to its destination device 8.

The manager of the communications system uses an input (not shown) of the local switch device 5 to input information about the first correspondence table. The input information is transmitted to the controller 5i. The controller 5i generates the first correspondence table based on the input information and directs the memory 5a to store it.

(A) Establishment of a Communication Path Between a Mobile Terminal and a Gateway Switch Device In step S10, a user, using an input of a mobile terminal 1, for example, inputs the address information of a given server 10 and his or her intention of transmitting given data. The mobile terminal 1 transmits to a base station 2 a control signal for establishing a communication path between the mobile terminal 1 and a gateway switch device 7 (S15). The control signal includes the address information of the mobile terminal 1 (hereinafter referred to as source address information) and the address information of the given server 10 (hereinafter referred to as destination address information). The mobile terminal 1 stores the given data in a memory (incorporated in the mobile terminal 1), for example.

In step S20, the base station 2 receives the control signal transmitted from the mobile terminal 1. The base station 2 establishes a communication path between the base station 2 and the mobile terminal 1, for example. The base station 2 then transmits the control signal to the control station 3.

In step S25, the control station 3 receives the control signal transmitted from the base station 2. The control station 3 establishes a communication path between the control station 3 and the base station 2. The control station 3 then transmits the control signal to the local switch device 5.

In step S30, the radio network communicator 5g of the local switch device 5 receives the control signal transmitted from the control station 3 and transmits it to the controller 5i. The controller 5i holds the control signal. The controller 5i transmits the following instruction information to the radio network communicator 5g. The instruction information indicates an instruction to receive data, which is added to the address information of the mobile terminal 1 as the source address information, transmitted from the control station 3.

In S35, the controller 5i instructs the obtainer 5b to obtain the address information of a gateway switch device 7 associated with the destination address information included in the control signal. The obtainer 5b accesses the memory 5a and reads the first correspondence table from the memory 5a. The obtainer 5b then refers to the first correspondence table and obtains the address information of a gateway switch device 71 associated with the destination address information.

The obtainer 5b then transmits the address information of the gateway switch device 71 to the controller 5i. The controller 5i adds the address information of the gateway switch device 71 to the control signal it holds. The controller 5i then transmits the control signal to the gateway switch device 71 via the core network communicator 5h, based on the address information of the gateway switch device 71 (step S40).

In step S50, the control signal is transmitted via the core network communicator 7d to the communication determiner 7c. The communication determiner 7c determines whether or not the gateway switch device 71 can relay data to the correspondence router 8.

The above process will be described in detail below. The communication determiner 7c accesses the state information manager 7b and obtains information regarding the amount of free space in the memory 7a, information as to whether or not the amount of processing performed by each unit has reached the maximum amount of processing, and information as to whether or not the correspondence router 8 is faulty. The communication determiner 7c may make determination based on all these pieces of state information. The communication determiner 7c may make determination based on at least one of all these pieces of state information.

When there is a free space in the memory 7a, and/or the amount of processing performed by each unit has not reached the maximum amount of processing, and/or the correspondence router 8 is not faulty, the communication determiner 7c determines that the gateway switch device 71 can relay data to the correspondence router 8. The communication determiner 7c then transmits information showing the determination (hereinafter referred to as information showing relay capability) via the core network communicator 7d to the local switch device 5.

When there is no free space in the memory 7a, and/or the amount of processing performed by some unit has reached the maximum amount of processing, and/or the correspondence router 8 is faulty, the communication determiner 7c determines that the gateway switch device 71 cannot relay data to the correspondence router 8. The communication determiner 7c then transmits information showing the determination (hereinafter referred to as information showing relay incapability) via the core network communicator 7d to the local switch device 5 (S52). Then the process of step S55 is performed.

In step S55, information showing relay incapability is transmitted via the controller 5i to the communication incapability detector 5c. The communication incapability detector 5c detects that the gateway switch device 71 cannot relay data to the correspondence router 8, based on the information showing relay incapability. The communication incapability detector 5c transmits the detection to the controller 5i.

The controller 5i instructs the selector 5d to select a gateway switch device 7 other than the relay-incapable gateway switch device 71. Based on the instruction, the selector 5d performs a selection. Upon the selection by the selector 5d, the selection count manager 5e performs count and subtraction, and the communication suspension determiner 5f performs determination.

Figure 12:
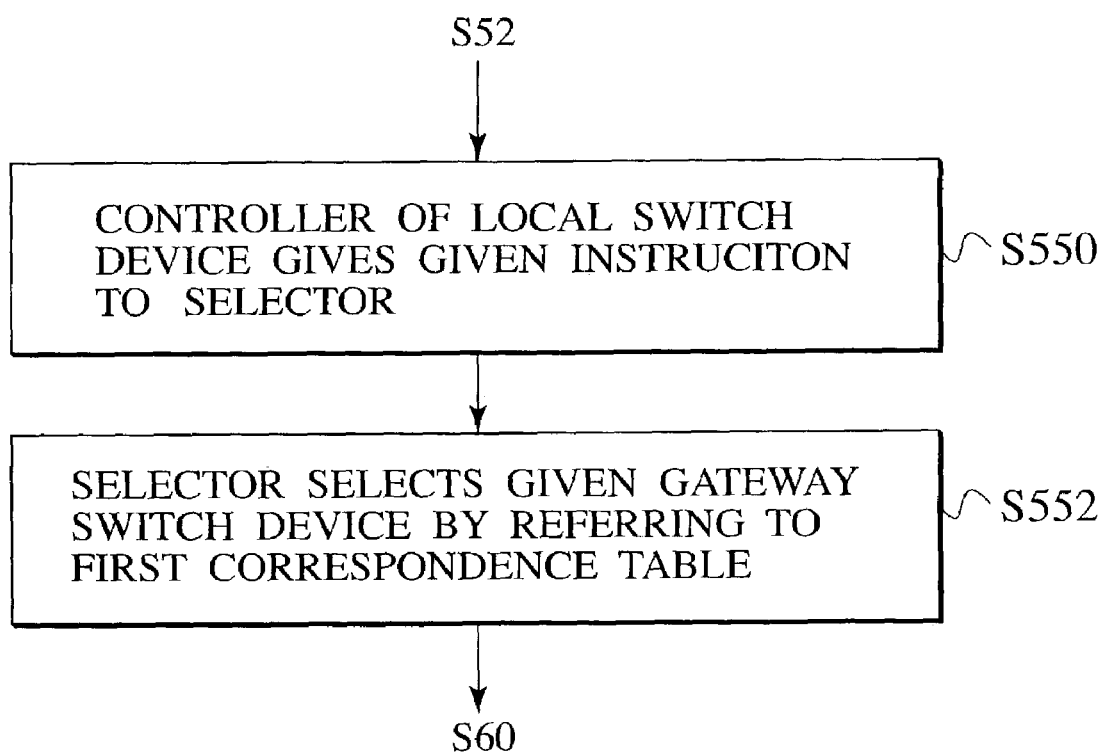
FIG. 12 is a flowchart illustrating a part of the communications method using the communications system in embodiment 1.

(a) First, the selecting process by the selector 5d will be described in detail below. FIG. 12 is a flowchart illustrating the selecting process by the selector 5d.

In step S550, the controller 5i of the local switch device 5 transmits to the selector 5d the address information of the gateway switch device 71 added to the control signal, the destination address information and the source address information. The controller 5i instructs the selector 5d to select the address information of a gateway switch device 7 other than the address information of the gateway switch device 71 (hereinafter referred to as a transmission-failed gateway switch device 71).

In step S552, the selector 5d reads the first correspondence table from the memory 5a. The selector 5d refers to the first correspondence table and performs the following process. The selector 5d selects the address information of a gateway switch device 72 instead of the transmission-failed gateway switch device 71 from among the address information of the plurality of gateway switch devices 7 associated with the destination address information.

The selector 5d associates the address information of the selected gateway switch device 72 with the source address information. The selector 5d then transmits the address information of the gateway switch device 72 to the controller 5i. The controller 5i adds the address information selected by the selector 5d to the control signal it holds. At that time, the selector 5d associates information showing the selection of the gateway switch device 72 with the source address information and the destination address information. The selector 5d then transmits the information showing the selection of the gateway switch device 72 to the selection determiner 51 of the selection count manager 5e. Then the process of step S60 is performed.

Figure 13:
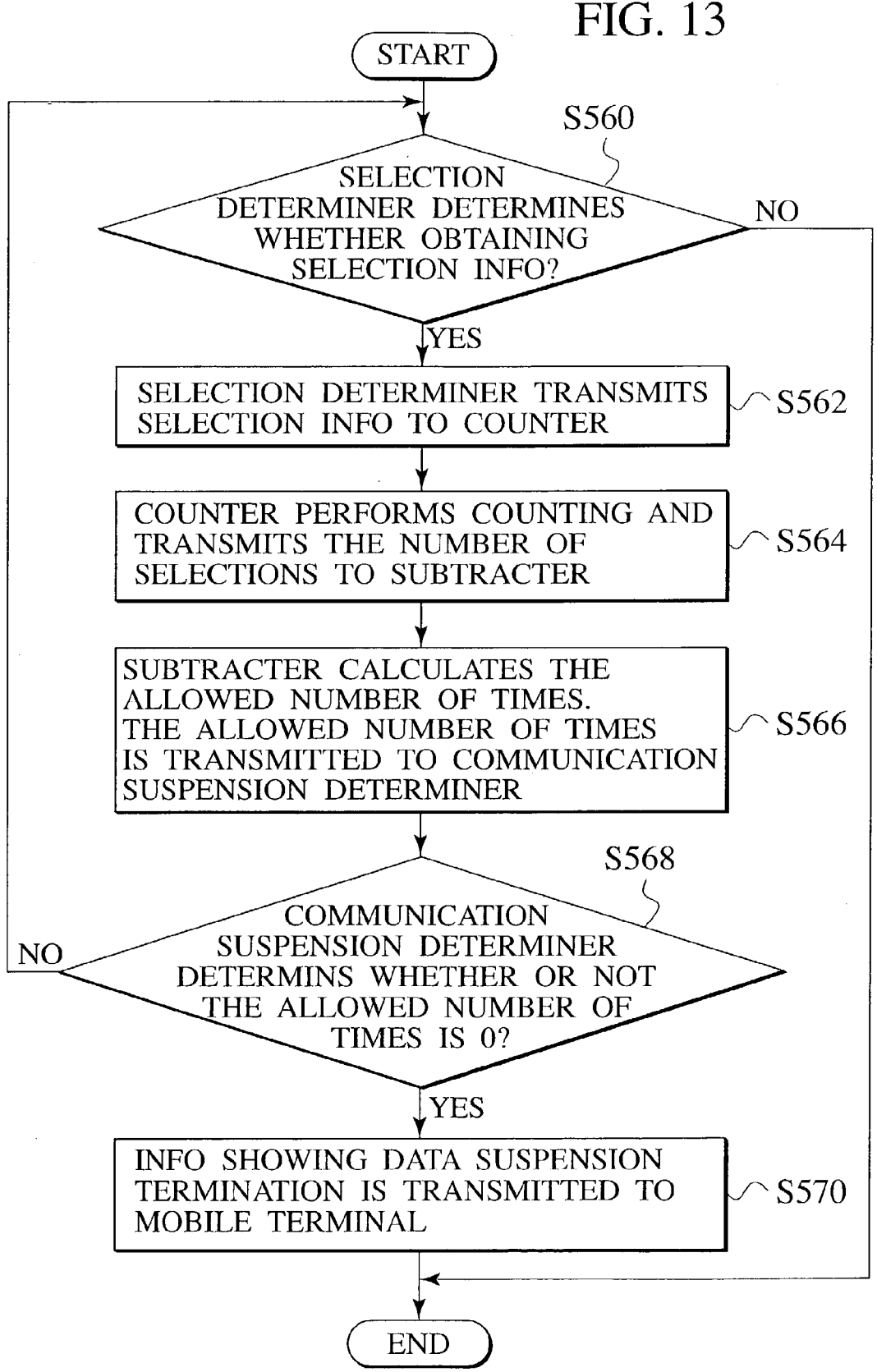
FIG. 13 is a flowchart illustrating a part of the communications method using the communications system in embodiment 1.

(b) Next, the counting and subtracting processes by the selection count manager 5e and the determining process by the communication suspension determiner 5f will be described. FIG. 13 is a flowchart illustrating these processes.

In step S560, the selection determiner 51 determines whether or not the information showing the selection of the gateway switch device 72 (hereinafter referred to as selection information) is obtained from the selector 5d. When the selection determiner 51 does not obtain the selection information, the process is terminated. When the selection determiner 51 obtains the selection information, the process of step S562 is performed.

In step S562, the selection determiner 51 associates the selection information with the destination address information and the source address information. The selection determiner 51 then transmits the selection information to the counter 52 of the selection count manager 5e. The counter 52 holds the number of times the selecting process is performed by the selector 5d (hereinafter referred to as the number of selections) for the destination address information and the source address information, respectively.

In step S564, the counter 52 performs the following process based on the received selection information. The counter 52 obtains the number of selections of the "source address information and the destination address information" associated with the selection information. The counter 52 then adds 1 to the obtained number of selections. The counter 52 then holds the resulting number of selections. The counter 52 also transmits the number of selections to the subtracter 53.

In step S566, the subtracter 53 calculates the allowed number of times, a number resulting from the subtraction of the number of selections from a predetermined number. The calculated allowed number of times is associated with the source address information and the destination address information. The allowed number of times is then transmitted to the communication suspension determiner 5f.

In step S568, the communication suspension determiner 5f determines whether or not the transmitted allowed number of times is 0. When the transmitted allowed number of times is 0, in step S570, information showing the suspension of the data transmission to the given server 10 is transmitted via the controller 5i, the control station 3 and the base station 2 to the mobile terminal 1. When the transmitted allowed number of times is not 0, the process of step S560 is performed.

In step S570, the communication suspension determiner 5f may transmit information showing the non-establishment of a communication path between the mobile terminal 1 and the gateway switch device 7 to the mobile terminal 1.

When the controller 5i of the local switch device 5 receives information showing the transmission of an answer signal (to be described later) by the controller 7f of the gateway switch device 7, the controller 5i performs the following process. The controller 5i instructs the selection count manager 5e to reset the number of selections associated with the source address information and the destination address information included in the control signal. The counter 52 of the selection count manager 5e fulfils the above instruction.

In step S60, the controller 5i of the local switch device 5 transmits the control signal to the gateway switch device 72 based on the address information of the gateway switch device 72 selected by the selector 5d.

In step S70, as in step S50, the control signal is transmitted via the core network communicator 7d to the communication determiner 7c. The communication determiner 7c determines whether or not the gateway switch device 72 can relay data to the correspondence router 8. Suppose that the communication determiner 7c determines that the gateway switch device 72 can relay data to the correspondence router 8.

In step S71, the determination by the communication determiner 7c is transmitted to the controller 7f. The controller 7f performs the following process, based on the control signal it holds. The controller 7f transmits the following instruction information to the core network communicator 7d. The instruction information indicates an instruction to receive data, which is added to the address information of the mobile terminal 1 as the source address information, transmitted from the control station 3. This process establishes a communication path between the mobile terminal 1 and the gateway switch device 72.

The controller 7f transmits an answer signal indicating the establishment of the communication path between the gateway switch device 72 and the mobile terminal 1 to the local switch device 5 (S72). The answer signal includes the destination address information (address information of the mobile terminal 1) and the source address information (address information of the gateway switch device 72).

In step S73, the answer signal is transmitted via the core network communicator 5h to the controller 5i. The controller 5i transmits the answer signal via the radio network communicator 5g to the control station 3.

The control station 3 transmits the answer signal via the base station 2 (S74) to the mobile terminal 1 (S75). The mobile terminal 1 acknowledges the establishment of the communication path between the mobile terminal 1 and the gateway switch device 72 based on the transmitted answer signal.

(B) Transmission of Data from a Mobile Terminal 1 to a Given Server 10

Figure 14:
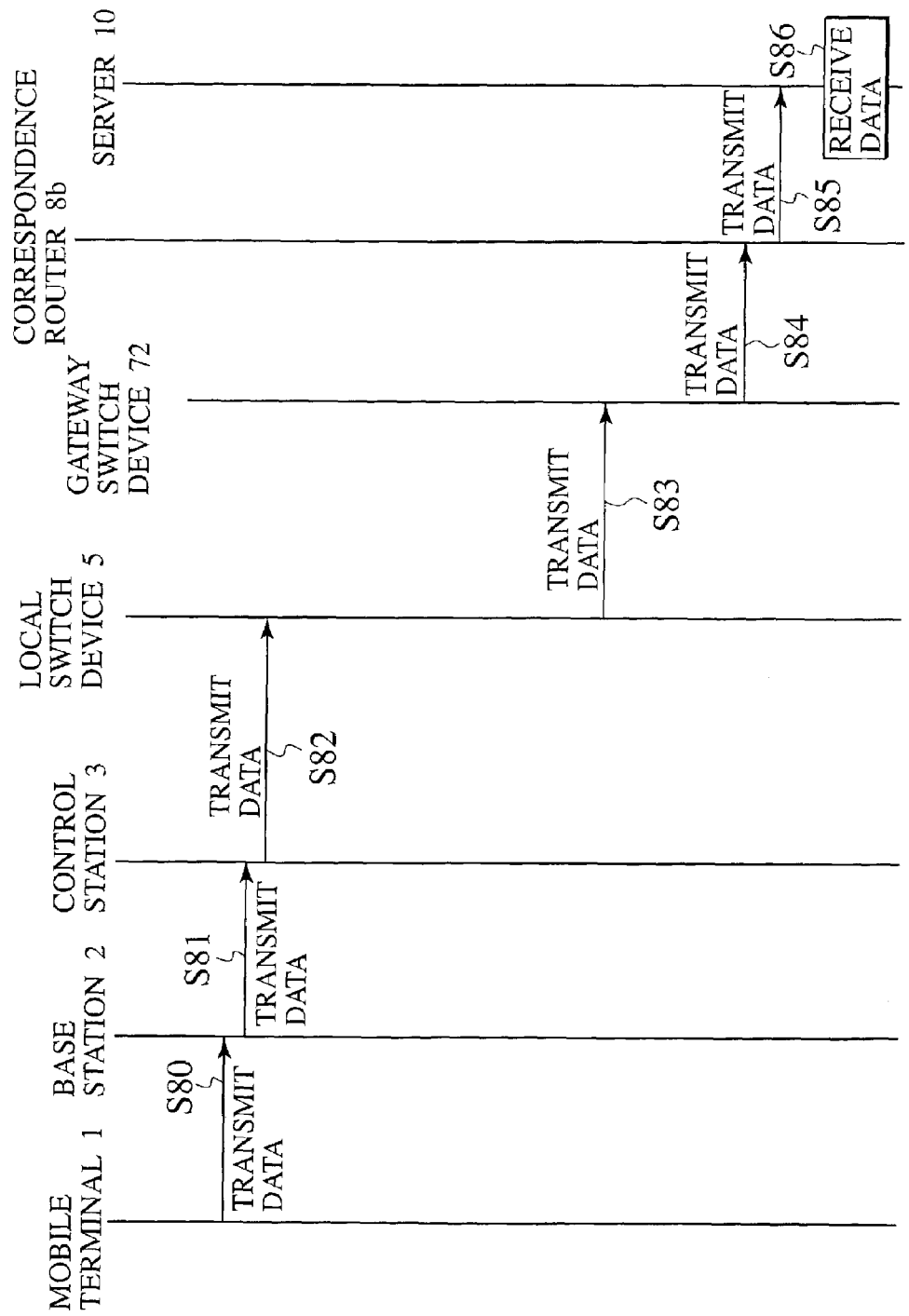
FIG. 14 is a sequence diagram illustrating the communications method using the communications system in embodiment 1.

FIG. 14 is a sequence diagram illustrating the above communications method. After step S75, the following process is performed. In step S80, the mobile terminal 1 reads given data from the memory. The mobile terminal 1 adds the destination address information (address information of the given server 10) and the source address information (address information of the mobile terminal 1) to the given data. At that time, the mobile terminal 1 adds to the given data the address information of the gateway switch device 72 included in the answer signal and instruction information for instructing the gateway switch device 72 to relay the given data. The mobile terminal 1 then transmits the data to the base station 2. The user's mobile terminal 1 is located within a service area capable of communicating with the base station 2.

In step S81, upon reception of the data transmitted from the mobile terminal 1, the base station 2 transmits the data via the radio network 4 to the control station 3. In step S82, upon reception of the data transmitted from the base station 2, the control station 3 transmits the data to the local switch device 5.

In step S83, the radio network communicator 5g of the local switch device 5 receives the data transmitted from the control station 3 and transmits it to the controller 5i. The controller 5i transmits the data to the gateway switch device 72 based on the address information of the gateway switch device 72 and the instruction information added to the data. The controller 5i performs multiplexing on the data transmitted from the control stations 3. The controller 5i transmits the data subjected to the multiplexing to the gateway switch device 72.

In step S84, the controller 7f of the gateway switch device 72 transmits (relays) the data via the public network communicator 7e to the correspondence router 8, based on the instruction information.

When the amount of processing performed by the controller 7f of the gateway switch device 72 is large, the data is temporarily stored in the memory 7a. When the amount of processing performed by the controller 7f is reduced, the controller 7f reads the data from the memory 7a. The controller 7f then transmits the data to the correspondence router 8.

In step S85, the correspondence router 8 stores the transmitted data in a memory (memory incorporated in the correspondence router 8). The correspondence router 8 then obtains the address information of a router (on the public network 9) associated with the destination address information added to the data, based on the routing table. The correspondence router 8 then reads the data from the memory. The correspondence router 8 then transmits the data to the router based on the address information.

In step S86, the process of step S85 is repeated to transmit data to the given server 10.

Functions and Effects

According to the communications system of this embodiment, the memory 5a stores the first correspondence table in which information identifying each server 10 is associated with information identifying a plurality of gateway switch devices 7. The communication incapability detector 5c detects that a gateway switch device 7 cannot relay data destined for a given server devise 10 transmitted from the mobile terminal 1 to the given server 10.

The selector 5d reads the first correspondence table from the memory 5a based on the detection by the communication incapability detector 5c (information showing that the gateway switch device 7 cannot relay data to the given server 10). The selector 5d then refers to the first correspondence table and the information identifying the given server 10 and selects a gateway switch device 7 instead of the relay-incapable gateway switch device 7 from among the plurality of gateway switch devices 7 associated with the given server 10.

Then a transmitter (core network communicator 5h) transmits the control signal to the gateway switch device 72 selected by the selector 5d to establish a communication path between the gateway switch device 72 and the mobile terminal 1. The mobile terminal 1 then transmits the data to the given server 10 via the base station 2, control station 3, local switch device 5 and selected gateway switch device 72.

As a result, when a gateway switch device 7 cannot relay to a correspondence router 8 data transmitted from the mobile terminal 1 to the given server 10, the following process is performed. The selector 5d selects a gateway switch device 7 (which can relay the data to a correspondence router 8) instead of the gateway switch device 7 which cannot relay the data to the correspondence router 8. The data is then transmitted from the mobile terminal 1 to the selected gateway switch device 7. The gateway switch device 7 can transmit (relay) the data via the correspondence router 8 to the given server 10.

According to this embodiment, when the gateway switch device 71 cannot relay the data to the correspondence router 8, the mobile terminal 1 can speedily transmit the data to the given server 10 via the gateway switch device 72.

The above configuration of the communications system prevents the application of load to a single gateway switch device 7 or a single correspondence router 8. Thus load is not applied to a single device but is distributed among plural devices, reducing load on an entire network (e.g., core network 6).

In the communications system of this embodiment, the selection count manager 5e manages the number of times the selector 5d selects a gateway switch device 7. When the number of selections reaches a predetermined number, the communication suspension determiner 5f determines the suspension of data transmission to a given server 10.

The predetermined number is determined based on a time allowed to establish a communication path between the mobile terminal 1 and the gateway switch device 7 in the communications system. When the number of selections by the selector 5d is great, the transmission of data to the given server 10 is avoided. As a result, the delay of the arrival of data at the given server 10 is prevented.

Modification 1 of Embodiment 1

In the above-described embodiment 1, after the establishment of a communication path between a mobile terminal 1 and a gateway switch device 7, the mobile terminal 1 transmits data via the gateway switch device 7 to a given server 10. In the present modification, the above-described process of establishing a communication path is not performed when a mobile terminal 1 transmits data.

Configuration

Modification 1 is different from embodiment 1 in an aspect as described below. A mobile terminal 1 transmits data to a base station 2. A user, using an input of the mobile terminal 1, inputs destination address information (address information of a given server 10) and information showing the transmission of given data. The mobile terminal 1 adds the destination address information and source address information (address information of the mobile terminal 1) to the data. The mobile terminal 1 transmits the data to the base station 2.

An obtainer 5b of a local switch device 5 obtains the data transmitted from a control station 3 and read a first correspondence table from a memory 5a. The obtainer 5b then refers to the destination address information added to the data and the first correspondence table, and obtains the address information of a gateway switch device 7 associated with the destination address information.

The obtainer 5b then transmits the data and the obtained address information of the gateway switch device 7 to a controller 5i. The controller 5i adds the address information of the gateway switch device 7 obtained by the obtainer 5b to the data.

A selector 5d transmits the data and the address information of the gateway switch device 7 added to the data to the controller 5i. The controller (rewriter) 5i rewrites the address information of the gateway switch device 7 added to the data based on the transmitted information.

A predetermined number of times is determined based on the time as follows. The time is a time allowed to establish a communication path between the mobile terminal 1 and a given server 10 in the communications system, for example.

Communications Method

Figure 15:
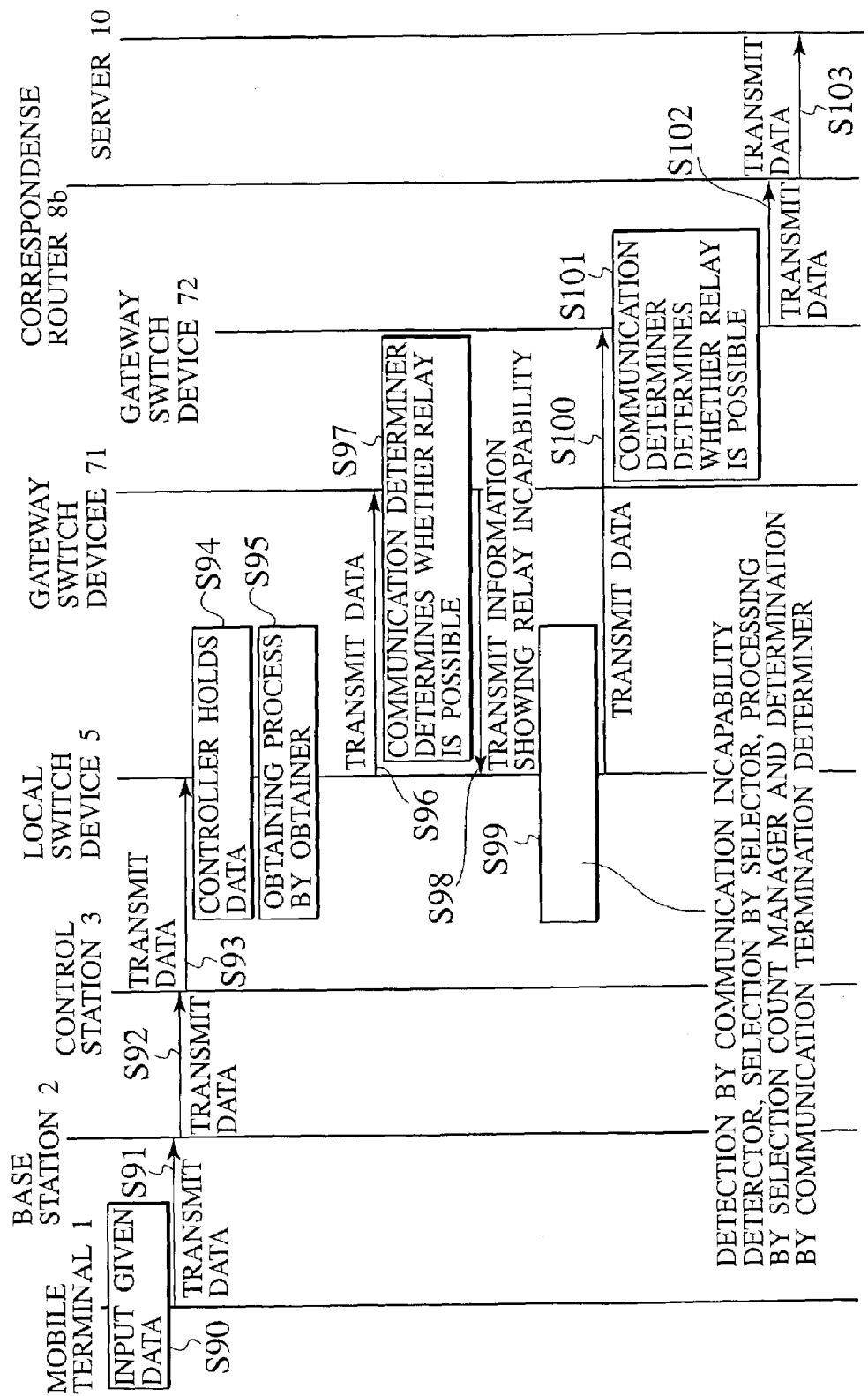
FIG. 15 is a sequence diagram illustrating a communications method using a communications system in modification 1 of embodiment 1.
Figure 16:
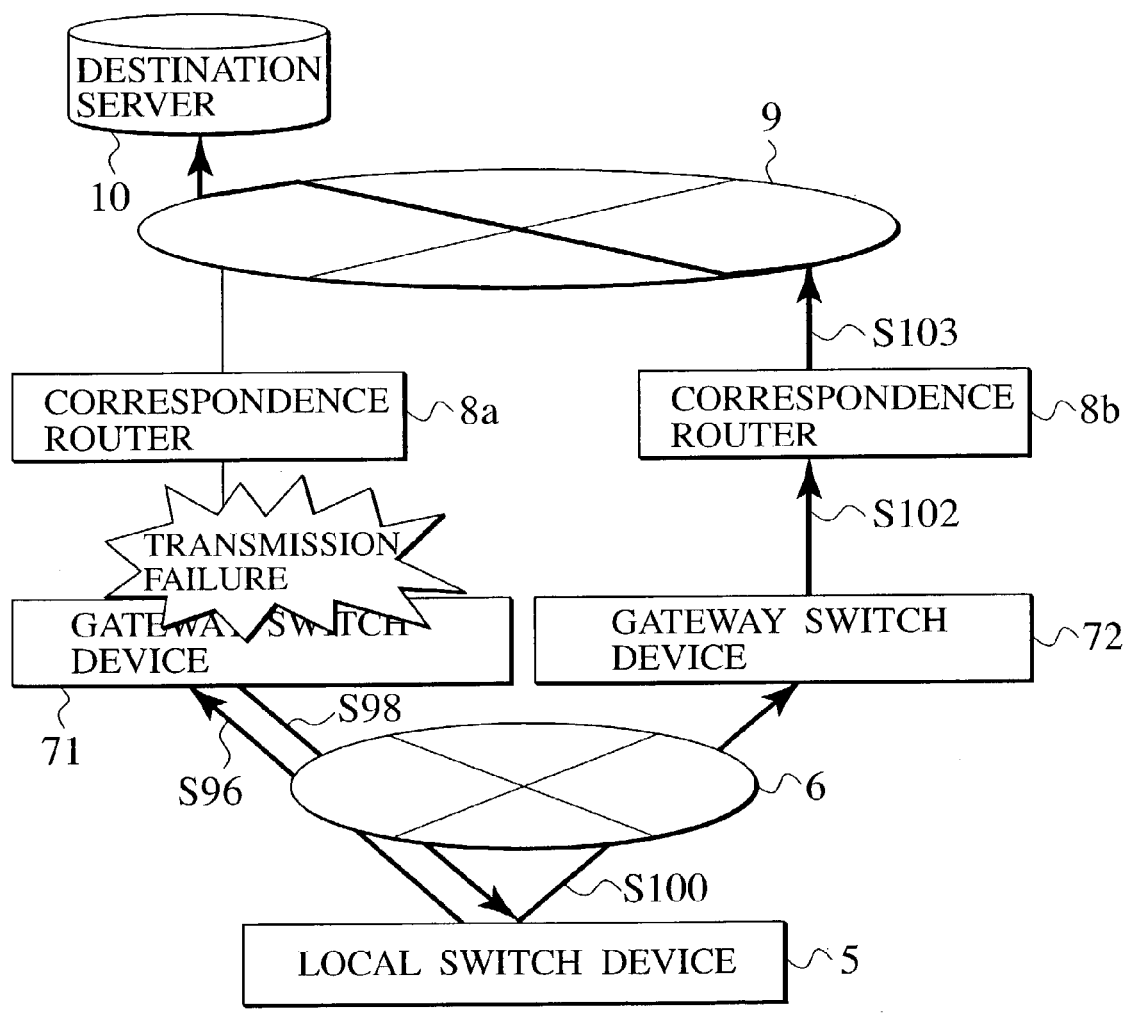
FIG. 16 is a supplementary schematic diagram for illustrating the communications method using the communications system in modification 1 of embodiment 1.

FIG. 15 is a sequence diagram illustrating a communications method according to modification 1. FIG. 16 is a schematic diagram for complementing the description of the communications methods. In FIG. 15, processes identical to those in FIG. 1 will not be described.

First, in step S90, the user inputs destination address information and information showing the transmission of given data, using an input of a mobile terminal 1. The mobile terminal 1 adds the destination address information and the source address information to the given data based on the input information. The mobile terminal 1 then transmits the data to a base station 2 by radio (step S91).

In step S92, the base station 2 receives the data transmitted from the mobile terminal 1. The base station 2 transmits the data to the control station 3 via a radio network 4. In step S93, the control station 3 receives the data transmitted from the base station 2. The control station 3 transmits the data to the local switch device 5.

In step S94, a radio network communicator 5g of the local switch device 5 receives the data transmitted from the control station 3 and transmits it to the controller 5i. The controller 5i temporarily holds the transmitted data.

In step S94, the controller 5i instructs the obtainer 5b to obtain the address information of a gateway switch device 7 associated with the destination address information included in the control signal. The obtainer 5b accesses the memory 5a and reads the first correspondence table from the memory 5a. The obtainer 5b then refers to the first correspondence table and obtains the address information of a gateway switch device 71 associated with the destination address information.

The obtainer 5b then transmits the address information of the gateway switch device 71 to the controller 5i. The controller 5i adds the address information of the gateway switch device 71 to the data it holds. The controller 5i transmits the data via the core network communicator 5h to the gateway switch device 71 based on the address information of the gateway switch device 71 (step S96).

In step S97, the data is transmitted via the core network communicator 7d to a communication determiner 7c. The communication determiner 7c determines whether or not the gateway switch device 71 can relay the data to a correspondence router 8. This process is the same as in step S50.

Suppose that the communication determiner 7c determines that the gateway switch device 71 cannot relay the data to the correspondence router 8. The communication determiner 7c then transmits the determination showing the incapability of relay via the core network communicator 7d to the local switch device 5 (S98). Then, the process of step S99 is performed.

In step S99, the determination showing the relay incapability is transmitted via the controller 5i to a communication incapability detector 5c. The communication incapability detector 5c detects that the gateway switch device 71 cannot relay the data to the correspondence router 8 based on the determination. The communication incapability detector 5c transmits the detection to the controller 5i.

The controller 5i instructs the selector 5d to select a gateway switch device 7 other than the relay-incapable gateway switch device 71. Based on the instruction, the selector 5d performs selection. Upon the selection by the selector 5d, a selection count manager 5e carries out count and subtraction processes, and a communication suspension determiner 5f carries out determination process.

Details of those processes are the same as described in step S55. However, the address information is not added to the control signal but to the data. The allowed number of times of 0 corresponds to a disconnection call.

When the controller 5i of the local switch device 5 receives information showing the transmission of an answer signal by a controller 7f of the gateway switch device 7, the controller 5i performs the following process. The controller 5i instructs the selection count manager 5e to reset the number of selections associated with the source address information and the destination address information included in the control signal. A counter 52 of the selection number manger 5e fulfils the above instruction.

In step S100, the controller 5i of the local switch device 5 transmits the data to the gateway switch device 72 based on the address information of the gateway switch device 72 selected by the selector 5d.

In step S101, the data is transmitted via the core network communicator 7d to the communication determiner 7c. The communication determiner 7c determines whether or not the gateway switch device 72 can relay the data to the correspondence router 8. Suppose that the communication determiner 7c determines that the gateway switch device 72 can relay the data to a correspondence router 8. The communication determiner 7c transmits to the local switch device 5 information showing that the gateway switch device 72 can relay the data to the correspondence router 8.

When the amount of processing performed by a controller 7f of the gateway switch device 72 is large, the data is temporarily stored in a memory 7a. When the amount of processing performed by the controller 7f is reduced, the controller 7f reads the data from the memory 7a. The controller 7f then transmits the data to the correspondence router 8 (S102). The correspondence router 8 temporarily stores the transmitted data in a memory (e.g., memory incorporated in the correspondence router 8). The correspondence router 8 then obtains the address information of a router (on the public network 9) associated with the destination address information added to the data, based on a routing table. The correspondence router 8 then reads the data from the memory. The correspondence router 8 then transmits the data to the router based on the address information.

In step S103, the process of step S102 is repeated to transmit data to the given server 10.

In this modification, when data is transmitted from a mobile terminal 1 to a given server 10, the establishment of a communication path between the mobile terminal 1 and a gateway switch device 7 is not made. A transmitter (core network communicator 5h) transmits the data to a gateway switch device 72 selected by the selector 5d. This modification provides effects identical to those in embodiment 1.

Modification 2 of Embodiment 1

When a plurality of correspondence routers 8 are connected to a single gateway switch device 7, the processes in steps S35, S40 and S102 are changed as described below. The other processes are identical to those shown in FIGS. 11 and 14.

In step S35, an obtainer 5b refers to a first correspondence table and obtains the address information of a gateway switch device 7 and the address information of a correspondence router 8 associated with destination address information included in a control signal. The obtainer 5b then transmits the address information of the gateway switch device 7 and the address information of the correspondence router 8 to a controller 5i.

In step S40, the controller 5i gives the address information of the gateway switch device 7 and the address information of the correspondence router 8 to the control signal it holds.

In step S102, a controller 7f of the gateway switch device 7 transmits the data to the correspondence router 8 based on the address information of the correspondence router 8 added to the data. Since the address information of the correspondence router 8 is included in an answer signal, the mobile terminal 1 can obtain the address information of the correspondence router 8. As a result, the data is added to the address information of the correspondence router 8.

The communication suspension determiner 5f may determine the suspension of data transmission to a given server 10 when a number of selections held by the counter 52 reaches a predetermined number. The counting method by the counter 52 is various and is not limited in this embodiment.

The communications impossibility detector 5c may perform the following detecting process. When the local switch device 5 cannot transmit data to a gateway switch device 7 because of a congested line between the local switch device 5 and the gateway switch device 7, the communication incapability detector 5c may detect the incapability of relaying data from the local switch device 5 to the gateway switch device 7.

In embodiment 1, the gateway switch device 7 has the state information manager 7b and communication determiner 7c, and the local switch device 5 has the communication incapability detector 5c, selector 5d, selection count manager 5e, communication suspension determiner 5f and obtainer 5b. The present invention is not especially limited to this configuration.

For example, the communications system may be provided with a single communications device having the functions of the state information manager 7b, communication determiner 7c, communication incapability detector 5c, selector 5d, selection count manager 5e, communication suspension determiner 5f and obtainer 5b. The communications device may have the function of receiving data transmitted from the control station 3 via the local switch device 5 and the function of transmitting the data to a gateway switch device 7.

The local switch device 5 may be the above-described communications device. The communications device may be disposed on the core network 6, for example.

In the first correspondence table, transmission failure information showing that the data transmission from a gateway switch device 7 to a correspondence router 8 is failed may be temporarily associated with the address information of the gateway switch device 7. The selector 5d may select a given gateway switch device 7 based on the transmission failure information for the selection of a gateway switch device 7.

Embodiment 2

Configuration of Local Switch Device 5

Figure 17:
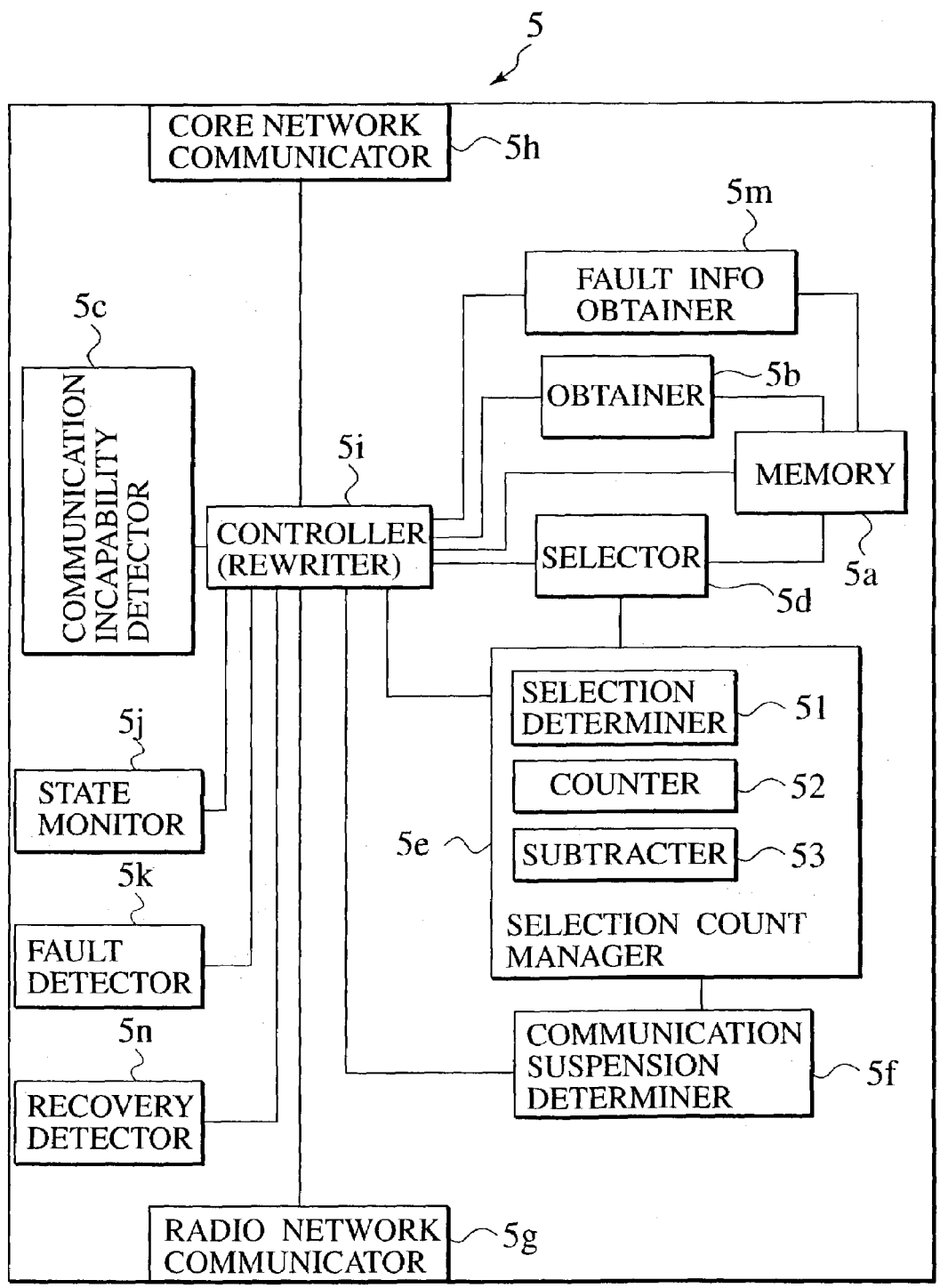
FIG. 17 is a diagram illustrating the configuration of a local switch device in embodiment 2.

FIG. 17 is a diagram illustrating the configuration of a local switch device 5 in embodiment 2. In the figure, components identical to those of the local switch device 5 in embodiment 1 are affixed identical reference numerals and will not be described.

The local switch device 5 has a state monitor 5j. When an answer signal (shown in embodiment 1) is not received within a predetermined time period from the transmission of a control signal from a controller 5i to a gateway switch device 7, the state monitor 5j conducts the following process. The state monitor 5j outputs abnormal information showing the abnormal state.

The local switch device 5 has a fault detector 5k. The fault detector 5k detects a fault in the relay of the gateway switch device 7 when obtaining the abnormal information outputted from the state monitor 5j a predetermined number of times within a predetermined time period. The fault detector 5k has a function of counting the number of times abnormal information is obtained within the predetermined time period. The address information of the gateway switch device 7 associated with the abnormal information is also transmitted, to the fault detector 5k. The fault detector 5k associates the "number of abnormal states", as the number of times abnormal information is obtained, with the address information of the gateway switch device 7. The fault detector 5k holds the number of abnormal states. The fault detector 5k incorporates a timer (not shown). The fault detector 5k can use the timer to measure time.

A memory 5a stores a second correspondence table in which the address information of servers 10, the address information of correspondence routers 8, the address information of gateway switch devices 7, and fault information showing whether or not the gateway switch devices 7 are faulty in relay are associated with one another. In the second correspondence table, the address information of each server 10 is associated with the address information of a plurality of gateway switch devices 7 and also the address information of each gateway switch device 7 is associated with fault information. FIG. 18 is a diagram exemplifying the second correspondence table.

When the fault detector 5k detects a fault in the relay of a gateway switch device 7, the controller (rewriter) 5i reads the second correspondence table from the memory 5a. The fault in the relay of the gateway switch device 7 is hereinafter referred to as a fault in the gateway switch device 7.

The controller 5i then rewrites, from the information included in the second correspondence table, the fault information for the gateway switch device 7 with a fault detected by the fault detector 5k as described below. Information showing fault presence in the relay of the gateway switch device 7 (fault information) is referred to as information showing fault presence and information showing fault absence in the relay of the gateway switch device 7 (fault information) is referred to as information showing fault absence.

When the fault information of the gateway switch device 7 is information showing fault absence, the controller 5i rewrites information showing fault absence to information showing fault presence.

The selector 5d, upon reception of data from a control station 3, reads the second correspondence table stored in the memory 5a. The selector 5d refers to the fault information of the gateway switch device 7 associated with the destination address information (address information of a given server 10) added to the data and carries out the following process. The selector 5d selects a gateway switch device 7 associated with fault information showing fault absence from among a plurality of gateway switch devices 7 associated with the destination address information.

The local switch device 5 also has a fault information obtainer 5m. The fault information obtainer 5m reads the second correspondence table stored in the memory 5a. The fault information obtainer 5m refers to the second correspondence table and obtains the address information of the gateway switch device 7 associated with the fault information showing fault presence. Based on the address information of the gateway switch device 7 obtained by the fault information obtainer 5m, the controller 5i conducts the following process to the gateway switch device 7. The controller 5i transmits a state information request showing the request for information about the state of the gateway switch device 7.

The local switch device 5 also has a recovery detector 5n. The recovery detector 5n detects a recovery from a fault indicating that the gateway switch device 7, which is associated with the fault information showing fault presence in relaying of the gateway switch device 7, has become capable of relaying data. A recovery from a fault is hereinafter referred to as a fault recovery of the gateway switch device 7. More specifically, the recovery detector 5n detects a fault recovery of a gateway switch device 7 when receiving normal state information showing a normal state from the gateway switch device 7 associated with fault information showing fault presence.

When the recovery detector 5n detects a fault recovery of a gateway switch device 7, the controller 5i (rewriter) reads the second correspondence table from the memory 5a. The controller 5i rewrites, from the information included in the second correspondence table, the fault information associated with the gateway switch device 7 to fault information showing fault absence.

Configuration of Gateway Switch Device 7

Figure 19:
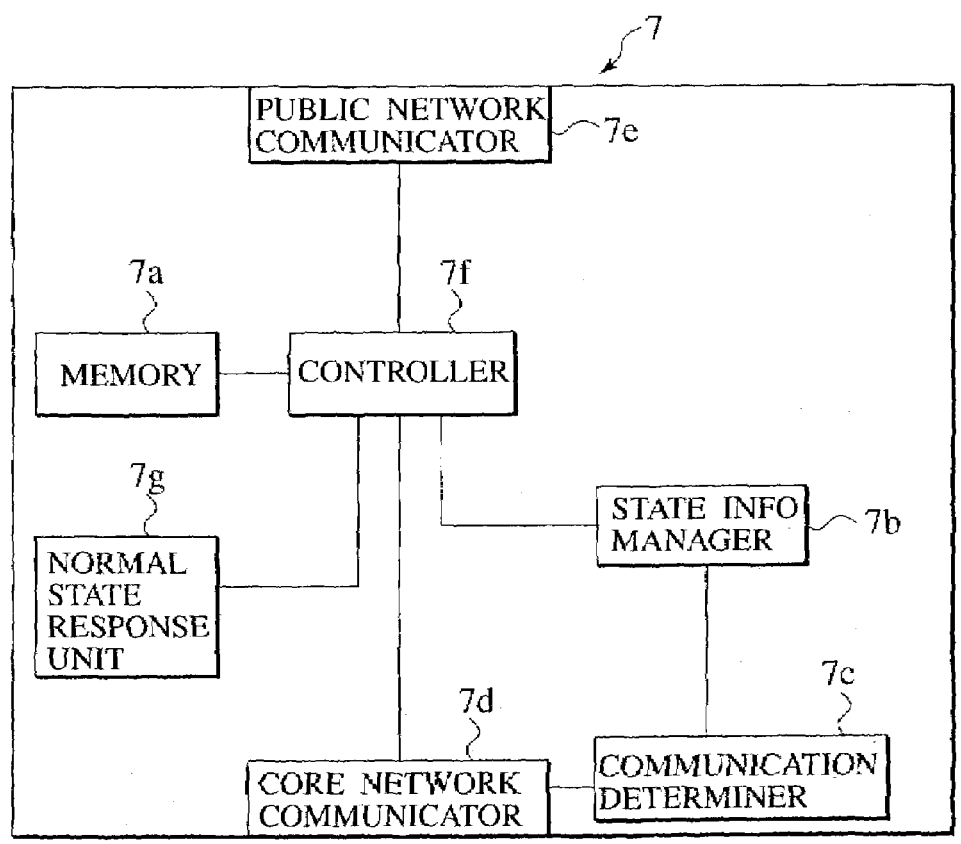
FIG. 19 is a diagram illustrating the configuration of a gateway switch device in embodiment 2.

FIG. 19 is a diagram illustrating the configuration of the gateway switch device 7 in embodiment 2. In the figure, components identical to those of the gateway switch device 7 in embodiment 1 are affixed identical reference numerals and will not be described.

The gateway switch device 7 has a normal state response unit 7g. The normal state response unit 7g performs the following process when receiving a state information request from the local switch device 5. When the gateway switch device 7 operates normally, the normal state response unit 7g transmits to the local switch device 5 normal state information showing that the gateway switch device 7 is in a normal state.

A controller 7f periodically checks the function of each unit to determine whether or not each unit is functioning normally. Upon determining that each unit is functioning normally, the controller 7f transmits the determination to the normal state response unit 7g. Based on the determination, the normal state response unit 7g determines that each unit of the gateway switch device 7 is functioning normally.

Recording Method of Fault Information

First a method of recording fault information will be described. The manager of the communications system uses an input (not shown) of the local switch device 5 to input information for the second correspondence table. The input information is transmitted to the controller 5i. Based on the input information, the controller 5i generates the second correspondence table and directs the memory 5a to store it. In the second correspondence table generated by the controller 5i, fault information associated with the address information of the gateway switch devices 7 shows fault absence at this stage.

Figure 20:
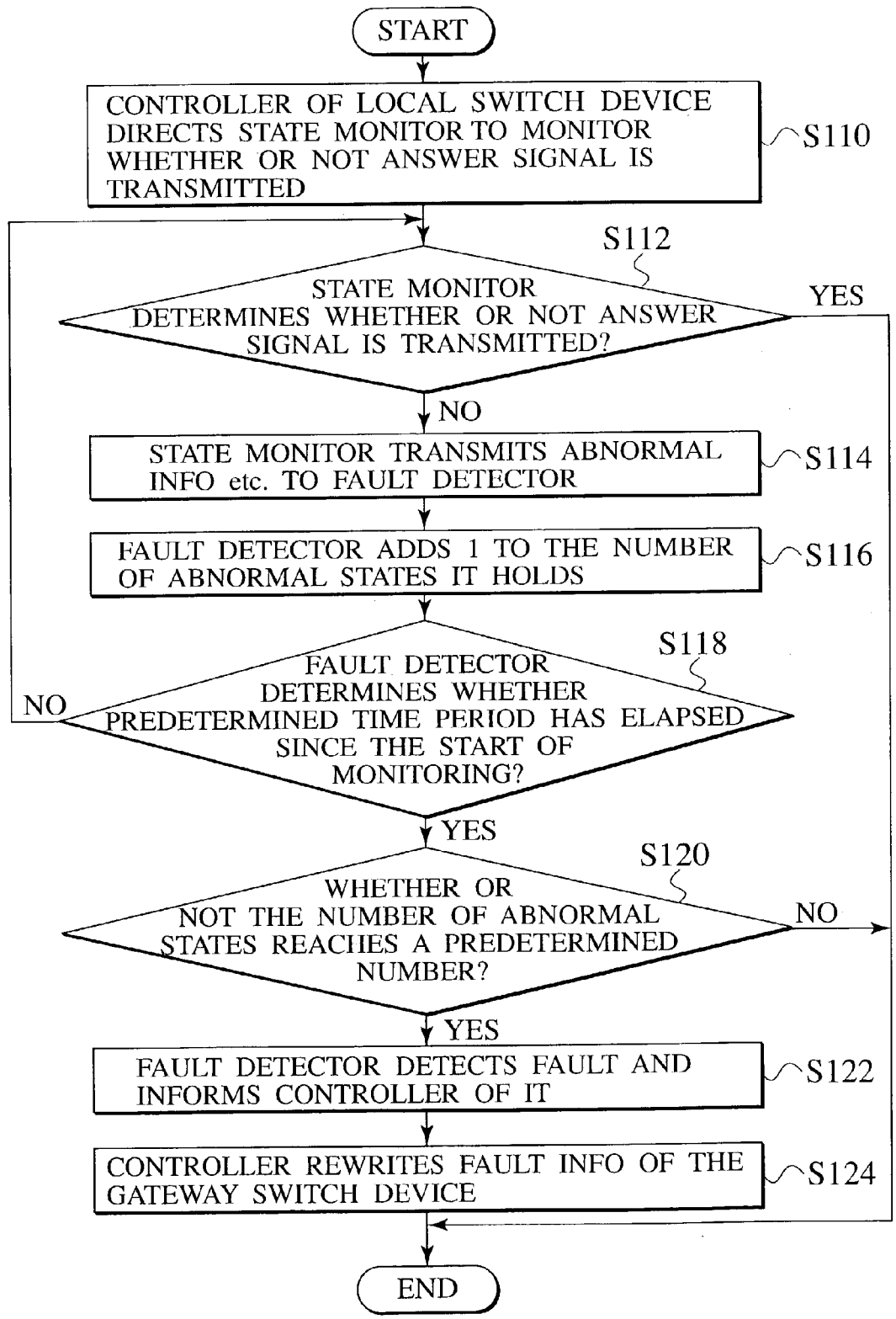
FIG. 20 is a flowchart illustrating a method of recording failure information using a communications system in embodiment 2.
Figure 21:
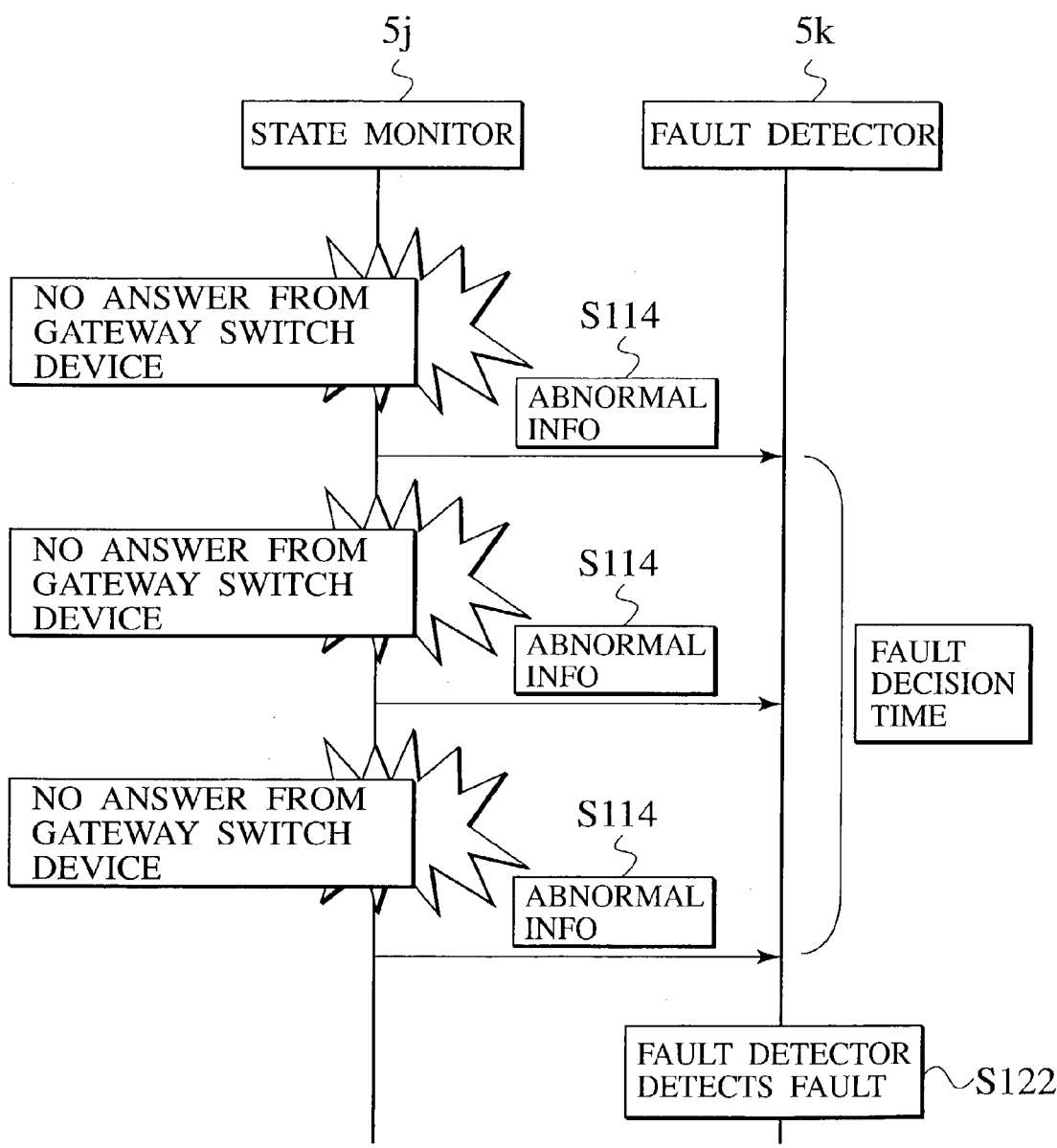
FIG. 21 is a supplementary schematic diagram for illustrating the failure information recording method using the communications system in embodiment 2.

FIG. 20 is a flowchart illustrating the recording method of fault information. FIG. 21 is a supplementary diagram illustrating the recording method of fault information.

In step S110, the controller 5i of the local switch device 5 directs the state monitor 5j to carry out the following process. The state monitor 5j monitors whether or not an answer signal is transmitted from a gateway switch device 7 within a predetermined time period from when the controller 5i transmitted a control signal to the gateway switch device 7. The predetermined time period is determined based on a time period required for the transmission of the control signal from the controller 5i to the gateway switch device 7 and a time period required for the transmission of the answer signal from the gateway switch device 7 to the controller 5i. At that time, the controller 5i transmits the address information of the gateway switch device 7 to the state monitor 5j.

In step S112, the state monitor 5j of the local switch device 5 determines whether or not the answer signal is transmitted from the gateway switch device 7 within the predetermined time period. When it is determined that the answer signal is transmitted, the process is terminated. When it is determined that no answer signal is transmitted, the process of step S114 is conducted.

In step S114, the state monitor 5j transmits abnormal information showing abnormal state and the address information of the gateway switch device 7 to the fault detector 5k. In step S116, the fault detector 5 receiving the abnormal information adds 1 to the number of abnormal states it holds. The fault detector 5k then associates the resulting number of abnormal states with the transmitted address information of the gateway switch device 7.

In step S118, the fault detector 5k determines whether or not a predetermined time period has elapsed since the state monitor 5j started monitoring. Specifically, the predetermined time period indicates a time allowed for fault determination. The predetermined time period is determined based on a time allowed to establish a communication path between the mobile terminal 1 and the gateway switch device 7, for example.

When it is determined that the predetermined time period has not elapsed, the process of step S112 is conducted. When it is determined that the predetermined time period has elapsed, the process of step S120 is conducted. In step S120, the fault detector 5k determines whether or not the number of abnormal states reaches a predetermined number. When it is determined that the number of abnormal states does not reach the predetermined number, the process is terminated. When it is determined that the number of abnormal states reaches the predetermined number, the process of step S122 is conducted.

In step S122, the fault detector 5k detects a fault in the gateway switch device 7. The fault detector 5k then sends information showing the detection of fault in the gateway switch device 7 to the controller 5i. In step S124, the controller 5i reads the second correspondence table from the memory 5a. The controller 5i rewrites, from the information included in the second correspondence table, the fault information associated with the gateway switch device 7 to fault information showing fault presence.

In the flowchart, the process of step S118 may be performed after the process of step S120. In that case, when it is determined that the number of abnormal states reaches the predetermined number in step S120, the processes in steps S122 and S124 are conducted. When it is determined that the number of normal states does not reach the predetermined number, the process of step S118 is conducted. When it is determined that the predetermined time period has not elapsed in step S118, the process of step S112 is conducted, and when it is determined that the predetermined time period has elapsed, the process is terminated.

Modification of the Recording Method of Fault Information

The state monitor 5j may monitor whether or not normal state information has been transmitted from the gateway switch device 7 within a predetermined time period from when the controller 5i transmitted the state information request to the gateway switch device 7. When not receiving the normal state information within the predetermined time period, the state monitor 5j outputs abnormal information showing an abnormal state.

In this modification, the following process is different from the process shown in FIG. 20. In step S110, the controller 5i of the local switch device 5 transmits a state information request via the core network communicator 5h to the gateway switch device 7. At that time, the controller 5i also transmits the address information of the gateway switch device 7 to the state monitor 5j. The controller 5i also directs the state monitor 5j to perform the above monitoring process.

In step S112, the state monitor 5j determines whether or not normal state information has been transmitted from the normal state response unit 7g. When it is determined that the normal state information has been transmitted, the process is terminated. When it is determined that the normal state information has not been transmitted, the process of step S114 is conducted. The other processes are identical to those shown in FIG. 14.

Method of Recording Fault Recovery

Figure 22:
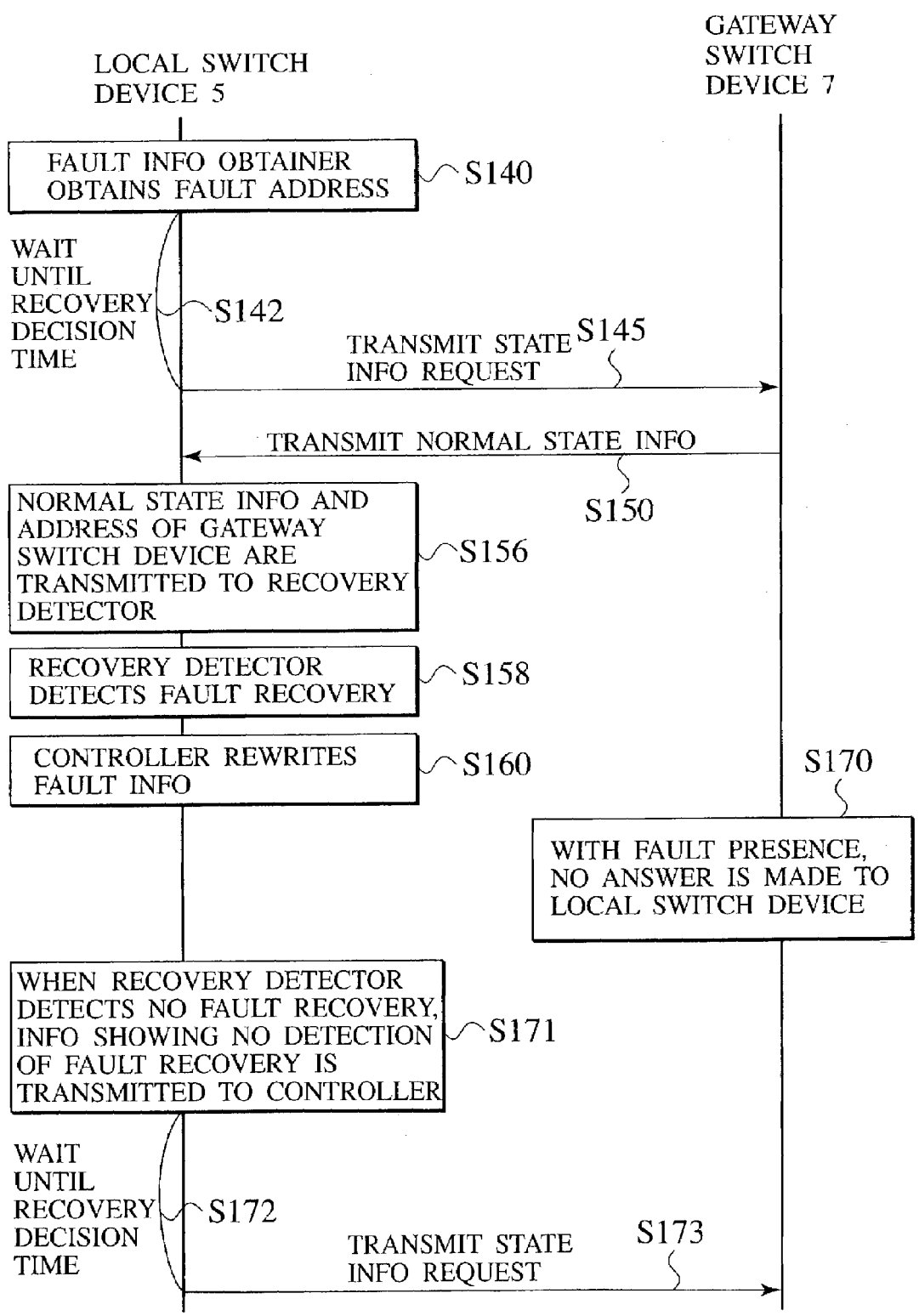
FIG. 22 is a sequence diagram illustrating a method of recording a failure recovery of the gateway switch device using the communications system in embodiment 2.

Now a method of recording a fault recovery of a gateway switch device 7 will be described. FIG. 22 is a sequence diagram illustrating the recording method.

After the process of step S124, in step S140, the fault information obtainer 5m reads the second correspondence table stored in the memory 5a. The fault information obtainer 5m then refers to the second correspondence table to obtain the address information of the gateway switch device 7 associated with the fault information showing fault presence (hereinafter referred to as fault address information). The "fault address information" obtained by the fault information obtainer 5m is transmitted to the controller 5i.

In step S142, the controller 5i obtains the rewrite time at which the fault information associated with the address information of the gateway switch device 7 was written in the second correspondence table. The controller 5i determines whether or not a predetermined time period (recovery decision time) has elapsed since the rewrite time. Upon determination that the predetermined time period has not elapsed, the controller 5i waits until the predetermined time period.

The predetermined time period is a time period between the point of occurrence of a fault and the point of recovery from the fault. The predetermined time period may be determined based on the time period between the occurrence of a fault in the gateway switch device 7 and the elimination of the fault.

In step S145, when it is determined that the predetermined time period has elapsed, the controller 5i transmits a state information request to the gateway switch device 7, based on the address information of the gateway switch device 7 as the fault address information.

The state information request is transmitted via the core network communicator 7d to the normal state response unit 7g. When the normal state response unit 7g determines that each unit of the gateway switch device 7 is functioning normally, the process of step S150 is conducted. In step S150, the normal state response unit 7g transmits normal state information via the core network communicator 7d to the local switch device 5. Thereafter, the process of step S156 is carried out.

In step S156, the normal state information and the address information of the gateway switch device 7 are transmitted via the core network communicator 5h to the recovery detector 5n. In step S158, the recovery detector 5n detects the fault recovery of the gateway switch device 7 based on the address information of the gateway switch device 7 and the normal state information. Information showing the fault recovery is transmitted to the controller 5i. The address information of the gateway switch device 7 associated with the fault recovery is transmitted, to the controller 5i.

In step S160, the controller 5i (rewriter) reads the second correspondence table from the memory 5a. The controller 5i then rewrites, from the information included in the second correspondence table, the fault information, which is associated with the address information for the gateway switch device 7 associated with the fault recovery, to the fault information showing fault absence. Then the process is terminated.

When there is a fault in the relay of the gateway switch device 7 (e.g., a failure in the gateway switch device 7), no response is made from the normal state response unit 7g to the local switch device 5 (S170). However, if the fault is not serious, the normal state response unit 7g may transmit information showing fault presence to the local switch device in step S170.

In step S171, the recovery detector 5n detects no fault recovery of the gateway switch device 7 when normal state information is not received within a predetermined time period. The recovery detector 5n then transmits information showing no detection of a fault recovery to the controller 5i. When receiving information showing the presence of a fault in the gateway switch device 7 within the predetermined time period, the recovery detector 5n also transmits information showing no detection of a fault recovery to the controller 5i. The predetermined time period is determined based on the recovery decision time, the transmission time of a state information request, the processing time of the normal state response unit 7g and the transmission time of normal state information, for example.

In step S172, the controller 5i determines whether or not the predetermined time period (recovery decision time) has elapsed since the receipt of information showing no detection of fault recovery. Upon determining that the predetermined time period has not elapsed, the controller 5i waits until the predetermined time period has elapsed.

Upon determining that the predetermined time period has elapsed, in step S173, the controller 5i transmits a state information request via the core network communicator 5h to the gateway switch device 7 corresponding to the fault address information. Then the process of step S150 or step S170 is conducted.

The recovery recording operation (S140 to S173) is performed for each gateway switch device 7. The recovery recording operations for the gateway switch devices 7 are performed concurrently.

Modification 1 of the Recovery Recording Method

The above recovery recording method may be modified as described below. The normal state response unit 7g of a gateway switch device 7 may voluntarily transmit normal state information to the local switch device 5 when determining that no faults are present in the gateway switch device 7 (e.g., each unit of the gateway switch device 7 is functioning normally). Thereafter, the processes from steps S156 to S160 may be conducted.

Modification 2 of the Recovery Recording Method

The recovery detector 5n of the local switch device 5 may perform a fault recovery detection process when predetermined data is transmitted to the controller 5i from the gateway switch device 7 which was faulty. When the gateway switch device 7 transmits the predetermined data to the controller 5i, the gateway switch device 7 is in the normal state.

When the predetermined data is transmitted from the gateway switch device 7 to the controller 5i, the controller 5i reads the second correspondence table from the memory 5a. The controller 5i compares the fault address information included in the second correspondence table with the address information of the gateway switch device 7. When agreement of the address information of the gateway switch device 7 is found with one of fault address information pieces, the controller 5i carries out the following process.

The controller 5i transmits to the recovery detector 5n information showing that the gateway switch device 7 is functioning normally. Then the processes in and after step S158 are conducted.

Method of Establishing a Communication Path and Method of Transmitting Data

The local switch device 5 relays data to the plurality of gateway switch devices 7. When a gateway switch device 7 (one of the plurality of gateway switch devices 7) has a fault in the relay, the following communications method is performed.

Figure 23:
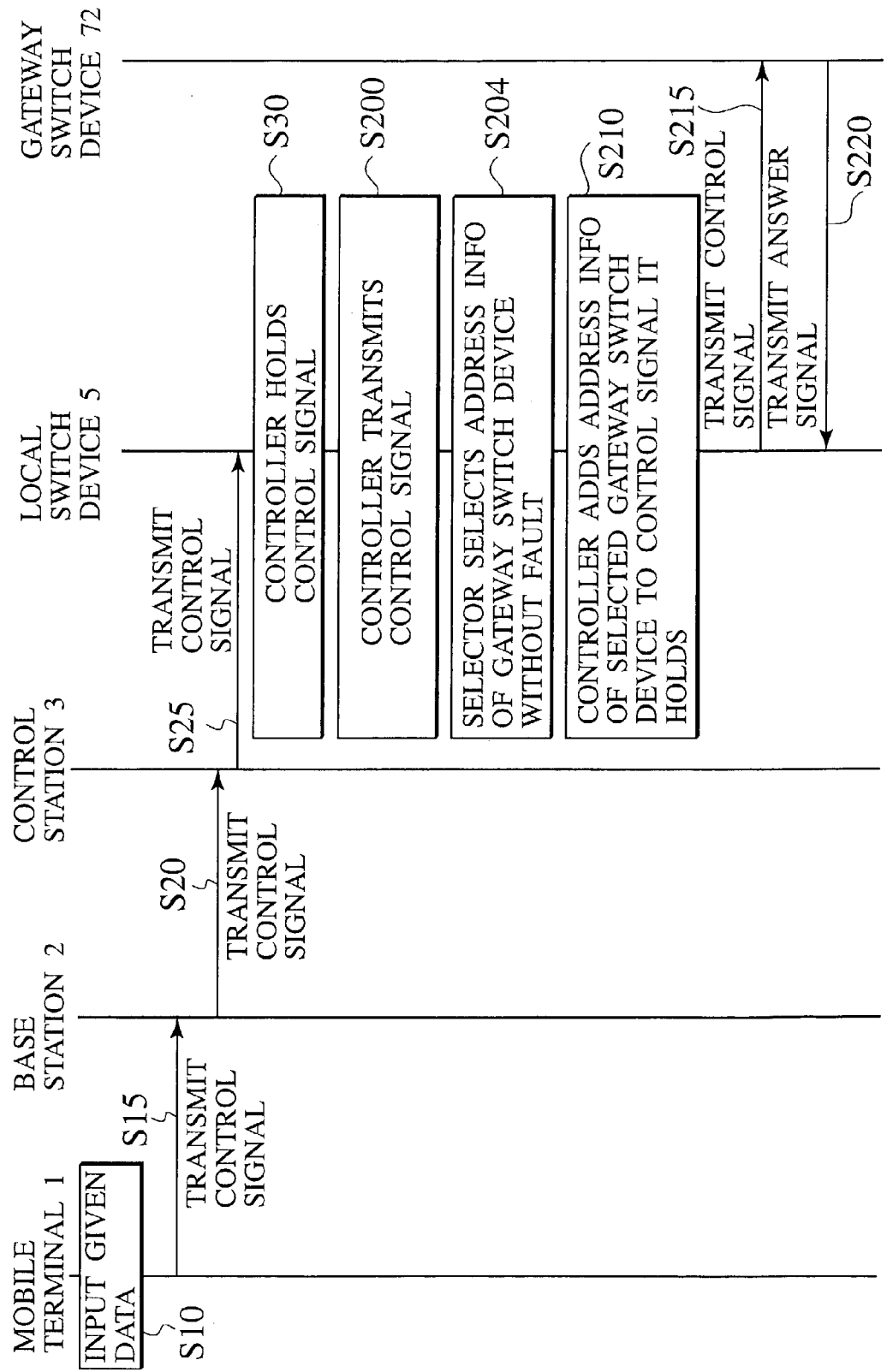
FIG. 23 is a sequence diagram illustrating a communications method using the communications system in embodiment 2.

FIG. 23 is a sequence diagram illustrating the communications method. In FIG. 23, processes identical to those in FIG. 11 are affixed identical reference numerals and will not be described.

First, the processes of steps S10 to S30 are performed. Then, in step S200, the controller 5i transmits the control signal transmitted from the control station 3 to the selector 5d. The selector 5d reads the second correspondence table from the memory 5a.

In step S204, the selector 5d searches the second correspondence table for the fault information of a gateway switch device 7 corresponding to the destination address information included in the control signal. The selector 5d selects the address information of a gateway switch device 72 associated with the fault information showing fault absence from among the address information of the plurality of gateway switch devices 7 associated with the destination address information. The selector 5d then transmits the selected address information of the gateway switch device 72 to the controller 5i.

In step S210, the controller 5i adds the address information of the gateway switch device 72 selected by the selector 5d, to the control signal it holds. In step S215, the core network communicator 5h (transmitter) transmits the control signal to the gateway switch device 72 based on the address information of the gateway switch device 72. The controller 5i also transmits the following instruction information to the radio network communicator 5g. The instruction information shows an instruction to receive data transmitted from the control station 3 when the source address information added to the data is the address information of the mobile terminal 1.

In step S220, the controller 7f of the gateway switch device 7 transmits the following instruction information to the core network communicator 7d based on the control signal. The instruction information shows an instruction to receive data transmitted from the local switch device 5 when the source address information added to the data is the address information of the mobile terminal 1.

The controller 7f transmits an answer signal (showing the establishment of a communication path between the mobile terminal 1 and the gateway switch device 72) via the core network communicator 7d to the local switch device 5. The answer signal includes the destination address information (address information of the mobile terminal 1) and the source address information (address information of the gateway switch device 72). Thereafter, the processes in and after step S73 are conducted. The data transmission process from the mobile terminal 1 to a given server 10 is performed in the same manner as in embodiment 1 (see FIG. 14).

Functions and Effects

In the communications system of embodiment 2, the second correspondence table is stored in the memory 5a. In the second correspondence table, the information identifying each server 10 (address information) is associated with information identifying a plurality of gateway switch devices 7, and the information identifying each gateway switch device 7 is associated with fault information.

The fault detector 5k detects a fault in the relay of each gateway switch device 7. When the fault detector 5k detects a fault in the relay of a given gateway switch device 7, the controller 5i (rewriter) performs the following process. The controller 5i rewrites the fault information associated with the gateway switch device 7, from the information included in the second correspondence table.

When data is transmitted from the mobile terminal 1 to a given server 10, the selector 5d refers to the second correspondence table and information identifying the given server 10 and performs the following process. The selector 5d selects a gateway switch device 7, which is associated with fault information showing fault absence, from among a plurality of gateway switch devices 7 associated with the given server 10.

The transmitter (core network communicator 5h) transmits the control signal to the gateway switch device 7 selected by the selector 5d. Thus established is a communication path between the gateway switch device 7 and the mobile terminal 1. Then the mobile terminal 1 transmits data via the base station 2, control station 3, local switch device 5 and selected gateway switch device 7 to the given server 10.

According to this embodiment, when there is a gateway switch device 7 which cannot relay data, the local switch device 5 can transmit data to a gateway switch device 7 which can relay the data. The gateway switch device 7 can thus securely relay the data to a correspondence router 8.

Further, it is prevented that data transmitted from the local switch device 5 is transmitted to a gateway switch device 7 which cannot relay the data. The delay of arrival of data at a given server 10 and the situation where data does not finally reach a given server 10 are thus securely prevented. In the communications system of this embodiment, a telephone signal transmitted from a mobile terminal 1 is securely transmitted to a given server 10, resulting in reduced call loss probability.

Embodiment 2 includes the recovery detector 5n which detects a fault recovery showing that a gateway switch device 7, which is associated with fault information showing the presence of fault in the relay, has become capable of relaying data. When the recovery detector 5n detects a fault recovery, the controller 5i reads the second correspondence table from the memory 5a. The controller (rewriter) 5i then rewrites, from the information included in the second correspondence table, the fault information of the gateway switch device 7 to fault information showing fault absence.

According to the communications system, when a mobile terminal 1 transmits data to a given server 10, a gateway switch device 7, which has become capable of relaying during the process, can thus be used. Efficient use of resources of the communications system is thus allowed.

Modification 1 of Embodiment 2

In this modification, when a mobile terminal 1 transmits data to a given server 10, the process of establishing a communication path is not performed.

Configuration

A mobile terminal 1 in this modification has the functions of the mobile terminal 1 in modification 1 of embodiment 1. A local switch device 5 in this modification has the functions of the local switch device 5 in modification 1 of embodiment 1.

Communications Method

Figure 24:
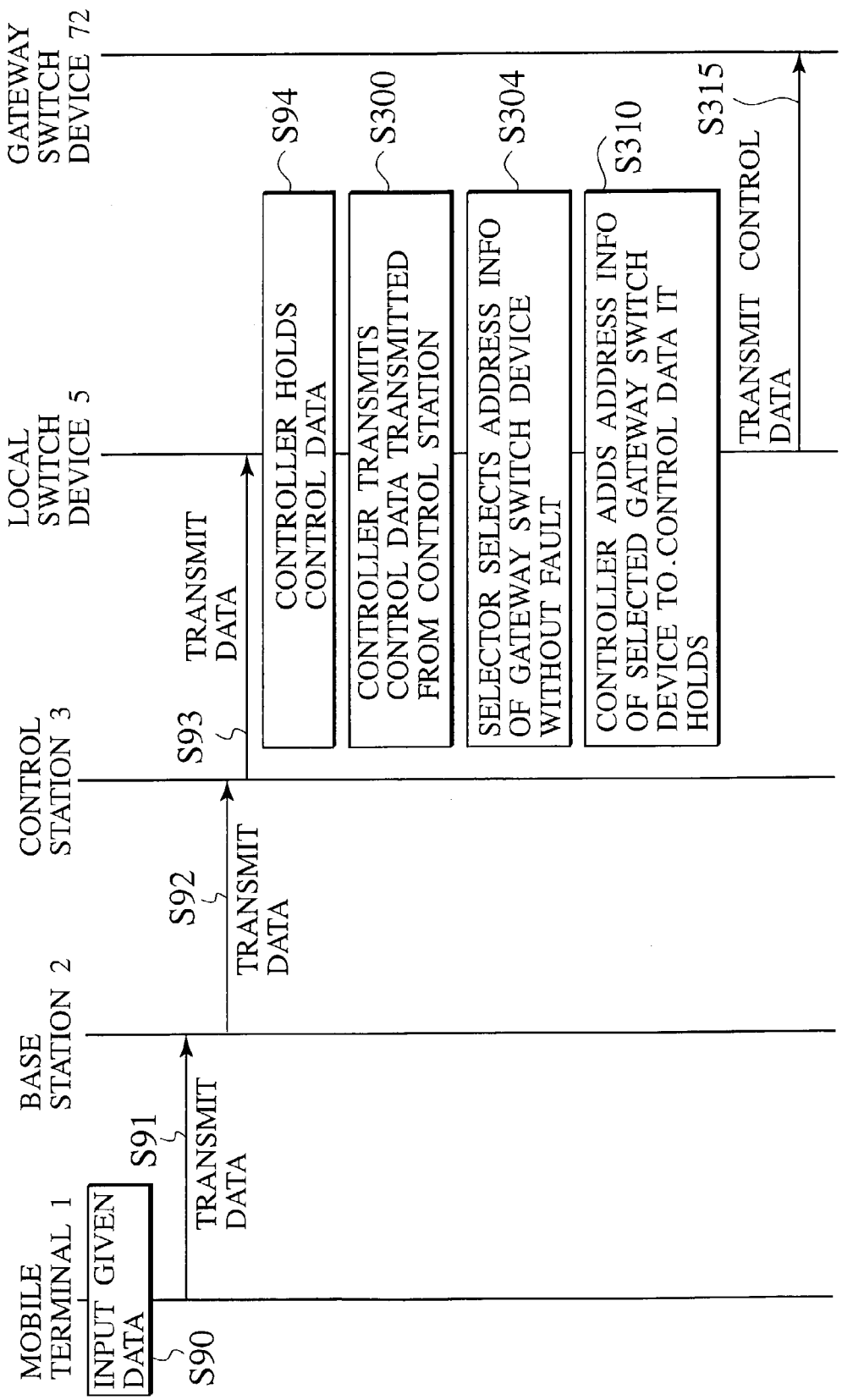
FIG. 24 is a sequence diagram illustrating a communications method using a communications system in modification 1 of embodiment 2.
Figure 25:
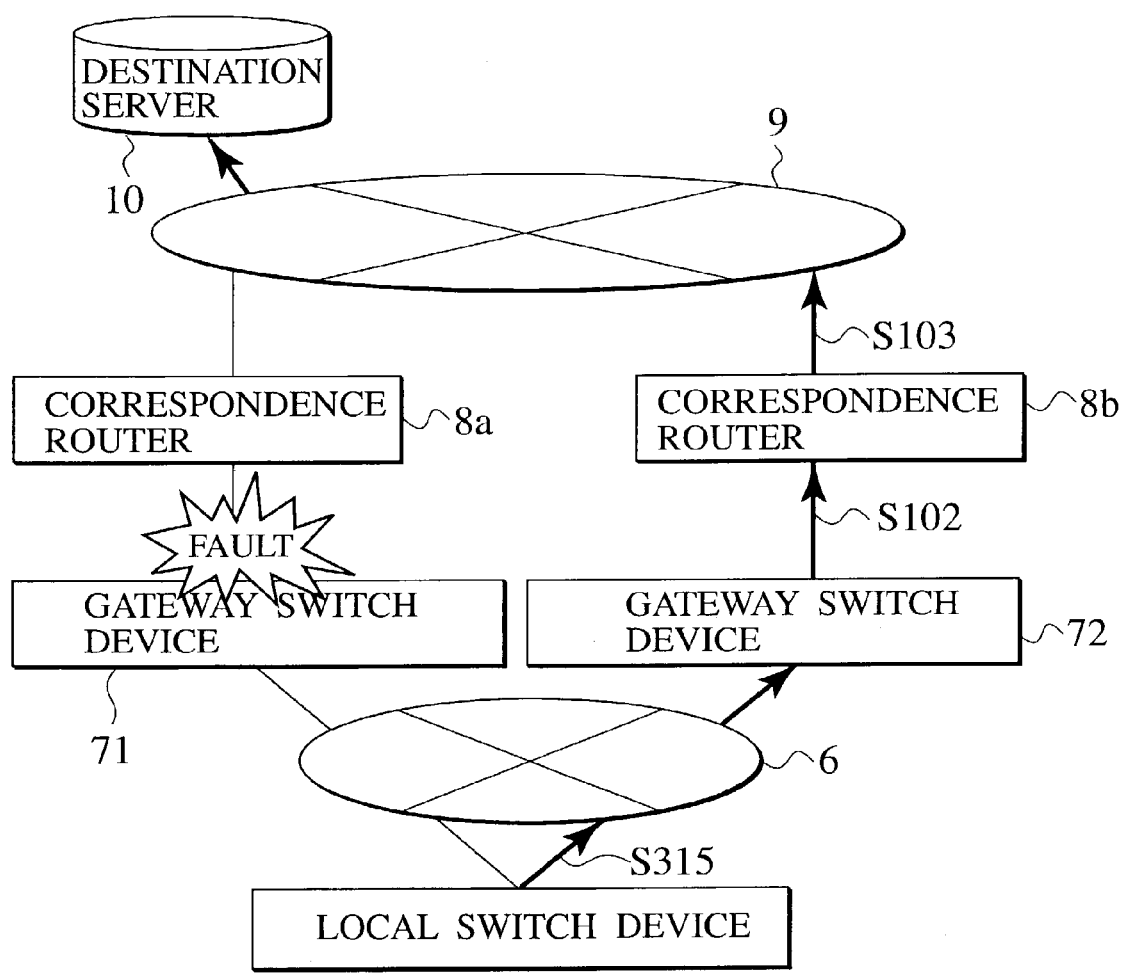
FIG. 25 is a supplementary schematic diagram for illustrating the communications method using the communications system in modification 1 of embodiment 2.

FIG. 24 is a sequence diagram illustrating a method of transmitting data from a mobile terminal 1 to a given server 10. In FIG. 24, processes identical to those in FIGS. 15 and 23 are affixed identical reference numerals and will not be described. FIG. 25 is a supplementary schematic diagram illustrating the communications method.

First, the processes in steps S90 to S94 are conducted. In step S300, the controller 5i transmits data transmitted from the control station 3 to the selector 5d. The selector 5d reads the second correspondence table from the memory 5a.

In step S304, the selector 5d searches for fault information of a gateway switch device 7 associated with the destination address information added to the data. The selector 5d selects the address information of a gateway switch device 72, which is associated with fault information showing fault absence, from among the address information of a plurality of gateway switch devices 7 associated with the destination address information. The selector 5d then transmits the selected address information of the gateway switch device 72 to the controller 5i.

In step S310, the controller 5i adds the address information of the gateway switch device 72 selected by the selector 5d, to the data it holds. In step S315, the core network communicator 5h (transmitter) transmits the data to the gateway switch device 72 based on the address information of the gateway switch device 72. Thereafter the processes in and after step S102 are conducted.

In this modification, when data is transmitted from a mobile terminal 1 to a given server 10, a communication path between the mobile terminal 1 and a gateway switch device 7 is not established. The transmitter (core network communicator 5h) transmits the data to a gateway switch device 7 selected by the selector 5d. This modification provides effects identical to those in embodiment 2.

Modification 2 of Embodiment 2

In embodiment 2, each gateway switch device 7 has the normal state response unit 7g and the local switch device 5 has the state monitor 5j, fault detector 5k, recovery detector 5n and fault information obtainer 5m. The present invention is not limited to that configuration. For example, the communications system may be provided with a single communications device having the functions of the normal state response unit 7g, state monitor 5j, fault detector 5k, recovery detector 5n and fault information obtainer 5m.

This communications device may have the function of receiving data transmitted from a control station 3 via the local switch device 5 and the function of transmitting data to a gateway switch device 7. The communications device may be disposed on the core network 6.

The communications system may be provided with a single communications device having the components of the communications device in the modification of embodiment 1 (state information manager 7b, communication determiner 7c, communication incapability detector 5c, selector 5d, selection count manager 5e, communication suspension determiner 5f and obtainer 5b) and the components of the communications device shown in the modification of embodiment 2 (normal state response unit 7g, state monitor 5j, fault detector 5k, recovery detector 5n and fault information obtainer 5m).

When there is no sufficient amount of free space in the memory 7a in embodiment 1 or when the amount of processing currently performed by each unit of the gateway switch device 7 has reached the maximum amount of processing (mild fault), embodiment 2 is also applicable.

Embodiment 3

Figure 26:
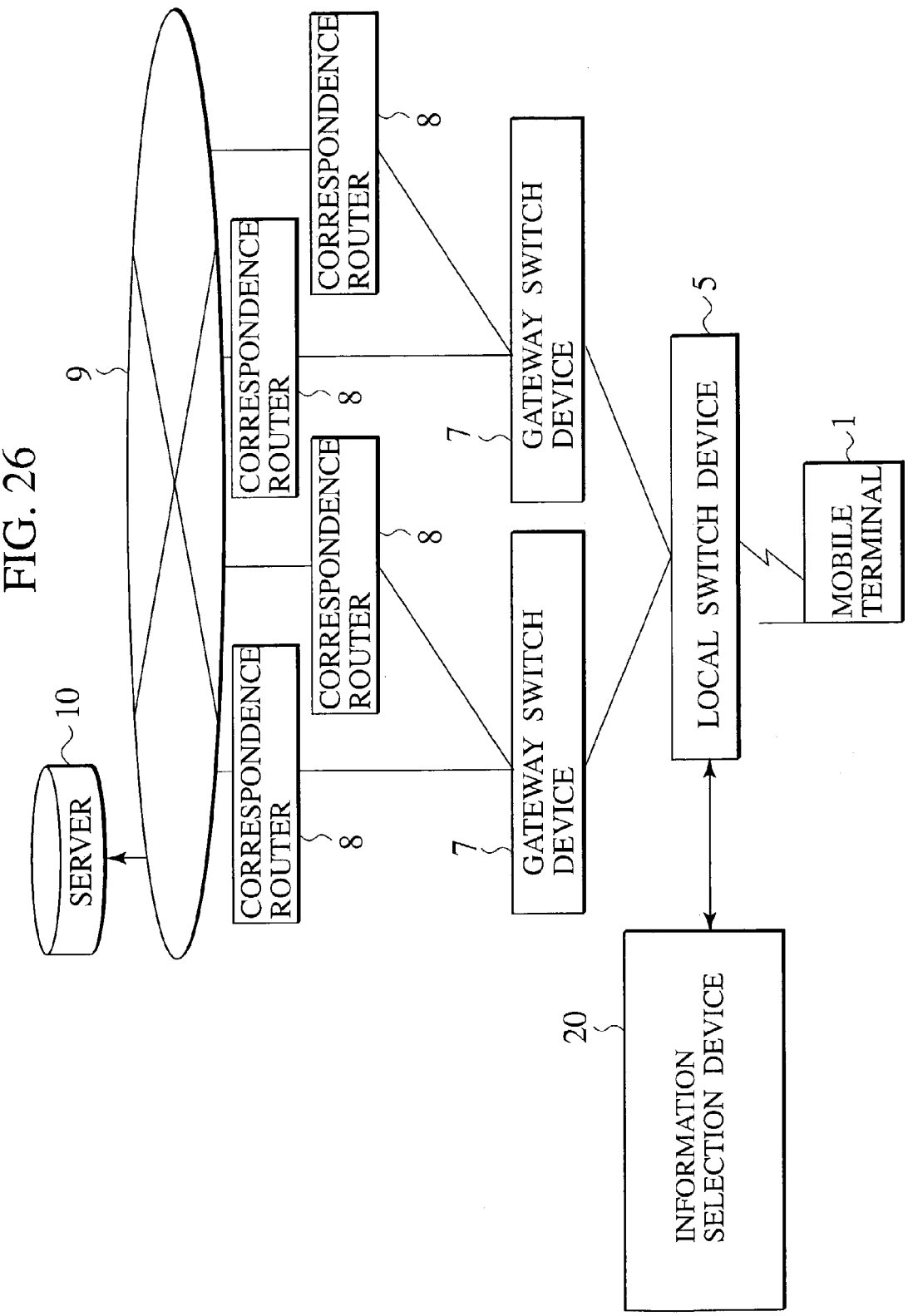
FIG. 26 is a diagram illustrating the configuration of a communications system in embodiment 3.

FIG. 26 is a diagram illustrating the configuration of a communications system in embodiment 3. In this embodiment, components identical to those shown in embodiments 1 and 2 are affixed identical reference numerals and will not be described. The communications system of this embodiment has an information selection device 20 connected to a local switch device 5. In the communications system of this embodiment, a plurality of correspondence routers 8 are connected to a single gateway switch device 7. A communicator 5g of the local switch device 5 in this embodiment conducts data communications with the information selection device 20.

Configuration of Information Selection Device 20

Figures 27, 28:
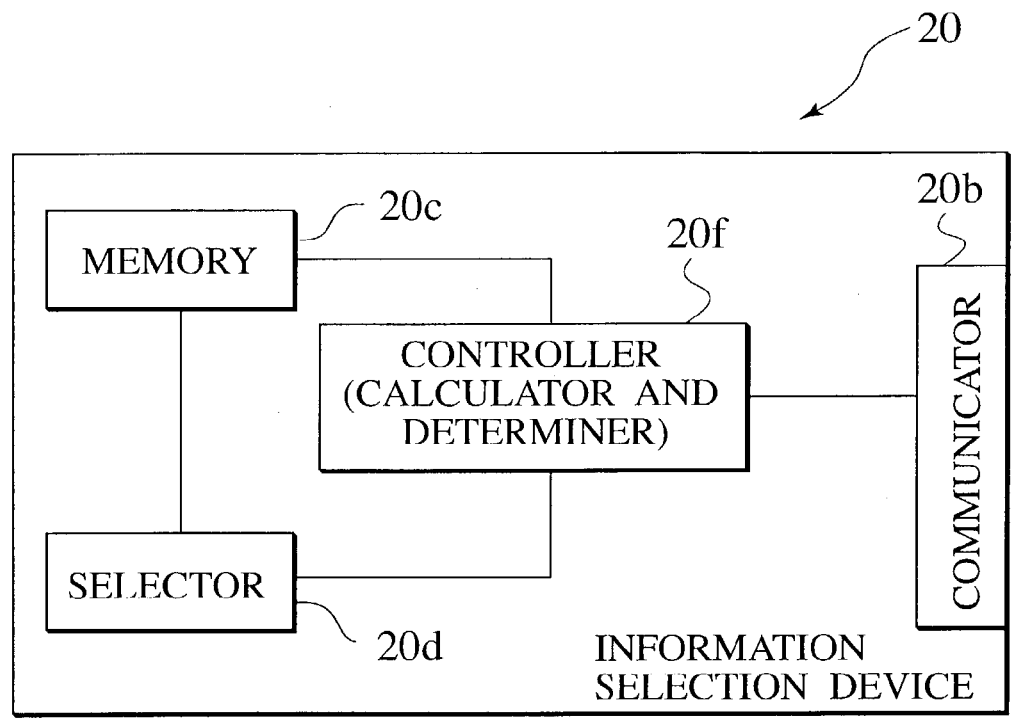
FIG. 27 is a diagram illustrating the configuration of an information selection device in embodiment 3.
FIG. 28 is a diagram exemplifying a third correspondence table stored in a memory in embodiment 3.

FIG. 27 is a diagram illustrating the configuration of the information selection device 20 in embodiment 3. The information selection device 20 has a communicator 20b for conducting data communications with the local switch device 5, a memory 20c, a selector 20d and a controller 20f for controlling those units. The controller 20f serves as a calculator and a determiner. The calculator and the determiner may be configured independently of the controller 20f.

The calculator (controller) 20f calculates, based on communication information including the amount of data processed by devices included in communication paths between the local switch device 5 and servers 10, a path communication ability which indicates communication ability in data communications using each communication path. The path communication ability is associated with a correspondence router 8 and a server 10 included in the communication path.

Details of the process by the calculator 20f will be described below. A communication path between the local switch device 5 and a server 10 includes a correspondence router 8. There are a plurality of communication paths between the local switch device 5 and the server 10. The communication paths respectively include different correspondence routers 8 and are different from one another.

The calculator 20f holds communication information. Communication information is information regarding the devices included in the communication paths, for example. The devices are, for example, the gateway switch devices 7, the correspondence routers 8, routers on a public network 9 and the servers 10. The information regarding the devices is, for example, the capacities of the memories of the devices, the data processing powers of the CPUs of the devices and the amounts of data processed by communicators in the devices.

The communication information may be information regarding lines present in the communication paths, for example. The information regarding the lines is, for example, the data transmission capacities of transmission lines present in the communication paths (e.g., transmission lines between the local switch device 5 and the gateway switch devices 7, transmission lines between the gateway switch devices 7 and the correspondence routers 8, and transmission lines between the correspondence routers 8 and the servers 10) and data traffic using the above transmission lines.

The calculator 20f calculates, based on the communication information, a path communication ability which indicates communication ability in data communication using each communication path. The path communication ability is associated with a correspondence router 8 and a server 10 included in the communication path.

The communication ability in data communication using the communication path includes, for example, data communication speed in data transmission from the local switch device 5 to the servers 10, data delay time, and data loss rate. In data transmission, the communication path is used. The data communication speed is communication ability corresponding to time necessary for a predetermined amount of data to reach the servers 10. The data loss rate is, for example, communication ability corresponding to the ratio between data amount intended to be transmitted to the servers 10 and data amount actually transmitted to the servers 10.

The calculator 20f calculates the path communication ability for a correspondence routers 8 and a server 10 included in the communication path. The calculator 20f then associates the path communication abilities with the servers 10 and the correspondence routers 8, respectively. For example, suppose the calculator 20f calculates a path communication ability a1 of a communication path between the local switch device 5 and a server v1. The communication path includes a gateway switch device s1, a correspondence router t1 and the server v1. The calculator 20f associates the path communication ability a1 with the correspondence router t1 and the server v1.

Similarly, suppose the calculator 20f calculates a path communication ability a2 of a communication path between the local switch device 5 and the server v1. The communication path includes a gateway switch device s2, a correspondence router t2 and the server v1. The calculator 20f associates the path communication ability a2 with the correspondence router t2 and the server v1. In this manner, the calculator 20f calculates the path communication abilities of a plurality of communication paths between the local switch device 5 and the servers 10.

The memory 20c stores a third correspondence table (first correspondence information). In the third correspondence table, the address information of each server 10 is associated with the address information of a plurality of correspondence routers 8. The controller 20f writes the following information in the third correspondence table. The controller 20f reads the third correspondence table stored in the memory 20c. The controller 20f then associates the path communication abilities with the address information of the servers 10 and the address information of the correspondence routers 8, based on the servers 10 and the correspondence routers 8 corresponding to the path communication abilities. Thus in the third correspondence table, the path communication abilities are associated with the address information of the servers 10 and the address information of the correspondence routers 8 respectively. FIG. 28 is a diagram exemplifying the third correspondence table with the path communication abilities written therein.

An exemplary expression of the path communication abilities is as described below (see FIG. 29). As shown in FIG. 29, path communication abilities a1 to a9 indicate the path communication abilities calculated by the calculator 20f. The third correspondence table may include path communication abilities as described below.

When there is a correspondence router 8 which is always selected by the selector 20d, the controller 20f associates the address information of the correspondence router 8 included in the third correspondence table with path communication ability a0. When there is a correspondence router 8 which is never selected by the selector 20d, the controller 20f associates the address information of the correspondence router 8 included in the third correspondence table with path communication ability a99. The controller 20f may associate the address information of a given correspondence router 8 included in the third correspondence table with path communication ability a50. The given correspondence router 8 associated with path communication ability a50 is selected by the selector 20d only in the following situation. The situation is that the selector 20d cannot select any correspondence routers 8 other than the given correspondence router 8.

The controller (determiner) 20f of the information selection device 20 has the following functions when a mobile terminal 1 transmits data to a given server 10. The controller 20f refers to the third correspondence table (first correspondence information) and determines a plurality of correspondence routers 8 associated with the given server 10.

Details of the determining process by the controller 20f is as described below. As described above, when the mobile terminal 1 transmits data to the given server 10, the mobile terminal 1 first transmits a control signal to the local switch device 5. The local switch device 5 establishes a communication path between the local switch device 5 and a control station 3.

The communicator 5g of the local switch device 5 transmits the control signal and the address information of the given server 10 to the controller 5i. The controller 5i holds the control signal and the address information of the mobile terminal 1. The controller 5i then transmits the address information of the given server 10 via the communicator 5g to the information selection device 20.

Upon reception of the address information of the given server 10, the communicator 20b of the information selection device 20 transmits it to the controller 20f. The controller 20f of the information selection device 20 reads the third correspondence table stored in the memory 20c. The controller 20f refers to the third correspondence table and determines the address information of a plurality of correspondence routers 8 associated with the address information of the given server 10.

The selector 20f compares, from among a plurality of path communication abilities associated with the given server 10, the path communication abilities respectively associated with the correspondence routers 8 determined by the controller 20f with one another. The selector 20f then selects a given correspondence router 8 from among the plurality of correspondence routers 8 based on the comparison.

Details of the selecting process by the selector 20f are described below. The selector 20d compares the path communication abilities (a1, a2) respectively associated with the address information pieces (e.g., y1, y2) of the correspondence routers 8 determined by the controller 20f with one another.

A high data transmission speed or a small data loss rate in data transmission using a communication path (data transmission from the local switch device 5 to a server 10) corresponds to a high communication ability in the data transmission. When a data transmission speed in data transmission using a communication path is high or a data loss rate is small, the value of the path communication ability corresponding to "a server 10 and a correspondence router 8" included in the communication path, is great.

A low data transmission speed or a large data loss rate in data transmission using a communication path (data transmission from the local switch device 5 to a server 10) corresponds to a low communication ability in the data transmission. When a data transmission speed in data transmission using a communication path is low or a data loss rate is large, the value of the path communication ability corresponding to "a server 10 and a correspondence router 8" included in the communication path, is small.

The selector 20*d* selects the address information (y1) of a correspondence router 8 associated with the highest path communication ability (a1 here), for example. The selector 20*d* associates the address information of the selected correspondence router 8 with the address information of the given server 10. The selector 20*d* then transmits the address information of the correspondence router 8 via the controller 20*f* to the communicator 20*b*. The communicator (provider) 20*b* transmits (provides) the address information of the selected correspondence router 8 to the controller 5*i* of the local switch device 5.

The transmitter 5*h* of the local switch device 5 transmits to the given server 10 data, which is destined for the given server 10 transmitted from the mobile terminal 1, via the given correspondence router 8 selected by the selector 20*d*.

Detailed description thereof is given below. The controller 5*i* of the local switch device 5 reads a first correspondence table from the memory 5*a*. The controller 5*i* refers to the first correspondence table and obtains the address information of a gateway switch device 7 associated with the address information of the correspondence router 8 selected by the selector 20*d*.

The controller 5*i* then transmits the control signal and the address information of the selected correspondence router 8 to the gateway switch device 7 based on the address information of the gateway switch device 7. Then, as described above, a communication path between the gateway switch device 7 and the local switch device 5 is established.

The controller 7*f* of the gateway switch device 7 transmits the control signal to the correspondence router 8 based on the address information of the selected correspondence router 8. The correspondence router 8 is set to receive data transmitted from the gateway switch device 7. Thus a communication path between the gateway switch device 7 and the correspondence router 8 is established.

An answer signal transmitted from the correspondence router 8 (a signal showing the establishment of the communication path between the mobile terminal 1 and the correspondence router 8) is received by the controller 5*i* of the local switch device 5. The controller 5*i* transmits the answer signal via the communicator 5*g* and the control station 3 to the mobile terminal 1. The answer signal includes the address information of the gateway switch device 7 and the address information of the correspondence router 8 selected by the selector 20*d*. Thus the communication path between the mobile terminal 1 and the correspondence router 8 is established.

The mobile terminal 1 then transmits data destined for the given server 10 to the communicator 5*g* of the local switch device 5. The data is added to the address information of the given server 10, the address information of the gateway switch device 7 included in the answer signal, the address information of the correspondence router 8 selected by the selector 20*d*, and given instruction information. The given instruction information shows an instruction to transmit the data via the gateway switch device 7 and the correspondence router 8 to the given server 10.

The communicator (transmitter) 5*h* of the local switch device 5 transmits the data to the gateway switch device 7 based on the instruction information added to the data. The gateway switch device 7 transmits the data to the correspondence router 8, based on the instruction information. The correspondence router 8 transmits the data to the given server 10.

Communications Method

Calculating Method and Writing Method

The description of the communications method using the communications system of the above configuration will be given below. FIG. 30 is a flowchart illustrating the calculating process by the calculator 20*f* and the process of writing the correspondence table by the controller 20*f* of this embodiment.

First, the calculator (controller) 20*f* calculates, based on the communication information, a path communication ability which indicates communication ability in data communication using each communication path. The path communication ability is associated with a correspondence router 8 and a server 10 included in the communication path(S400). The calculator 20*f* then transmits the path communication abilities to the controller 20*f*.

The controller 20*f* reads the third correspondence table stored in the memory 20*c*. The controller 20*f* then writes the following information in the third correspondence table. The controller 20*f* associates, based on the servers 10 and the correspondence routers 8 associated with the path communication abilities, the path communication abilities with the address information of the servers 10 and the address information of the routers 8 (S401). The address information of the servers 10 and the address information of the routers 8 are included in the third correspondence table.

Data Transmission Method

The description of a method of transmitting data from a mobile terminal 1 to a given router 10 will be given below. FIG. 31 is a flowchart illustrating a communications method for establishment of a communication path between the mobile terminal land a correspondence router 8. In FIG. 31, processes identical to those in the sequence diagram shown in FIG. 11 are affixed identical reference numerals and will not be described, and similar processes are affixed identical reference numerals and will be described only in terms of difference.

First, the processes of steps S10 to S30 are conducted. In step S15, a mobile terminal 1 transmits to the base station 2 a control signal for establishment of a communication path between the mobile terminal 1 and a correspondence router 8. The other processes are identical to those described in embodiment 1.

The controller 5*i* of the local switch device 5 transmits the address information of a given server 10 included in the control signal (destination address information) via the communicator 5*g* to the information selection device 20. The controller 5*i* holds the address information of the mobile terminal 1 included in the control signal.

The address information of the given server 10 is transmitted via the communicator 20*b* of the information selection device 20 to the controller 20*f*. The controller (determiner) 20*f* of the information selection device 20 reads the third correspondence table stored in the memory 20*c*. The controller 20*f* refers to the third correspondence table and determines the address information of a plurality of correspondence routers 8 associated with the address information of the given server 10 (S410). The controller (determiner) 20*f* then transmits the determined address information of the correspondence routers 8 to the selector 20*d*.

The selector 20*d* of the information selection device 20 refers to the third correspondence table and compares path communication abilities respectively associated with the address information pieces of the plurality of correspondence routers 8 with one another. The selector 20*d* selects the address information of a given router 8 associated with the highest path communication ability from among the address information of the plurality of correspondence routers 8, for example (S411). The selector 20*d* associates the address information of the given correspondence router 8 with the address information of the given server 10. The selector 20*d* then transmits the address information of the given correspondence router 8 via the controller 20*f* to the communicator 20*b*. The communicator 20*b* transmits (provides) the address information of the given correspondence router 8 to the controller 5*i* of the local switch device 5.

The controller 5*i* reads the first correspondence table from the memory 20*c*. The controller 5*i* refers to the first correspondence table and obtains the address information of a gateway switch device 7 associated with the address information of the given correspondence router 8 (S412). The controller 5*i* then transmits, based on the obtained address information of the gateway switch device 7, the control signal via the communicator 5*h* to the controller 7*f* of the gateway switch device 7 (S413). At that time, the controller 5*i* adds to the control signal the address information of the correspondence router 8 selected by the selector 20*d* and the address information of the mobile terminal 1.

Based on the transmitted control signal, the controller 7*f* of the gateway switch device 7 transmits the following instruction information to the communicator 7*d*. The instruction information shows an instruction to receive data transmitted from the local switch device 5 when the source address information added to the data is the address information of the mobile terminal 1.

The controller 7*f* of the gateway switch device 7 transmits, based on the address information of the correspondence router 8 added to the control signal, the control signal to the correspondence router 8 (S415).

Based on the received control signal, the correspondence router 8 carries out the following process. The correspondence router 8 is set to receive data transmitted from the gateway switch device 7 when the source address information added to the data is the address information of the mobile terminal 1. Thus a communication path between the mobile terminal 1 and the correspondence router 8 is established (S416).

The correspondence router 8 transmits an answer signal showing the establishment of the communication path between the correspondence router 8 and the mobile terminal 1 to the gateway switch device 7 (S417). The answer signal includes the destination address information (address information of the mobile terminal 1) and the source address information (address information of the correspondence router 8 selected by the selector 20*d*).

The answer signal is transmitted via the communicator 7*e* of the gateway switch device 7 to the controller 7*f*. The controller 7*f* adds the address information of the gateway switch device 7 to the answer signal. The controller 7*f* transmits the answer signal via the communicator 7*d* to the local switch device 5 (S418).

Figure 5:
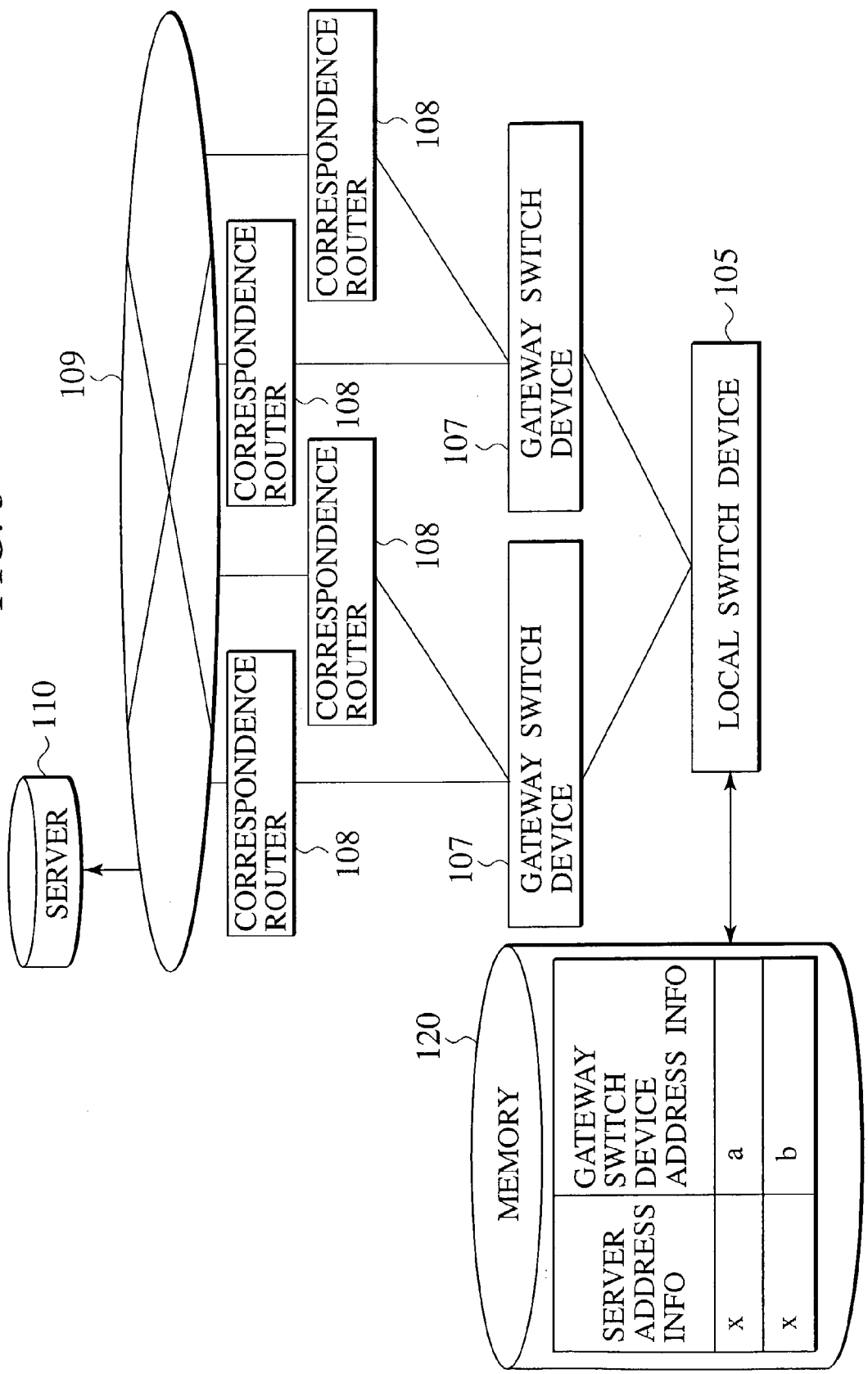
FIG. 5 is a schematic diagram for illustrating the problem of the communications system of the first conventional art.
Figure 6:
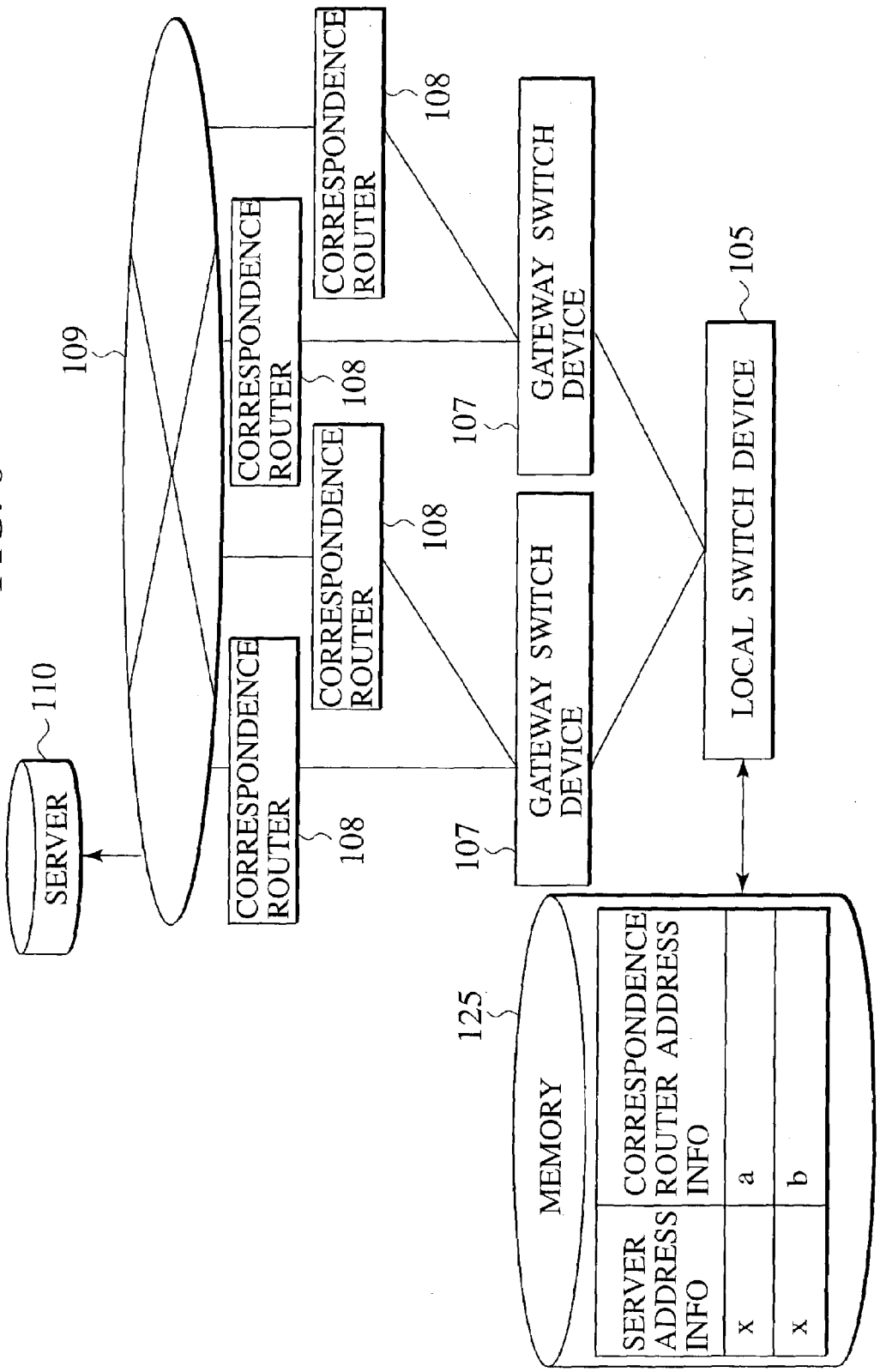
FIG. 6 is a schematic diagram for illustrating the configuration of a communications system of the second conventional art.

Thereafter the processes in steps S73 to S75 shown in FIG. 5 are conducted. In step S75, the mobile terminal 1 acknowledges the establishment of the communication path between the mobile terminal 1 and the correspondence router 8 based on the received answer signal.

Next, the process of data transmission from the mobile terminal 1 to the given server 10 is conducted (processes from S80 to S86 shown in FIG. 14). In step S80, the mobile terminal 1 adds to the given data the address information of the gateway switch device 7 included in the answer signal, the address information of the correspondence router 8 selected by the selector 20*d*, and instruction information showing an instruction to transmit the data via the gateway switch device 7 and the correspondence router 8 to the given server 10.

In step S83, the transmitter 5*h* of the local switch device 5 transmits to the gateway switch device 7 the data destined for the given server 10 transmitted from the mobile terminal 1. In step S84, the controller 7*f* of the gateway switch device 7 transmits, based on the instruction information and the address information of the correspondence router 8 selected by the selector 20*d* added to the given data, the data to the correspondence router 8. The correspondence router 8 transmits the data to the given server 10.

Functions and Effects

When a mobile terminal 1 transmits data to a given server 10, the selector 20*d* compares, from among a plurality of path communication abilities associated with the given server 10, path communication abilities respectively associated with a plurality of correspondence routers 8 (associated with the given server 10) to one another. Based on the comparison, the selector 20*d* can select a correspondence router 8 associated with the highest path communication ability from among the plurality of correspondence routers 8, for example.

When data is transmitted from the local switch device 5 via the selected correspondence router 8 to the given server 10, the communication ability in data transmission from the mobile terminal 1 to the given server deice 10 is increased. As a result, in the data transmission from the mobile terminal 1 to the given server 10, the delay of arrival of data at the given server 10 and a large data loss rate are prevented, for example. This embodiment thus allows the ease of congestion on the network and the prevention of congestion on a device included in the network.

The communications system in this embodiment also prevents the application of further load to a device under large processing load or the application of no load to a device under small processing load. The appropriate distribution of processing load to devices and lines is thus performed.

Modification 1

In embodiment 3 described above, a communication path is first established between a mobile terminal 1 and a correspondence router 8, and then the mobile terminal 1 transmits data via the correspondence router 8 to a given server 10. In this modification, when a mobile terminal 1 transmits data to a given server 10, the communication path establishment process is not performed.

The operation of this modification will be described with reference to the sequence diagram shown in FIG. 15 and the flowchart shown in FIG. 31. Processes identical to those shown in FIGS. 15 and 31 will not be described and similar processes will be described in terms of difference.

First, the processes of steps S90 to S94 are conducted. Then the processes of steps S410 to S412 are conducted. The controller 5*i* of the local switch device 5 transmits the data to the controller 7*f* of the gateway switch device 7 via the communicator 5*h* based on the obtained address information of the gateway switch device 7. At that time, the controller 7*f* adds to the data the address information of the correspondence router 8 selected by the selector 20*d*.

The controller 7*f* of the gateway switch device 7 transmits the data to the correspondence router 8 based on the address information of the correspondence router 8 added to the data. Thereafter, the correspondence router 8 transmits the data via routers on the public network 9 to the given server 10. The communications system in this modification also provides the effects of embodiment 3.

Modification 2

The above-described communications system of embodiment 3 may be modified as described below. In this modification, components and functions identical to those shown in embodiments 1 and 3 will not be described and only the differences will be described.

Configuration

The communication incapability detector 5c has the following function. The communication incapability detector 5c detects that a given gateway switch device 7 cannot relay data, which is destined for a given server 10 transmitted from a mobile terminal 1, to a given correspondence router 8 selected by the selector 20d. The given gateway switch device 7 is connected to the given correspondence router 8.

Detailed description is given below. A control signal including the address information of the correspondence router 8 selected by the selector 20d, is transmitted to a communication determiner 7c of the gateway switch device. At that time, the controller 5i of the local switch device 5 holds the address information of the given server 10 included in the control signal.

When the communication determiner 7c determines that the gateway switch device 7 cannot relay data to the correspondence router 8, the communication determiner 7c adds to the determination the address information of the correspondence router 8. The communication determiner 7c transmits the determination to the communication incapability detector 5c. Based on the determination, the communication incapability detector 5c detects that the given gateway switch device 7 cannot relay data to the correspondence router 8.

The detection by the communication incapability detector 5c is transmitted together with the address information of the selected correspondence router 8 to the controller 5i of the local switch device 5. The controller 5i transmits to the selector 20d of the information selection device 20 the detection, the address information of the selected correspondence router 8 (hereinafter referred to as a previously-selected correspondence router 8) and the address information of the given server 10.

The selector 20d of the information selection device 20 selects, based on the path communication abilities respectively corresponding to a plurality of correspondence routers 8 determined by the determiner 20f, as a given correspondence router 8, a correspondence router 8 other than the previously-selected correspondence router 8 from among the plurality of correspondence routers 8.

Detailed description of the selecting process by the selector 20d is given below. The detection, the address information of the previously-selected correspondence router 8 and the address information of the given server 10 are transmitted to the selector 20d. The selector 20d refers to the third correspondence table stored in the memory 20c and obtains the address information of the plurality of correspondence routers 8 associated with the address information of the given server 10 (e.g., x1 in FIG. 28).

The selector 20d determines the address information (y2, y3 . . . ) of the plurality of correspondence routers 8 other than the address information (y1) of the previously-selected given correspondence router 8 from among the address information of the plurality of correspondence routers 8 (y1, y2 . . . ).

The selector 20d then refers to the third correspondence table and compares the path communication abilities (a2, a3 . . . ) respectively associated with the address information pieces of the correspondence routers 8 (y2, y3 . . . ) with one another. The selector 20d selects the address information of a correspondence router 8 (y2) associated with the highest path communication ability (a2) from among the address information of the plurality of correspondence routers 8. The selector 20d transmits the address information of the selected correspondence router 8 (y2) via the communicator 20b to the local switch device 5.

Figure 32:
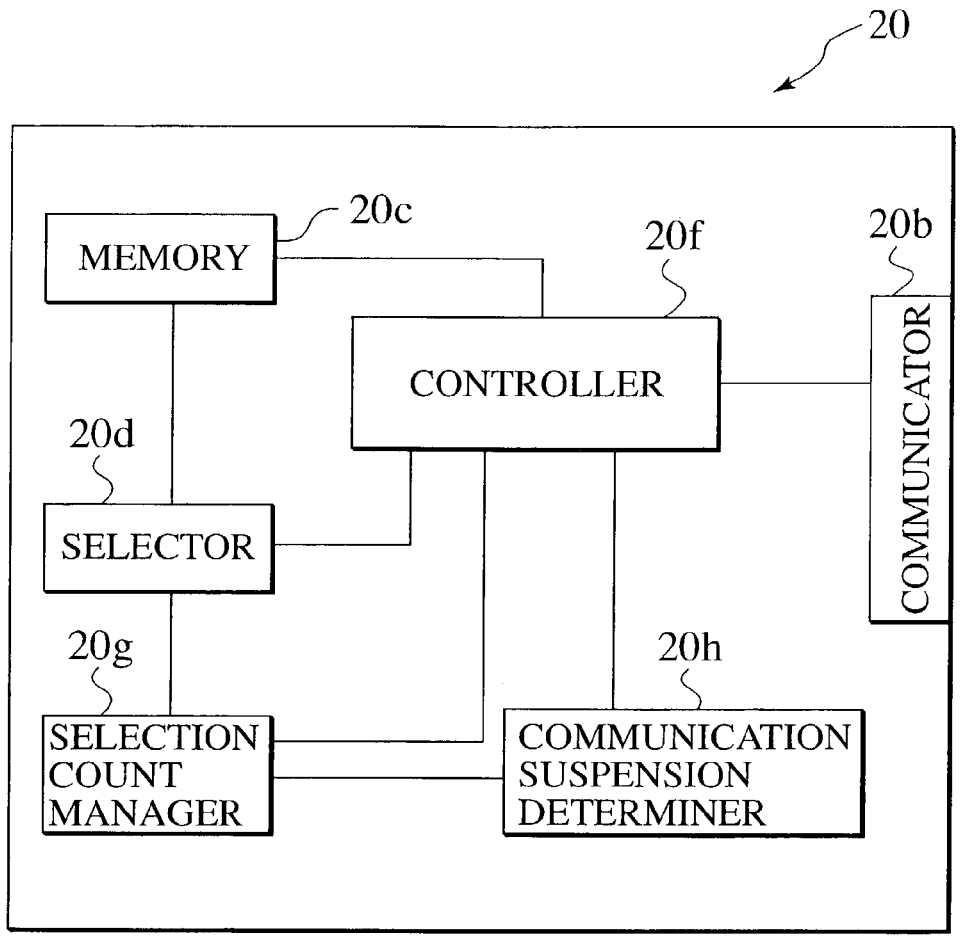
FIG. 32 is a diagram illustrating the configuration of an information selection device in modification 2 of embodiment 3.

The information selection device 20 in this modification has a selection count manager 20g and a communication suspension determiner 20h in addition to the components in embodiment 3 (see FIG. 32).

The selection count manager 20g manages the number of times that the selector 20d selects a correspondence router 8. The function of the selection count manager 20g is identical to the function of the selection count manager 5e shown in embodiment 1 except for the following. The selection count manager 20g manages the numbers of times that the address information of the correspondence router devises 8 is selected by the selector 20d for the address information of the server 10 and the source address information, respectively. The selection count manager 20g has the function of each unit shown in embodiment 1 (selection determiner 51, counter 52 and subtracter 53).

When the number of selections reaches a predetermined number, the communication suspension determiner 20h determines the suspension of the data transmission to the given server 10. For example, when the allowed number of times calculated by the subtracter (selection count manager 20g) is 0, the communication suspension determiner 20h carries out the following process. The communication suspension determiner 20h transmits to the mobile terminal 1 information showing the suspension of the data transmission to the given server 10. In place of the local switch device 5, the information selection device 20 may have the communication incapability detector 5c.

Communications Method

Figure 33:
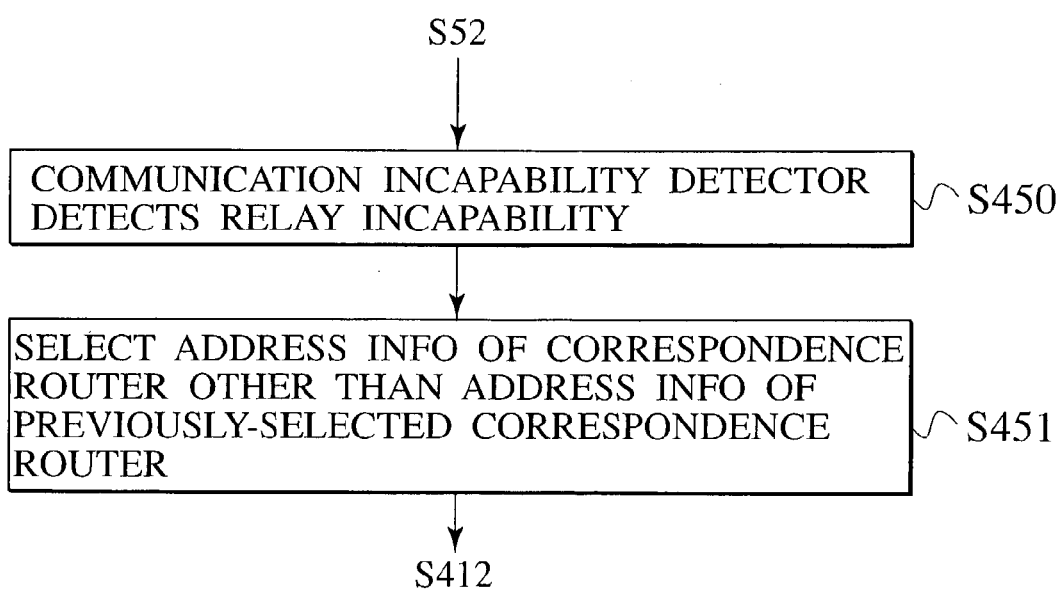
FIG. 33 is a flowchart illustrating a part of a communications method in modification 2 of embodiment 3.

FIG. 33 is a flowchart illustrating a communications method using the communications system with the above configuration. Processes identical to those shown in embodiment 3 (FIGS. 30 and 31) will not be described. Processes identical to those shown in FIGS. 11 and 13 are affixed identical reference numerals and will be not be described, and similar processes are affixed identical reference numerals and will be described only in terms of difference.

After the process of step S413 in embodiment 3, the process of step S50 in FIG. 11 is conducted (determining process of the communication determiner 7c). At that time, together with the control signal, the address information of the selected correspondence router 8 is transmitted to the communication determiner 7c.

Suppose the communication determiner 7c determines that the gateway switch device 7 cannot relay the data. The determination of the communication determiner 7c and the address information of the previously-selected correspondence router 8 are transmitted to the communication incapability detector 5c of the local switch device 5 (S52).

The communication incapability detector 5c of the local switch device 5 detects that the gateway switch device 7 cannot relay the data to the correspondence router 8 based on the determination (S450). The detection is transmitted together with the address information of the previously-selected correspondence router 8 to the controller 5i. The controller 5*i* transmits the detection, the address information of the previously-selected correspondence router 8 and the address information of the given server 10 to the selector 20*d* of the information selection device 20.

The selector 20*d* of the information selection device 20 selects, as a given correspondence router 8, a correspondence router 8 other than the previously-selected correspondence router 8 from among the plurality of correspondence routers, based on the path communication abilities respectively associated with the plurality of correspondence routers 8 determined by the determiner 20*f* (S451).

In parallel with the processes of steps S450 and S451, the process by the selection count manager 20*g* and the process by the communication suspension determiner 20*h* are conducted (S560 to S570 in FIG. 13). In the description of these processes, the selector 5*d* is replaced with the selector 20*d*, the selection count manager 5*e* is replaced with the selection count manager 20*g*, and the communication suspension determiner 5*f* is replaced with the communication suspension determiner 20*h*.

Thereafter, the processes of steps S412, S413 and S50 are conducted. In step S50, suppose that the gateway switch device 7 is determined to be capable of relaying the data. In this case, the process in S415 to S418 and the process in S73 to S75 are conducted. The method of data transmission from the mobile terminal 1 to the server 10, is performed in the same manner as shown in embodiment 3.

As in modification 1 of embodiment 1, when the mobile terminal 1 transmits data to the given server 10, it is also possible not to perform the communication path establishment process.

The communications system of this modification has the following effects in addition to the effects of embodiment 3. That is, in such a situation where a gateway switch device 7, which is connected to a correspondence router 8 selected by the selector 20*d*, cannot relay the data, the selector 20*d* can perform the following process. The selector 20*d* can select a correspondence router 8 other than the previously-selected correspondence router 8. A gateway switch device 7 connected to the selected correspondence router 8 is different from the gateway switch device 7 which cannot relay the data. As a result, the data transmitted from the mobile terminal 1 is transmitted to the given server 10 via the correspondence router 8 by the selector 20*d* again. The data transmitted from the mobile terminal 1 is thus more reliably transmitted to the given server 10 than in embodiment 3.

Modification 3

The above-described communications system in embodiment 3 may be modified as described below. In this modification, configuration identical to that shown in embodiments 2 and 3 will not be described and the difference will be described.

A memory 5*a* of a local switch device 5 stores the following table (see FIG. 18). In this table, the address information of correspondence routers 8 is associated with the address information of gateway switch devices 7 and also the address information of the gateway switch devices 7 is associated with fault information showing the presence or absence of faults in the relay of the gateway switch devices 7. This table is identical to the second correspondence table described in embodiment 2. This table is hereinafter referred to as a second correspondence table.

A fault detector 5*k* in this modification has the function of the fault detector 5*k* in embodiment 2. A rewriter 5*i* in this modification has the function of the rewriter 5*i* in embodiment 2.

A determiner 20*f* of an information selection device 20 determines a plurality of correspondence routers 8 associated with a given server 10. The determiner 20 then refers to the second correspondence table and determines, from among the plurality of correspondence routers 8, a plurality of correspondence routers 8 associated with fault information showing fault absence.

Detailed description of the determination process by the determiner 20*f* is given below. The controller 5*i* of the local switch device 5 reads the second correspondence table from a memory 5*a*. The controller 5*i* transmits the second correspondence table and the address information of the given server 10 via a communicator 5*g* to the controller 20*f* of the information selection device 20.

The determiner (controller) 20*f* refers to a third correspondence table stored in a memory 20*c* and determines the address information (y1, y2, y3 . . . ) of the plurality of correspondence routers 8 associated with the address information x1 of the given server 10. The controller 20*f* may perform the determination process by referring to the second correspondence table.

The determiner 20*f* refers to the second correspondence table and determines a plurality of correspondence routers 8 associated with fault information showing fault absence from among the address information (y1, y2, y3 . . . ) of the plurality of correspondence routers 8. Detailed description with reference to FIG. 18 is given below. From among the address information (y1 to y5) of the plurality of correspondence routers 8 associated with the address information x1 of the given server 10, the address information (y2, y5) of the correspondence routers 8 associated with fault information showing fault absence, is determined. The address information (y2, y5) of the plurality of correspondence routers 8 and the address information x1 of the given server 10 are transmitted to the selector 20*d*.

The selector 20*d* refers to the third correspondence table and performs the following process. The selector 20*d* selects, based on path communication abilities respectively corresponding to the plurality of correspondence routers 8 determined by the determiner 20*f*, a given correspondence router 8 from among the plurality of correspondence routers 8.

Detailed description of the process by the selector 20*d* is given below. The selector 20*d* reads the third correspondence table from the memory 20*c*. The selector 20*d* refers to the third correspondence table and performs the following process. The selector 20*d* compares the path communication abilities (a2, a5) respectively associated with the address information pieces (y2, y5) of the plurality of correspondence routers 8 determined by the determiner 20*f* to one another. The selector 20*d* then selects the address information (y2) of a correspondence router 8 associated with the highest path communication ability (a2) from among the address information of the plurality of correspondence routers 8.

The memory 20*c* may store the second correspondence table. The controller 20*f* may have the function of the fault detector 5*k* in embodiment 2, the function of the rewriter 5*i* in embodiment 2 and the function of the recovery detector 5*n* in embodiment 2.

Communications Method

Figure 34:
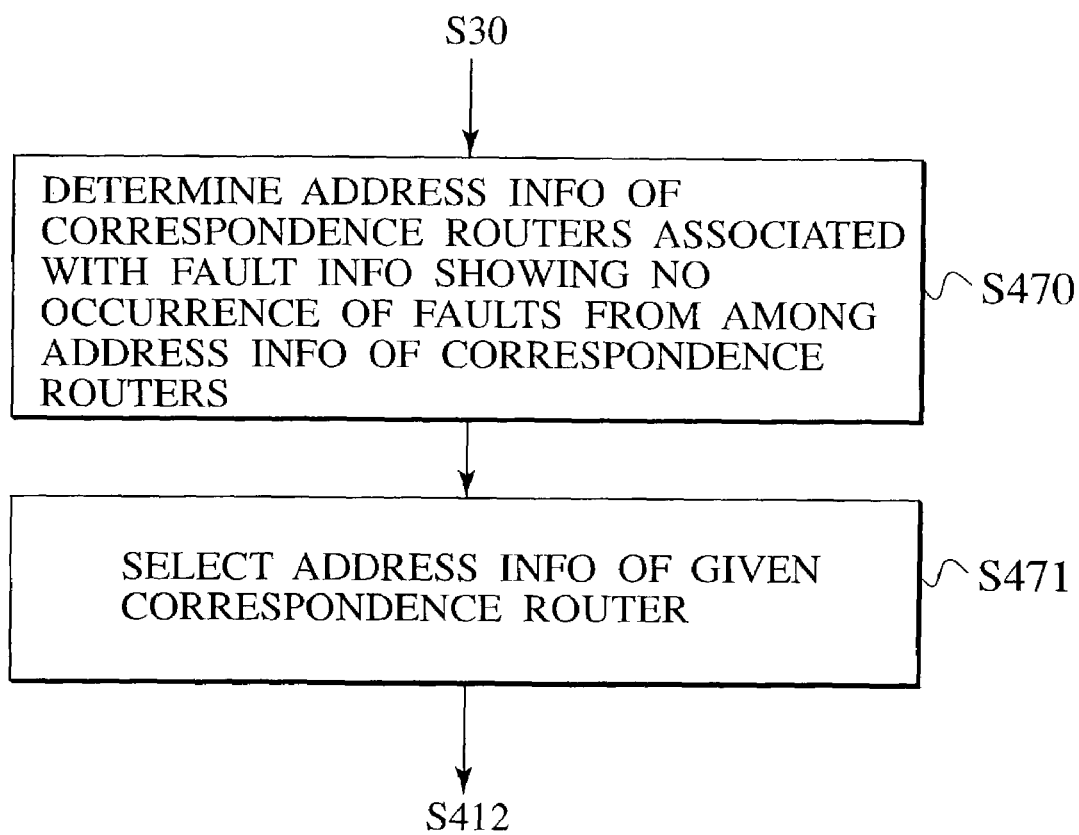
FIG. 34 is a flowchart illustrating a part of a communications method in modification 3 of embodiment 3.

FIG. 34 is a flowchart illustrating a communications method using the communications system of the above configuration. Processes identical to those shown in embodiment 3 (FIGS. 30 and 31) will not be described. Processes identical to those shown in FIG. 23 are affixed identical reference numerals and will not be described and similar processes are affixed identical reference numerals and will be described in terms of difference. A method of recording fault information and a method of recording fault recovery are identical to those shown in embodiment 2 (FIGS. 20, 21 and 22).

First, the processes in steps S10 to S30 are conducted. In step S15, a mobile terminal 1 transmits to a base station 2 a control signal to set a communication path between the mobile terminal 1 and a correspondence router 8. The controller 5i of the local switch device 5 transmits to the controller 20f of the information selection device 20 the address information of a given server 10 included in the control signal and the second correspondence table stored in the memory 5a.

The controller (determiner) 20f of the information selection device 20 refers to the third correspondence table stored in the memory 20c and determines the address information of a plurality of correspondence routers 8 associated with the address information of the given server 10. The controller 20f refers to the second correspondence table and determines a plurality of correspondence routers 8 associated with fault information showing fault absence from among the address information of the plurality of correspondence routers 8. The address information of the correspondence routers 8 determined by the controller 20f and the address information of the given server 10 are transmitted to the selector 20d.

The selector 20d of the information selection device 20 refers to the third correspondence table and conducts the following process. The selector 20d selects, based on path communication abilities respectively associated with the address information pieces of the plurality of correspondence routers 8 determined by the determiner 20f, the address information of a given correspondence router 8. Then the processes in and after step S412 in embodiment 3 are carried out.

The method of data transmission from the mobile terminal 1 to the server 10 is implemented in the same manner as the transmission method shown in embodiment 3. Also in this modification, when the mobile terminal 1 transmits data to the given server 10, it is also possible not to perform the communication path establishment process.

The communications system in this modification has the following effects in addition to the effects of embodiment 3. In this modification, if there is a gateway switch device 7 which cannot relay data, the local switch device 5 can transmit data to a gateway switch device 7 which can relay the data. Thus the gateway switch device 7 can reliably relay the data to a correspondence router 8.

It is also securely prevented that data transmitted from the local switch device 5 is transmitted to a gateway switch device 7 which cannot relay the data. Thus prevented are the delay of arrival of data at the given server 10 and no final arrival of data at a given server 10.

In this modification, in-area communication may be performed. The in-area communication will be described below. The memory 20c stores a third correspondence table for each local switch device 5. When information such as the address information of a server 10 is transmitted from a given local switch device 5, the determiner 20f uses the third correspondence table associated with the given local switch device 5 and performs the determination process. Similarly, the selector 20d uses the third correspondence table associated with the given local switch device 5 and performs the selection process.

Embodiment 4

Figure 35:
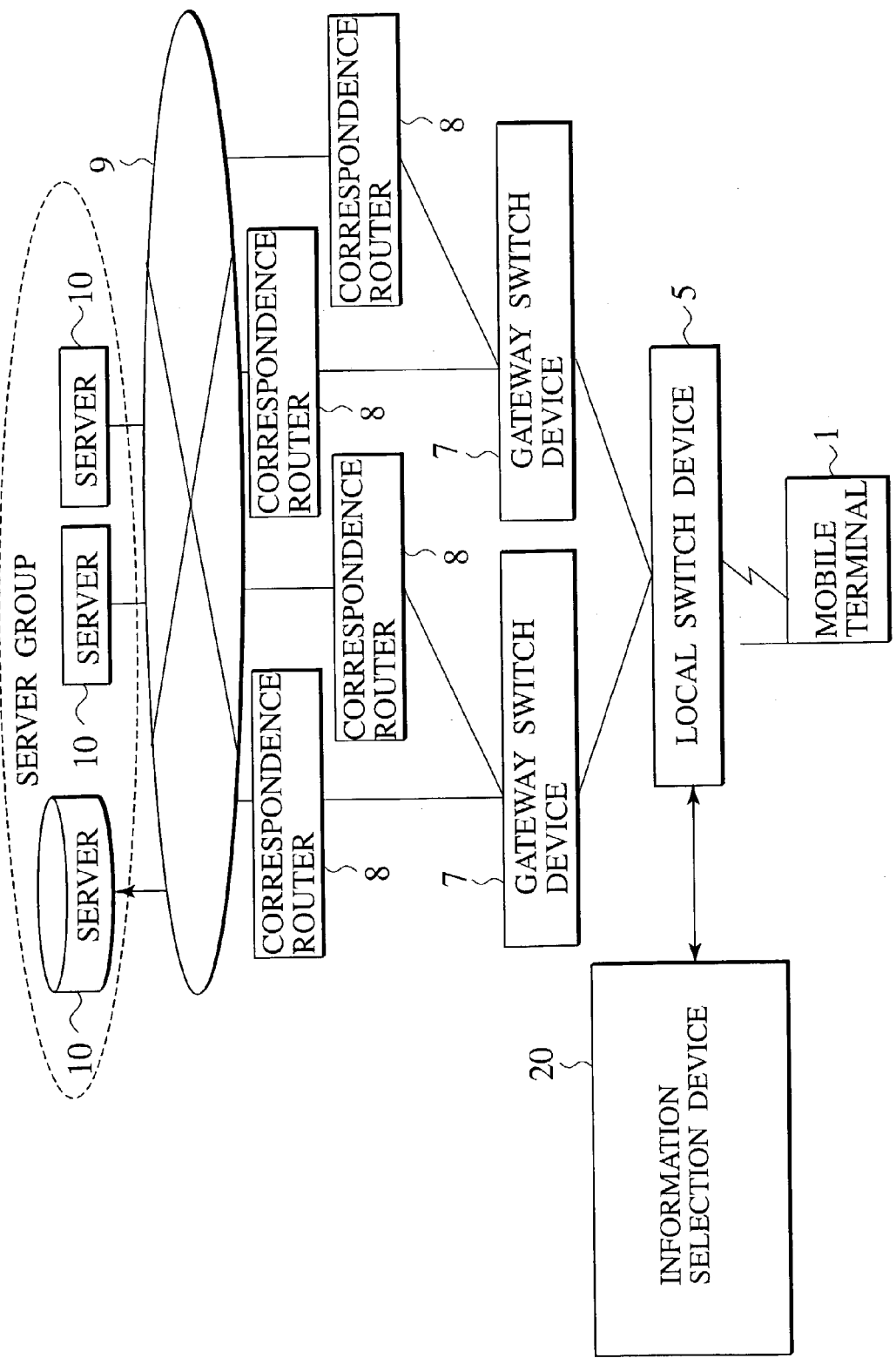
FIG. 35 is a diagram illustrating the configuration of a communications system in embodiment 4.

FIG. 35 is a structural diagram of a communications system in embodiment 4. In this embodiment, components identical those in embodiments 1 and 2 are affixed identical reference numerals and will not be described. In this embodiment, the concept of a server group indicating a plurality of servers 10 is used. The functions of an information selection device 20 in this embodiment are different from the functions of the information selection device 20 in embodiment 3.

In the communications system of this embodiment, a plurality of correspondence routers 8 are connected to a single gateway switch device 7. A communicator 5g of a local switch device 5 in this embodiment conducts data communications with the information selection device 20.

Figures 36, 37:
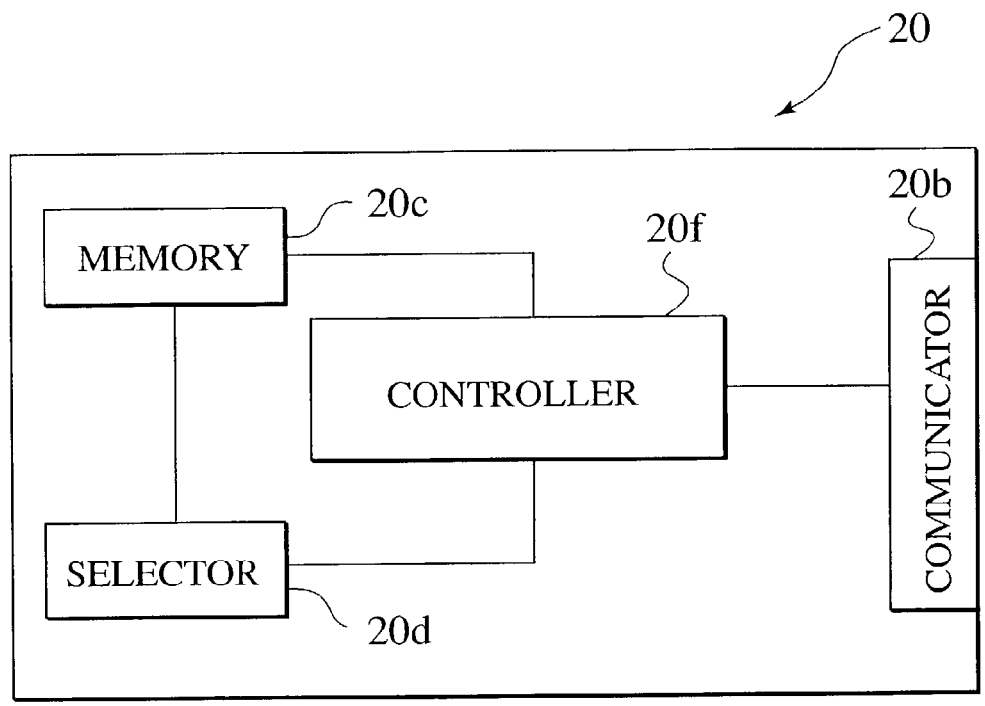
FIG. 36 is a diagram illustrating the configuration of an information selection device in embodiment 4.
FIG. 37 is a diagram exemplifying a fourth correspondence table stored in a memory in embodiment 4.

FIG. 36 is a diagram illustrating the configuration of the information selection device 20 in embodiment 4. The information selection device 20 has a communicator 20b for conducting data communications with the local switch device 5, a memory 20c, a selector 20d and a controller 20f for controlling those units. The controller 20f also serves as a determiner.

In the memory 20c (first memory), first correspondence information is stored for each server group indicating a plurality of servers 10. In the first correspondence information, the address information of mobile terminals 1 is associated with the respective attribute information pieces. The attribute information is, for example, information concerning information provided by servers 10 belonging to a server group to mobile terminals 1. The attribute information includes, for example, the amount of information provided by servers 10 belonging to a server group to mobile terminals 1 and kind of contents of the information.

For example, a user of a mobile terminal 1 makes agreement (contract or the like) with a given service provider. The given service provider manages a plurality of servers 10. The above-described server group indicates the plurality of servers 10 managed by the given service provider, for example.

In the agreement between the user of the mobile terminal 1 and the given service provider, the amount of information (traffic) provided to the user and the kind of information contents provided to the user, are determined, for example. The kind of information contents is, for example, a "morning (or noon)" type when the contents of information relate to the morning (or the noon). When the contents of information relate to a ○○ area, the kind of information contents is a "○○ area" type. When the contents of information relate to men (or women), the kind of information contents is a "men (or women)" type. The attribute information is not limited in the amount of information and the kind of information contents.

The attribute information pieces corresponding to information pieces stored in the servers (belonging to the server group) 10 are different from one another. For example, a server R1 belonging to a given server group stores information regarding ○○ area. A server R2 belonging to the given server group stores information regarding △△ area.

The service provider informs a manager of the communications system, of the correspondence information in which the address information of the users' mobile terminals 1 is associated with the attribute information, together with the information identifying server groups (e.g., address information). A plurality of service providers conduct the above process. The manager of the communications system inputs information informed by the service providers using an input (not shown) of the information selection device 20. The controller 20f generates the first correspondence information for the address information of each server group and directs the memory 20c to store it. For the information identifying the mobile terminals 1, ID information of the users of the mobile terminals 1 may be used instead of the address information of the mobile terminals 1.

The memory 20c (second memory) stores a plurality of address information pieces of server groups as described below. A plurality of attribute information pieces are associated with the address information of each server group. The address information piece of each server 10 (belonging to each server group) is associated with each attribute information piece. The address information pieces of a plurality of correspondence routers 8 are associated with the address information pieces of the servers 10.

The memory 20c stores a fourth correspondence table in which, for example, the address information of the server groups, the attribute information, the address information of the servers 10 and the address information of the correspondence routers 8 are associated with one another. FIG. 37 is a diagram exemplifying the fourth correspondence table. This embodiment will be described with reference to the fourth correspondence table.

When the address information of a given server group is transmitted from a mobile terminal 1, the determiner 20f of the information selection device 20 conducts the following process. The determiner 20f accesses the first correspondence information associated with the given server group and determines the attribute information associated with the mobile terminal 1.

Detailed description of the determination process by the determiner 20f is given below. A mobile terminal 1 transmits a control signal to the communicator 5g of the local switch device 5. At that time, to the communicator 5g, the address information of a given server group and the address information of the mobile terminal 1 are transmitted. The communicator 5g transmits the control signal, the address information of the given server group and the address information of the mobile terminal 1 to the controller 5i. The controller 5i holds the control signal. The controller 5i transmits the address information of the given server group and the address information of the mobile terminal 1 via the communicator 5g to the controller 20f of the information selection device 20.

The controller 20f reads from the memory 20c the first correspondence information associated with the address information of the given server group. Referring to the first correspondence table, the controller 20f determines the attribute information associated with the address information of the mobile terminal 1.

For example, the address information of the given server group is address A. In the first correspondence information associated with address A, the address information pieces of mobile terminals 1 (address c1, address c2 . . . ) are respectively associated with the attribute information pieces (attribute information β1, attribute information β2 . . . ). When the address information of the mobile terminal 1 transmitted to the determiner 20f is address c2, the controller (determiner) 20f determines attribute information β2 associated with address c2.

The selector 20d (first selector) selects a server 10 associated with the address information of the given server group and the attribute information determined by the determiner 20, from among the plurality of servers 10 belonging to the given server group.

Detailed description of the selection process by the selector 20d is given below. When the address information of a given server group (e.g., address A) and attribute information (e.g., attribute information β2) are transmitted from the determiner 20f, the selector 20d reads the fourth correspondence table (e.g., the fourth correspondence table shown in FIG. 37) from the memory 20c.

Referring to the fourth correspondence table, the selector 20d obtains the address information (e.g., addresses a1, a2, a3 . . . ) of a plurality of servers 10 associated with the address information of the given server group. The selector 20d then selects the address information of a server 10 (address a2) associated with the attribute information (attribute information β2) determined by the determiner 20f, from among the address information of the plurality of servers 10 (addresses a1, a2, a3 . . . ). At that time, the selector 20d obtains the address information of a correspondence router 8 (address y2) associated with the address information of the server 10 (address a2).

When the address information of a plurality of routers 8 is associated with the address information of the server 10 associated with the attribute information (β2) determined by the determiner 20f, the selector 20d performs the following process, for example. The selector 20d selects one of the address information pieces of the plurality of correspondence routers 8 by way of the above-described round robin manner.

The selector 20d transmits the address information of the selected server 10, the obtained address information of the correspondence router 8, and the address information of the given server group via the controller 20f to the communicator 20b. The communicator (provider) 20b transmits (provides) the transmitted information and the address information of the mobile terminal 1 to the local switch device 5.

The transmitter 5h of the local switch device 5 transmits to the server 10 data destined for the given server group transmitted from the mobile terminal 1 via the correspondence router 8 associated with the server 10 selected by the selector 20d.

Detailed description of the transmission process of the transmitter 5h is given below. Information including the address information of the selected server 10 is transmitted to the controller 5i of the local switch device 5. The controller 5i holds the transmitted information. The controller 5i then reads the first correspondence table from the memory 5a. The controller 5i refers to the first correspondence table and obtains the address information of a gateway switch device 7 associated with the address information of the correspondence router 8 obtained by the selector 20d.

The controller 5i transmits the control signal and the address information of the correspondence router 8, based on the address information of the gateway switch device 7, via the communicator 5h to the gateway switch device 7. Thus established is a communication path between the gateway switch device 7 and the local switch device 5.

The controller 7f of the gateway switch device 7 transmits the control signal, based on the address information of the correspondence router 8, to the correspondence router 8. The correspondence router 8 is set to receive data from the gateway switch device 7. Thus established is a communication path between the gateway switch device 7 and the correspondence router 8.

The correspondence router 8 transmits an answer signal (signal showing the establishment of the communication path) to the controller 5*i* of the local switch device 5.

The controller 5*i* is set to perform the following process when data is transmitted from the mobile terminal 1. When source address information added to the data is the address information of the mobile terminal 1 and destination address information added to the data is the address information of the given server group, the controller 5*i* directs the communicator 5*h* to transmit the data to the server 10 selected by the selector 20*d*.

The controller 5*i* transmits an answer signal, via the communicator 5*g* and the control station 3, to the mobile terminal 1. Thus a communication path is established between the mobile terminal 1 and the correspondence router 8. The answer signal includes the address information of the gateway switch device 7 and the address information of the correspondence router 8.

Then the mobile terminal 1 transmits to the controller 5*i* of the local switch device 5 data destined for the given server group and the address information of the given server group. To the data is added the address information of the gateway switch device 7, the address information of the correspondence router 8, and instruction information showing an instruction to perform data transmission via the gateway switch device 7 and the correspondence router 8.

When source address information added to the data is the address information of the mobile terminal 1 and destination address information added to the data is the address information of the given sever group, the controller 5*i* rewrites the destination address information added to the data, to the address information of the server 10 selected by the selector 20*d*.

The transmitter 5*h* then transmits, based on the instruction information added to the data, the data to the gateway switch device 7. The gateway switch device 7 transmits the data to the correspondence router 8 based on the instruction information. The correspondence router 8 transmits the data to the server 10 selected by the selector 20*d*, based on the destination address information added to the data.

Communications Method

Figure 38:
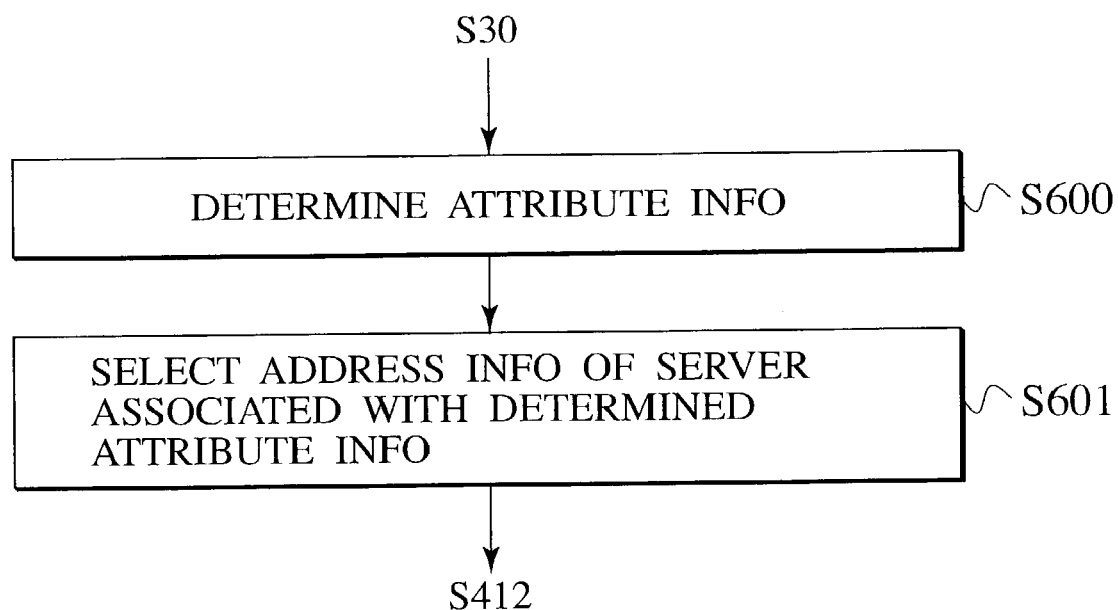
FIG. 38 is a flowchart illustrating a part of a communications method in embodiment 4.

FIG. 38 is a flowchart illustrating a method of establishing a communication path between a mobile terminal 1 and a correspondence router 8. In FIG. 38, processes identical to those shown in FIGS. 11 and 31 are affixed identical reference numerals and will not be described, and similar processes are affixed identical reference numerals and will be described in terms of difference.

First, the processes in steps S10 to S30 are conducted. In the description of these processes, destination address information is the address information of a given server group. In step S15, a mobile terminal 1 transmits to a base station 2 a control signal for establishment of a communication path between the mobile terminal 1 and a correspondence router 8. The other processes are identical to those described in embodiment 1.

The controller 5*i* of the local switch device 5 holds the control signal. The controller 5*i* transmits to the controller 20*f* of the information selection device 20 the address information of a given server group and the address information of the mobile terminal 1 included in the control signal.

The controller (determiner) 20*f* reads the first correspondence information associated with the address information of the given server group from the memory 20*c*. The controller 20*f* refers to the first correspondence information and determines attribute information associated with the address information of the mobile terminal 1 (S600). The determiner 20*f* transmits to the selector 20*d* the address information of the given server group, the determined attribute information and the address information of the mobile terminal 1.

The selector 20*d* reads the fourth correspondence table from the memory 20*c*. Referring to the fourth correspondence table, the selector 20*d* obtains the address information of a plurality of servers 10 associated with the address information of the given server group. The selector 20*d* then selects the address information of a server 10 associated with the attribute information determined by the determiner 20*f*, from among the address information of the plurality of servers 10 (S601). At that time, the selector 20*d* obtains the address information of a correspondence router 8 associated with the address information of the selected server 10.

The selector 20*d* transmits the address information of the selected server 10, the obtained address information of the correspondence router 8, the address information of the given server group and the address information of the mobile terminal 1, to the controller 5*i* of the local switch device 5 via the communicator 20*b*. Then, the processes in steps S412 to S418 and the processes in steps S73 to S75 are carried out.

When the controller 5*i* of the local switch device 5 obtains an answer signal transmitted from the gateway switch device 7 after the process in S418, the controller 5*i* performs the following process. When source address information added to the data is the address information of the mobile terminal 1 and destination address information added to the data is the address information of the given server group, the controller 5*i* directs the communicator 5*h* to transmit the data to the server 10 selected by the selector 20*d*.

Then, as shown in FIG. 14, the process of data transmission from the mobile terminal 1 to the given server 10 is conducted (S80 to S86). In step S80, the mobile terminal 1 adds to the data the address information of the gateway switch device 7 and the address information of the correspondence router 8 included in the answer signal and instruction information showing an instruction to perform data transmission via the gateway switch device 7 and the correspondence router 8.

In step S83, when the source address information added to the data is the address information of the mobile terminal 1 and the destination address information added to the data is the address information of the given server group, the controller 5*i* rewrites the destination address information added to the data, to the address information of the server 10 selected by the selector 20*d*. The transmitter 5*h* transmits the data to the gateway switch device 7, based on the instruction information added to the data.

In step S84, the controller 7*f* of the gateway switch device 7 transmits the data to the correspondence router 8, based on the instruction information. The correspondence router 8 transmits the data to the server 10 selected by the selector 20*d*, based on the destination address information added to the data.

Functions and Effects

The determiner 20*f* refers to the first correspondence information associated with a given server group and determines attribute information associated with a mobile terminal 1. The selector 20*d* can select a server 10 associated with the given server group and the attribute information determined by the determiner 20*f*, from among a plurality of servers 10 belonging to the given server group. The transmitter 5h transmits data destined for the given server group transmitted from the mobile terminal 1, to the server 10 selected by the selector 20d. The data relates to an information delivery request, for example.

As a result, distinct attribute information pieces associated with information pieces stored in respective servers 10, for example, provide the following functions and effects.

When a user inputs information identifying a given server group (e.g., information identifying a service provider) using a mobile terminal 1, the communications system performs the following process. Attribute information determined by the determiner 20f is attribute information desired by the user of the mobile terminal 1. The selector 20d can select a server 10 which can provide information corresponding to the attribute information desired by the user, from among a plurality of servers 10 belonging to the given server group. When the mobile terminal 1 transmits an information delivery request, the transmitter 5h can transmit the information delivery request to the server 10 selected by the selector 20b. As a result, the server 10 can deliver information desired by the user of the mobile terminal 1 to the mobile terminal 1.

Thus the user does not need to find out the address information of the server 10 associated with the attribute information in order to obtain information corresponding to the attribute information he or she desires. In the communications system of this embodiment, without a burden on the user, information desired by the user is delivered from the server 10 to the user's mobile terminal 10. The communications system of this embodiment can thus attain improved convenience of users.

Modification 1

In embodiment 4 described above, a communication path between a mobile terminal 1 and a correspondence router 8 is first established and then the mobile terminal 1 transmits data via the correspondence router 8 to a given server 10. In this modification, when a mobile terminal 1 transmits data to a given server, the above communication path establishment process is not performed.

With reference to the sequence diagram shown in FIG. 15 and the flowchart shown in FIG. 38, the processes in this modification will be described. Processes identical to those in FIGS. 15 and 38 will not be described and similar processes will be described in terms of difference.

First, the processes in steps S90 to S94 are conducted. Then the processes of steps S600, S601 and S412 are conducted.

The controller 5i of the local switch device 5 transmits the data, based on the obtained address information of the gateway switch device 7, via the communicator 5h to the controller 7f of the gateway switch device 7. At that time, the controller 5i adds to the data the address information of the correspondence router 8, the address information of the selected server 10 and given information (showing an instruction to perform data transmission via devices including the correspondence router 8).

The controller 7f of the gateway switch device 7 transmits the data, based on the address information of the correspondence router 8 added to the data, to the correspondence router 8. The correspondence router 8 then transmits the data, based on the address information of the selected server 10, to the server 10.

Modification 2

The controller 20f in embodiment 4 may have the functions of the calculator in embodiment 3. The memory 20c may store a fourth correspondence table shown in FIG. 39, for example. In the fourth correspondence table, path communications capabilities are respectively associated with the address information pieces of the correspondence routers 8.

The selector 20d selects the address information pieces of given servers 10 from among the address information pieces of a plurality of servers 10 belonging to a given server group, and then may perform the following process. The selector 20d may select a given correspondence router 8 from among a plurality of routers 8, based on path communication abilities respectively associated with the plurality of correspondence routers 8 associated with the address information of a given server 10.

The description with reference to FIG. 39 is given below. The selector 20d refers to the fourth correspondence table and obtains the address information of a plurality of correspondence routers 8 (y3, y4) associated with the address information (a3) of a selected server 10. The selector 20d then compares the path communication abilities (a3, a4) respectively associated with the address information pieces (y3, y4) of the plurality of correspondence routers 8 with one another. The selector 20d then selects, based on the comparison, the address information of a correspondence router 8 (y3) associated with the highest path communication ability (a3), for example, from among the address information of the plurality of correspondence routers 8. The communications system in this modification has the same effects as embodiments 3 and 4.

Modification 3

A communications system in this modification has both the functions of the communications system in embodiment 3 and the functions of the communications system in embodiment 4.

A determiner 20f of an information selection device 20 has the functions of the determiner in embodiment 3 and the functions of the determiner in embodiment 4. A selector 20d of the information selection device 20 has the functions of the selector in embodiment 3 and the functions of the selector in embodiment 4.

A memory 20c stores a correspondence table as described below. The correspondence table includes, for example, as shown in FIG. 40, the contents of the third correspondence table (see FIG. 28) and the contents of the fourth correspondence table (see FIG. 39). The memory 20c may store a single third correspondence table and a single fourth correspondence table.

When a controller 20f of the information selection device 20 obtains destination address information from a local switch device 5, the processes in and after S410 (processes in embodiment 3) may be conducted. When the controller 20f obtains the address information of a given server group from the local switch device 5, the processes in and after S600 (processes in embodiment 4) may be conducted.

Modification 4

The above-described communications system in embodiment 4 may be modified as described below. In this modification, components and functions identical to those in embodiment 4 will not be described. A communication incapability detector 5c in this modification has the functions of the communication incapability detector 5c in modification 2 of embodiment 3. A communication determiner 7c in this modification has the functions of the communication determiner 7c in modification 2 of embodiment 3. In place of a local switch device 5, an information selection device 20 may have the communication incapability detector 5c.

The communication incapability detector 5c detects that a given gateway switch device 7 cannot relay data to a given correspondence router 8. The detection by the communication incapability detector 5c is transmitted to a selector 20d. The selector 20d selects a correspondence router 8 other than the given correspondence router 8 from among a plurality of correspondence routers 8 associated with a previously-selected server 10.

Detailed description of the selection process by the selector 20d is given below. The detection of the communication incapability detector 5c, the address information of the given correspondence router 8 and the address information of the selected server 10 are transmitted to the selector 20d of the information selection device 20. At that time, information showing that the gateway switch device 7 cannot relay data to the correspondence router 8 (hereinafter referred to as information showing relay incapability) is associated with the address information of the given correspondence router 8.

The selector 20d reads a fourth correspondence table from a memory 20c. The selector 20d refers to the fourth correspondence table and performs the following process. The selector 20d selects the address information of a correspondence router 8 other than the address information of the given correspondence router 8 (that is, the address information of the correspondence router 8 associated with information showing relay incapability) from among the address information of a plurality of correspondence routers 8 associated with the address information of the selected server 10. The selection process by the selector 20d may be performed based on a round robin manner. The selection process by the selector 20d may be performed based on path communication abilities.

The selector (second selector) 20d associates the address information of the selected correspondence router 8 with the address information of the server 10. The selector 20d transmits the address information of the correspondence router 8 to a communicator 20b. The communicator (provider) 20b transmits (provides) the address information of the correspondence router 8 selected by the selector 20d to the controller 5i of the local switch device 5.

The information selection device 20 in this modification has a selection count manager (not shown) and a communication suspension determiner (not shown). The selection count manager in this modification has the functions of the selection count manager in modification 2 of embodiment 3. The communication suspension determiner in this modification has the functions of the communication suspension determiner in modification 2 of embodiment 3. The selection count manager in this modification, however, manages the number of times the selector 20d (second selector) selects a correspondence router 8.

Communications Method

Figure 41:
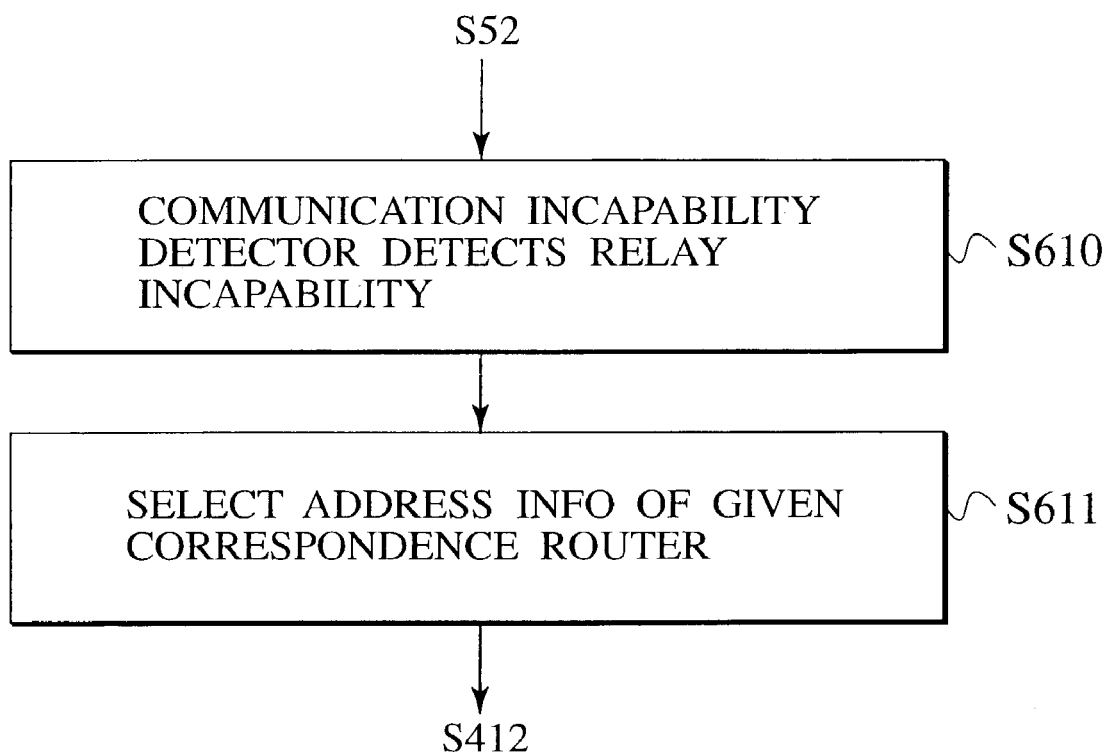
FIG. 41 is a flowchart illustrating a part of a communications method in modification 4 of embodiment 4.

FIG. 41 is a flowchart illustrating a communications method using the communications system with the above configuration. Processes identical to those shown in modification 2 of embodiment 3 will not be described. Processes identical to those in FIGS. 11 and 38 are affixed identical reference numerals and will not be described, and similar processes are affixed identical reference numerals and will be described only in terms of difference.

After the processes of steps S601, S412 and S413 shown in embodiment 4, the process of step S50 is conducted. Suppose that the communication determiner 7c determines that the gateway switch device 7 cannot relay the data to the correspondence router 8.

The determination by the communication determiner 7c and the address information of the given correspondence router 8 are transmitted to the communication incapability detector 5c (S52). The communication incapability determiner 5c detects that the gateway switch device 7 cannot relay data to the given correspondence router 8 (S610). The detection by the communication incapability detector 5c and the address information of the given correspondence router 8 are transmitted to the controller 5i. The controller 5i transmits to the selector 20d of the information selection device 20 information showing relay incapability, the address information of the given correspondence router 8 and the address information of the selected server 10.

The selector 20d reads the fourth correspondence table from the memory 20c. Referring to the fourth correspondence table, the selector 20d carries out the following process. The selector 20d selects address information of a correspondence router 8 other than the address information of the given correspondence router 8, from among the address information of a plurality of correspondence routers 8 associated with the address information of the selected server 10 (S611). In parallel with the processes of steps S610 and S611, the process by the selection count manager and the process by the communication suspension determiner (S560 to S570) are conducted.

Thereafter, the selector 20d associates the address information of the selected correspondence router 8 with the address information of the given server 10. The selector 20d transmits the address information of the correspondence router 8 to the communicator 20b. The communicator (provider) 20b transmits (provides) the address information of the correspondence router 8 to the controller 5i of the local switch device 5. Then the processes of steps S412, S413 and S50 are conducted. Suppose in step S50, the communication determiner 7c determines that the gateway switch device 7 can relay data. In this case, the processes in S415 to S418 and the processes in S73 to S75 are conducted.

The process of data transmission from the mobile terminal 1 to the server 10 is performed in the same manner as in the transmission method shown in embodiment 4. Also in this modification, it is possible not to perform the path communication establishment process when the mobile terminal 1 transmits data to the given server 10.

The communications system in this modification has the following effects in addition to the effects of embodiment 4. Even in a situation where a gateway switch device 7, which is connected to a correspondence router 8 selected by the selector 20d, cannot relay data, the selector 20d can perform the following process. The selector 20d can select a correspondence router 8 other than the previously-selected correspondence router 8. A gateway switch device 7, which is connected to the selected correspondence router 8, is different from the relay-incapable gateway switch device 7. As a result, data transmitted from the mobile terminal 1 is transmitted to the given server 10 via the correspondence router 8 selected again by the selector 20d. Thus the data transmitted from the mobile terminal 1 is more securely transmitted to the given server 10 than in embodiment 3.

Modification 5

The above-described communications system of embodiment 4 may be modified as described below. In this modification, components identical to those shown in embodiments 2 and 3 will not be described and only differences will be described.

A second correspondence table stored in a memory 5i (third memory) in this modification is identical to the second correspondence table in modification 3 of embodiment 3. A fault detector 5*k* in this modification has the functions of the fault detector 5*k* in modification 3 of embodiment 3. A rewriter 5*i* in this modification has the functions of the rewriter 5*i* in modification 3 of embodiment 3.

A selector 20*d* (second selector) refers to the second correspondence table and selects a correspondence router 8 associated with fault information showing fault absence in the relay of a gateway switch device 7, from among a plurality of correspondence routers 8 associated with a selected server 10.

Detailed description of the selection process of the selector 20*d* is given below. A controller 5*i* transmits the second correspondence table via a communicator 5*g* to the selector 20*d*. The selector 20*d* selects a given server 10 and then performs the following process. The selector 20*d* refers to the fourth correspondence table stored in the memory 20*c* and determines the address information of a plurality of correspondence routers 8 associated with the address information of the given server 10. The selector 20*d* then refers to the transmitted second correspondence table and selects the address information of a correspondence router 8 associated with fault information showing fault absence, from among the address information of the plurality of correspondence routers 8.

When the selector 20*d* selects the address information of a plurality of correspondence routers 8, the selector may perform the following process. The selector 20*d* may select one of the address information pieces of the plurality of correspondence routers 8 by way of a round robin manner. The selector 20*d* may select one of the address information pieces of the plurality of correspondence routers 8, based on path communication abilities associated with the respective correspondence routers 8.

The selector 20*d* associates the address information of the selected correspondence router 8 with the address information of the given server 10. The selector 20*d* then transmits to the communicator 20*b* the address information of the correspondence router 8 via the controller 20*f*. The communicator (provider) 20*b* transmits (provides) the transmitted address information of the correspondence router 8 to the controller 5*i* of the local switch device 5.

The memory 20*c* may store the second correspondence table. The controller 20*f* may have the functions of the fault detector 5*k* in embodiment 2, the functions of the rewriter 5*i* in embodiment 2, and the functions of the recovery detector 5*n* in embodiment 2.

Communications Method

The description of a communications method using the communications system with the above configuration is given below. Processes identical to those shown in embodiment 3 (FIGS. 30 and 31) will not be described. Processes identical to those shown in FIGS. 23, 31 and 38 are affixed identical reference numerals and will not be described, and similar processes are affixed identical reference numerals and will be described in terms of difference. A method of recording fault information and a method of recording fault recovery are performed in the same manner as the method shown in embodiment 2.

First the processes in steps S10 to S30 are conducted. In step S15, a mobile terminal 1 transmits to a base station 2 a control signal for establishing a communication path between the mobile terminal 1 and a correspondence router 8. In step S30, the controller 5*i* of the local switch device 5 transmits the second correspondence table to the selector 20*d* of the information selection device 20.

Thereafter the process of step S600 is conducted. The selector 20*d* refers to the fourth correspondence table stored in the memory 20*c* and determines the address information of a plurality of correspondence routers 8 associated with the address information of the selected server 10. The selector 20*d* then refers to the second correspondence table and selects the address information of a correspondence router 8 associated with fault information showing fault absence. Then the processes in S412 to S418 and the processes in steps S73 to S75 are conducted.

The communications system in this modification has the following effects in addition to the effects in embodiment 4. That is, this modification allows secured relay of data from a gateway switch device 7 having no fault in the relay. It is also securely prevented that data transmitted from the local switch device 5 is transmitted to a gateway switch device 7 which cannot relay the data. Thus prevented is a situation where the arrival of data at a given server 10 is delayed and a situation where data does not finally arrive at a given server 10.

In the descriptions of embodiment 4 and its modifications, it is also possible not to use the address information of servers belonging to a server group. It is possible that the local switch device 5 transmit a control signal and data to a given server 10 belonging to the server group, based on the address information of a server group and attribution information.

It is also possible that the communications system does not have the information selection device 20 and the local switch device 5. The communications system may have a single communications device having the functions of the information selection device 20 (e.g., the information selection device in embodiment 3, the information selection device in embodiment 4 and the information selection devices in their modifications) and the functions of the local switch device 5. The local switch device 5 may have the functions of the above-described information selection device 20.

The communications system may have a communications device having the functions of the single communications device and the functions of the communications device in modification 2 of embodiment 2.

The local switch device 5 may have some of the functions of the information selection device 20. The information selection device 20 may have the other functions.

The information selection device 20 may have some of the functions of the local switch device 5. The local switch device 5 may have the other functions.

The communications system may have a measuring unit (not shown). The measuring unit performs the following measuring process for each communication path between the local switch device 5 and a server 10. The measuring unit periodically measures information regarding devices included in the communication path (e.g., the operation rates of CPUs, data discard rates and memory use rates) and also measures information regarding transmission lines included in the communication path.

The measuring unit may transmit the measured information to the calculator 20*f*. The calculator 20*f* may perform the following process based on the information transmitted from the measuring unit. The calculator 20*f* may periodically calculate path communication ability for each communication path. The rewriter 20*f* may periodically rewrite the third correspondence table stored in the memory 20*c* (e.g., the table in FIG. 28) based on the path communication abilities calculated by the calculator 20*f*.

Various modifications will become possible for those skilled in the art after receiving the teachings of the present disclosure without departing from the scope thereof.

What is claimed is:

1. A communications system having mobile terminals and switching devices for relaying data transmitted via a radio network from said mobile terminals to servers, said communications system comprising:
    a memory storing a table in which information identifying each server is associated with information identifying a plurality of switching devices;
    a communication incapability detector for detecting that a given switching device cannot relay data destined for a given server transmitted from a mobile terminal to said given server;
    a selector for selecting, based on said detection by said communication incapability detector, a switching device other than said given switching device from among a plurality of switching devices associated with said given server, referring to said table and information identifying said given server;
    a transmitter for transmitting said data to said switching device selected by said selector; and
    a selection count manager configured to manage a number of times said selector selects a switching device.

2. A communications system as set forth in claim 1, further comprising:
    a communication suspension determiner for determining the suspension of the data transmission to said given server when said number of selections reaches a predetermined number.

3. A communications system having mobile terminals and switching devices for relaying data transmitted via a radio network from said mobile terminals to servers, said communications system comprising:
    a memory storing a table in which information identifying each server is associated with information identifying a plurality of switching devices, and information identifying each switching device is associated with fault information showing the presence or absence of a fault in the relay of said switching device;
    a fault detector for detecting a fault in the relay of each switching device;
    a rewriter for rewriting, from said information included in said table, fault information associated with a given switching device when said fault detector detects a fault in the relay of said given switching device;
    a selector for selecting a switching device associated with fault information showing the absence of a fault in the relay of a switching device from among a plurality of switching devices associated with a given server, by referring to said table and information identifying said given server, when data is transmitted from a mobile terminal to said given server;
    a transmitter for transmitting said data to the switching device selected by said selector; and
    a selection count manager configured to manage a number of times said selector selects a switching device.

4. A communications system as set forth in claim 3, further comprising:
    a recovery detector for detecting a fault recovery indicating that a switching device associated with fault information showing the presence of a fault in the relay of said switching device has become capable of relaying data; in which,
    said rewriter rewrites, from said information included in said table, said fault information of said switching device when said recovery detector detects said fault recovery.

5. A communications device for receiving data from mobile terminals via a radio network and transmitting said data to switching devices for relaying said data to servers, said communications device comprising:
    a memory storing a table in which information identifying each server is associated with information identifying a plurality of switching devices;
    a communication incapability detector for detecting that a given switching device cannot relay data destined for a given server transmitted from a mobile terminal to said given server;
    a selector for selecting, based on said detection by said communication incapability detector, a switching device other than said given switching device from among a plurality of switching devices associated with said given server, by referring to said table and information identifying said given server;
    a transmitter for transmitting said data to said switching device selected by said selector; and
    a selection count manager configured to manage a number of times said selector selects a switching device.

6. A communications device as set forth in claim 5, further comprising:
    a communication suspension determiner for determining the suspension of the data transmission to said given server when said number of selections reaches a predetermined number.

7. A communications device for receiving data from mobile terminals via a radio network and transmitting said data to switching devices for relaying said data to servers, said communications device comprising:
    a memory storing a table in which information identifying each server is associated with information identifying a plurality of switching devices, and information identifying each switching device is associated with fault information showing the presence or absence of a fault in the relay of said switching device;
    a fault detector for detecting a fault in the relay of each switching device;
    a rewriter for rewriting, from said information included in said table, fault information associated with a given switching device when said fault detector detects a fault in the relay of said given switching device;
    a selector for selecting a switching device associated with fault information showing the absence of a fault in the relay of a switching device from among a plurality of switching devices associated with a given server, by referring to said table and information identifying said given server, when data is transmitted from a mobile terminal to said given server;
    a transmitter for transmitting said data to said switching device selected by said selector; and
    a selection count manager configured to manage a number of times said selector selects a switching device.

8. A communications device as set forth in claim 7, further comprising:
    a recovery detector for detecting a fault recovery indicating that a switching device associated with fault information showing the presence of a fault in the relay of said switching device has become capable of relaying data; in which, said rewriter rewrites, from said information included in said table, said fault information of said switching device when said recovery detector detects said fault recovery.

9. A communications method of receiving data from mobile terminals via a radio network and transmitting said data to switching devices for relaying said data to servers, said communications method comprising:
  storing a table in which information identifying each server is associated with information identifying a plurality of switching devices;
  detecting that a given switching device cannot relay data destined for a given server transmitted from a mobile terminal to said given server;
  selecting, based on said detection, a switching device other than said given switching device from among a plurality of switching devices associated with said given server, by referring to said table and information identifying said given server;
  transmitting said data to said selected switching device; and
  managing the number of times said selector selects a switching device.

10. A communications system for establishing communication paths between mobile terminals and switching devices for relaying data transmitted from said mobile terminal to servers, said communications system comprising:
  a memory storing a table in which information identifying each server is associated with information identifying a plurality of switching devices;
  a communication incapability detector for detecting, before a mobile terminal transmits data to a given server, that a given switching device cannot relay said data to said given server;
  a selector for selecting, based on said detection by said communication incapability detector, a switching device other than said given switching device from among a plurality of switching devices associated with said given server, by referring to said table and information identifying said given server;
  a transmitter for transmitting a control signal for establishing a communication path transmitted from said mobile terminal, to said switching device selected by said selector; and
  a selection count manager configured to manage a number of times said selector selects a switching device, wherein,
  said switching device establishes said communication path based on said control signal.

11. A communications system as set forth in claim 10, further comprising:
  a communication suspension determiner for determining the suspension of data transmission to said given server when said number of selections reaches a predetermined number.

12. A communications system for establishing communication paths between mobile terminals and switching devices for relaying data transmitted from said mobile terminals to servers, said communications system comprising:
  a memory storing a table in which information identifying each server is associated with information identifying a plurality of switching devices, and information identifying each switching device is associated with fault information showing the presence or absence of a fault in the relay of said switching device;
  a fault detector for detecting a fault in the relay of each switching device;
  a rewriter for rewriting, from said information included in said table, fault information associated with a given switching device when said fault detector detects a fault in the relay of said given switching device;
  a selector for selecting a switching device associated with fault information showing the absence of a fault in the relay of a switching device from among a plurality of switching devices associated with a given server, by referring to said table and information identifying said given server, when data is transmitted from a mobile terminal to said given server;
  a transmitter for transmitting a control signal for establishing a communication path transmitted from said mobile terminal, to said switching device selected by said selector; and
  a selection count manager configured to manage a number of times said selector selects a switching device, wherein,
  said switching device establishes said communication path based on said control signal.

13. A communications system as set forth in claim 12, further comprising:
  a recovery detector for detecting a fault recovery indicating that a switching device associated with fault information showing the presence of a fault in the relay of said switching device has become capable of relaying data; in which,
  said rewriter rewrites, from said information included in said table, said fault information of said switching device when said recovery detector detects said fault recovery.

14. A communications device for receiving from mobile terminals control signals for establishing communication paths between said mobile terminals and switching devices for relaying data transmitted from said mobile terminals to servers, and transmitting said control signals to said switching devices, said communications device comprising:
  a memory storing a table in which information identifying each server is associated with information identifying a plurality of switching devices;
  a communication incapability detector for detecting, before a mobile terminal transmits data to a given server, that a given switching device cannot relay said data to said given server;
  a selector for selecting, based on said detection by said communication incapability detector, a switching device other than said given switching device from among a plurality of switching devices associated with said given server, by referring to said table and information identifying said given server;
  a transmitter for transmitting a control signal for establishing a communication path transmitted from said mobile terminal, to said switching device selected by said selector; and
  a selection count manager configured to manage a number of times said selector selects a switching device.

15. A communications device as set forth in claim 14, further comprising:
  a communication suspension determiner for determining the suspension of data transmission to said given server when said number of selections reaches a predetermined number.

16. A communications device for receiving from mobile terminals control signals for establishing communication paths between said mobile terminals and switching devices for relaying data transmitted from said mobile terminals to servers, and transmitting said control signals to said switching devices, said communications device comprising:

a memory storing a table in which information identifying each server is associated with information identifying a plurality of switching devices, and information identifying each switching device is associated with fault information showing the presence or absence of a fault in the relay of said switching device;

a fault detector for detecting a fault in the relay of each switching device;

a rewriter for rewriting, from said information included in said table, fault information associated with a given switching device when said fault detector detects a fault in the relay of said given switching device;

a selector for selecting a switching device associated with fault information showing the absence of a fault in the relay of a switching device from among a plurality of switching devices associated with a given server, by referring to said table and information identifying said given server, before a mobile terminal transmits data to said given server;

a transmitter for transmitting a control signal for establishing a communication path transmitted from said mobile terminal, to said switching device selected by said selector; and a selection count manager configured to manage a number of times said selector selects a switching device.

17. A communications device as set forth in claim 16, further comprising:

a recovery detector for detecting a fault recovery indicating that a switching device associated with fault information showing the presence of a fault in the relay of said switching device has become capable of relaying data; in which, said rewriter rewrites, from said information included in said table, said fault information of said switching device when said recovery detector detects said fault recovery.

18. A communications method of establishing communication paths between mobile terminals and switching devices for relaying data transmitted from said mobile terminals to servers, said communications system comprising:

storing a table in which information identifying each server is associated with information identifying a plurality of switching devices;

detecting, before a mobile terminal transmits data to a given server, that a given switching device cannot relay said data to said given server;

selecting, based on said detection, a switching device other than said given switching device from among a plurality of switching devices associated with said given server, by referring to said table and information identifying said given server;

transmitting a control signal for establishing a communication path transmitted from said mobile terminal, to said selected switching device;

having said switching device establish said communication path based on said control signal; and managing the number of times said switching device is selected.

19. A communications system having a first switching device connected to a mobile terminal via radio network, second switching devices connected to said first switching device, and each server for communicating a given second switching device, said communications system comprising:

a calculator for calculating, based on communication information including the amount of data processed by devices included in communication paths between said first switching device and servers, a path communication ability which indicates communication ability in data transmission using each communication path, the path communication ability being associated with a second switching device and a server included in the communication path;

a determiner for determining, when a mobile terminal transmits data to a given server, a plurality of second switching devices associated with said given server, by referring to first correspondence information in which information identifying each server is associated with information identifying a plurality of second switching devices;

a selector for selecting a given second switching device from among said plurality of second switching devices based on the comparison of path communication abilities, from among a plurality of path communication abilities associated with said given server, respectively associated with said plurality of second switching devices with one another;

a transmitter for transmitting said data destined for said given server to said given server via said given second switching device selected by said selector; and a selection count manager configured to manage a number of times said selector selects a second switching device.

20. A communications system as set forth in claim 19, further comprising:

a communications incapability detector for detecting that a given third switching device connected to said given second switching device cannot relay the data destined for said given server, to said given second switching device; wherein, when said communication incapability detector detects relay incapability, said selector selects a second switching device other than said given second switching device from among said plurality of second switching devices based on path communication abilities respectively associated with said plurality of second switching devices determined by said determiner.

21. A communications system as set forth in claim 20, further comprising:

a communication suspension determiner for determining the suspension of the data transmission to said given server when said number of selections reaches a predetermined number.

22. A communications system as set forth in claim 19, further comprising:

a memory storing a table in which information identifying each second switching device is associated with information identifying a third switching device, and information identifying each third switching device is associated with fault information showing the presence or absence of a fault in the relay of said third switching device;

a fault detector for detecting a fault in the relay of each third switching device; and a rewriter for rewriting, from said information included in said table, fault information associated with a given third switching device when said fault detector detects a fault in the relay of said given third switching device; wherein, said determiner determines a plurality of second switching devices associated with said given server, and determines, from among said plurality of second switching devices, one or more second switching devices associated with fault information showing the absence of faults in the relay of associated third switching devices; and when said determiner determines a plurality of second switching devices associated with said fault information, said selector selects a given second switching device from among said plurality of second switching devices, based on path communications abilities respectively associated with said plurality of second switching devices.

23. A communications system as set forth in claim 22, further comprising:

a recovery detector for detecting a fault recovery indicating that a third switching device associated with fault information showing the presence of a fault in the relay of said third switching device has become capable of relaying data; wherein, said rewriter rewrites, from said information included in said table, said fault information of said third switching device when said recovery detector detects said fault recovery.

24. A communications system having a first switching device for communicating mobile terminals via radio network, and each server for communicating the first switching device, said communications system comprising:

a first memory storing first correspondence information in which information identifying each mobile terminal is associated with attribute information including the amount of information provided by a server belonging to a server group meaning a plurality of servers, for each server group;

a second memory storing a plurality of information pieces respectively identifying server groups, a plurality of attribute information pieces being associated with said information piece identifying each server group, and information pieces identifying servers being respectively associated with said attribute information pieces;

a determiner for, upon receiving information identifying a given server group from a mobile terminal, determining attribute information associated with said mobile terminal, by referring to said first correspondence information associated with said given server group;

a first selector for selecting a server, which is associated with information identifying said given server group and said attribute information determined by said determiner, from among a plurality of servers belonging to said given server group; and a transmitter for transmitting data destined for said given server group transmitted from said mobile terminal, to said server selected by said first selector.

25. A communications system as set forth in claim 24, further comprising:

information identifying a plurality of second switching devices being associated with information identifying each server stored in said second memory;

a communication incapability detector for detecting that a given third switching device, which is connected to a given second switching device associated with said server selected by said first selector, cannot relay said data destined for said given server group transmitted from said mobile terminal, to said given second switching device; and a second selector for selecting a second switching device other than said given second switching device from among a plurality of second switching devices associated with said server when said communication incapability detector detects relay incapability; wherein, said transmitter transmits said data destined for said given server group to said server via said second switching device selected by said second selector.

26. A communications system as set forth in claim 24, further comprising:

a selection count manager for managing the number of times said second selector selects a second switching device; and a communication suspension determiner for determining the suspension of the data transmission to said server when said number of selections reaches a predetermined number.

27. A communications system as set forth in claim 24, further comprising:

information identifying a plurality of second switching devices being associated with information identifying each server stored in said second memory;

a memory storing a table in which information identifying each second switching device is associated with information identifying a third switching device, and information identifying each third switching device is associated with fault information showing the presence or absence of a fault in the relay of said third switching device;

a fault detector for detecting a fault in the relay of each third switching device;

a rewriter for rewriting, from said information included in said table, fault information associated with a given third switching device when said fault detector detects a fault in the relay of said given third switching device; and a second selector for selecting a second switching device, which is associated with fault information showing the absence of a fault in the relay of an associated third switching device, from among a plurality of second switching devices associated with said server selected by said first selector, by referring to said table; wherein, said transmitter transmits said data destined for said given server group to said server via said second switching device selected by said second selector.

28. A communications system as set forth in claim 27, further comprising:

a recovery detector for detecting a fault recovery indicating that a third switching device associated with fault information showing the presence of a fault in the relay of said third switching device has become capable of relaying data; wherein, said rewriter rewrites, from said information included in said table, said fault information of said third switching device when said recovery detector detects said fault recovery.

29. A communications device for selecting a given second switching device from among a plurality of second switching devices connected to a server, and providing information about said given second switching device to a first switching device for relaying data destined for said server transmitted from a mobile terminal to said given second switching device, said communications device comprising:

a calculator for calculating, based on communication information including the amount of data processed by devices included in communication paths between said first switching device and said server, a path communication ability which indicates communication ability in data transmission using each communication path, the path communication ability being associated with a second switching device in the communication path;

a determiner for, upon obtaining information identifying said server from said first switching device, determining a plurality of second switching devices associated with said server, by referring to first correspondence information in which information identifying each server is associated with information identifying a plurality of second switching devices;

a selector for selecting a given second switching device from among said plurality of second switching devices based on the comparison of path communications abilities respectively associated with said plurality of second switching devices to one another; and a selection count manager configured to manage a number of times said selector selects a second switching device.

30. A communications device as set forth in claim 29, further comprising:

a communications incapability detector for detecting that a given third switching device connected to said given second switching device cannot relay said data destined for said server transmitted from said mobile terminal to said given second switching device; wherein, when said communication incapability detector detects relay incapability, said selector selects a second switching device other than said given second switching device from among said plurality of second switching devices, based on path communication abilities respectively associated with said plurality of second switching devices determined by said determiner.

31. A communications device as set forth in claim 30, further comprising:

a communication suspension determiner for determining the suspension of the data transmission to said server when said number of selections reaches a predetermined number.

32. A communications device as set forth in claim 29, further comprising:

a memory storing a table in which information identifying each second switching device is associated with information identifying a third switching device, and information identifying each third switching device is associated with fault information showing the presence or absence of a fault in the relay of said third switching device;

a fault detector for detecting a fault in the relay of each third switching device; and a rewriter for rewriting, from said information included in said table, fault information associated with a given third switching device when said fault detector detects a fault in the relay of said given third switching device; wherein, said determiner determines a plurality of second switching devices associated with said server, and determines, from among said plurality of second switching devices, one or more second switching devices associated with fault information showing the absence of faults in the relay of associated third switching devices; and when said determiner determines a plurality of second switching devices associated with said fault information, said selector selects a given second switching device from among said plurality of second switching devices, based on path communications abilities respectively associated with said plurality of second switching devices.

33. A communications device as set forth in claim 32, further comprising:

a recovery detector for detecting a fault recovery indicating that a third switching device associated with fault information showing the presence of a fault in the relay of said third switching device has become capable of relaying data; wherein, said rewriter rewrites, from said information included in said table, said fault information of said third switching device when said recovery detector detects said fault recovery.

34. A communications device for selecting a given server from among a plurality of servers, and providing information about said given server to a first switching device for relaying data transmitted from a mobile terminal to said given server, said communications device comprising:

a first memory storing first correspondence information in which information identifying each mobile terminal is associated with attribute information including the amount of information provided by a server belonging to a server group meaning a plurality of servers, for each server group;

a second memory storing a plurality of information pieces respectively identifying server groups, a plurality of attribute information pieces being associated with said information piece identifying each server group, and information pieces identifying servers being respectively associated with said attribute information pieces;

a determiner for, upon obtaining information identifying a mobile terminal and information identifying a given server group from said first switching device, determining attribute information associated with said mobile terminal, by referring to said first correspondence information associated with said given server group; and a first selector for selecting a server, which is associated with information identifying said given server group and said attribute information determined by said determiner, from among a plurality of servers belonging to said given server group.

35. A communications device as set forth in claim 34, further comprising:

information identifying a plurality of second switching devices being associated with information identifying each server stored in said second memory;

a communication incapability detector for detecting that a given third switching device, which is connected to a given second switching device associated with said server selected by said first selector, cannot relay said data destined for said given server group transmitted from said mobile terminal, to said given second switching device;

a second selector for selecting a second switching device other than said given second switching device from among a plurality of second switching devices associated with said server selected by said first selector when said communication incapability detector detects relay incapability; and a provider for providing information identifying said second switching device selected by said second selector to said first switching device.

36. A communications device as set forth in claim 35, further comprising:

a selection count manager for managing the number of times said second selector selects a second switching device; and a communication suspension determiner for determining the suspension of the data transmission to said server when said number of selections reaches a predetermined number.

37. A communications device as set forth in claim 34, further comprising:

information identifying a plurality of second switching devices being associated with said information identifying each server stored in said second memory;

a third memory storing a table in which information identifying each second switching device is associated with information identifying a third switching device, and information identifying each third switching device is associated with fault information showing the presence or absence of a fault in the relay of said third switching device;

a fault detector for detecting a fault in the relay of each third switching device;

a rewriter for rewriting, from said information included in said table, fault information associated with a given third switching device when said fault detector detects a fault in the relay of said given third switching device;

a second selector for selecting a second switching device ,which is associated with fault information showing the absence of a fault in the relay of an associated third switching device, from among a plurality of second switching devices associated with said server selected by said first selector, by referring to said table; and a provider for providing information identifying said second switching device selected by said second selector to said first switching device.

38. A communications device as set forth in claim 37, further comprising:

a recovery detector for detecting a fault recovery indicating that a third switching device associated with fault information showing the presence of a fault in the relay of said third switching device has become capable of relaying data; wherein, said rewriter rewrites, from said information included in said table, said fault information of said third switching device when said recovery detector detects said fault recovery.

39. A communications method being related to a first switching device connected to a mobile terminal via radio network, second switching devices connected to said first switching device and each server for communicating a given second switching device, said communications method comprising:

calculating, based on communication information including the amount of data processed by devices included in communication paths between said first switching device and servers, a path communication ability which indicates communication ability in data transmission using each communication path, the path communication ability being associated with a second switching device and a server included in the communication path;

determining, when a mobile terminal transmits data to a given server, a plurality of second switching devices associated with said given server, by referring to first correspondence information in which information identifying each server is associated with information identifying a plurality of second switching devices;

selecting a given second switching device from among said plurality of second switching devices based on the comparison of path communication abilities, from among a plurality of path communication abilities associated with said given server, respectively associated with said plurality of second switching devices with one another;

transmitting said data destined for said given server to said given server via said given second switching device selected by said selector; and managing a number of times said given second switching device is selected.

40. A communications method being related to a first switching device for communicating mobile terminals via radio network, and each server for communicating the first switching device, said communications method comprising the steps of:

storing, in a first memory, first correspondence information in which information identifying each mobile terminal is associated with attribute information including the amount of information provided by a server belonging to a server group meaning a plurality of servers, for each server group;

storing, in a second memory, a plurality of information pieces respectively identifying server groups, a plurality of attribute information pieces being associated with said information piece identifying each server group, and information pieces identifying servers being respectively associated with said attribute information pieces;

determining, upon receiving information identifying a given server group from a mobile terminal, attribute information associated with said mobile terminal, by referring to said first correspondence information associated with said given server group;

selecting a server, which is associated with information identifying said given server group and said attribute information determined in said determination step, from among a plurality of servers belonging to said given server group; and transmitting data destined for said given server group transmitted from said mobile terminal to said server selected in said selection step.

* * * * *